United States Patent [19]

Schempf et al.

[11] Patent Number: 5,435,405
[45] Date of Patent: Jul. 25, 1995

[54] RECONFIGURABLE MOBILE VEHICLE WITH MAGNETIC TRACKS

[75] Inventors: Hagen Schempf; Brian S. Albrecht, both of Pittsburgh, Pa.

[73] Assignee: Carnegie Mellon University, Pittsburgh, Pa.

[21] Appl. No.: 230,964

[22] Filed: Apr. 21, 1994

Related U.S. Application Data

[63] Continuation-in-part of Ser. No. 62,797, May 14, 1993, Pat. No. 5,363,935.

[51] Int. Cl.$^6$ ............................................. B62D 55/265
[52] U.S. Cl. ........................................ 180/9.1; 180/9.44; 180/901; 901/1; 901/44
[58] Field of Search .............. 180/9, 9.1, 9.44, 9.62, 180/313, 901; 901/1, 40, 44; 114/222

[56] References Cited

U.S. PATENT DOCUMENTS

| | | | |
|---|---|---|---|
| 3,777,834 | 12/1973 | Hiraoka et al. | 180/9.44 |
| 3,960,229 | 6/1976 | Shio . | |
| 3,973,711 | 8/1976 | Perego | 228/32 |
| 4,645,023 | 2/1987 | Rea et al. | 180/9.32 |
| 4,709,265 | 11/1987 | Silverman et al. | 358/108 |
| 4,757,258 | 7/1988 | Kelly, Jr. et al. | 324/220 |
| 4,789,037 | 12/1988 | Kneebone | 180/9.1 |
| 4,817,653 | 4/1989 | Krajicek et al. | 134/168 R |
| 4,828,059 | 5/1989 | Naito et al. | 180/119 |
| 4,909,341 | 3/1990 | Rippingale et al. | 180/9.1 |
| 4,932,831 | 6/1990 | White et al. | 414/732 |
| 5,022,812 | 6/1991 | Coughlan et al. | 414/729 |
| 5,037,486 | 8/1991 | Sloan | 134/18 |
| 5,205,174 | 4/1993 | Silverman et al. | 73/623 |
| 5,220,869 | 6/1993 | Pelrine et al. | 105/78 |
| 5,293,887 | 3/1994 | Thibodeaux | 134/24 |

FOREIGN PATENT DOCUMENTS

| | | | |
|---|---|---|---|
| 2417822 | 10/1975 | Germany | 901/44 |
| 3312222 | 10/1984 | Germany . | |
| 3811795 | 10/1989 | Germany . | |
| 2-68275 | 3/1990 | Japan | 180/901 |
| 2284897 | 11/1990 | Japan | 901/44 |
| 978600 | 12/1964 | United Kingdom | 180/901 |
| 2203108 | 10/1988 | United Kingdom . | |
| 582961 | 12/1977 | U.S.S.R. . | |
| 8707009 | 11/1987 | WIPO | 901/1 |

OTHER PUBLICATIONS

Brochure published by Intertest, Inc. of Flanders, N.J., May 1992, Entitled: *Only Spiderman Could do it Better*—p. 1.

Product Brochure published by EMCO a Division of Intertest, Inc. of Flanders, N.J., Entitled *MWC42005 Magnetic Wheeled Crawler*—Two Pages—Publication Date Unknown.

*Primary Examiner*—Eric D. Culbreth
*Assistant Examiner*—Kevin Hurley
*Attorney, Agent, or Firm*—Kirkpatrick & Lockhart

[57] ABSTRACT

A mobile vehicle having at least one endless driven member for driving the endless member on a surface capable of supporting a magnetic circuit. The vehicle is equipped with a magnetic system that is housed in a substantially hermetically sealed enclosure and comprises a magnet, a fixed magnetic circuit member, and a movable magnetic circuit member for establishing first and second magnetic circuits. A clutch is provided to selectively connect the movable magnetic circuit member to the motor to move the movable magnetic circuit member between a first position wherein the first magnetic circuit is established such that the endless driven member can magnetically engage the surface and a second position wherein the second magnetic circuit is established such that the endless member does not magnetically engage the surface. The enclosure is pressurized with a pressure medium at a predetermined pressure and temperature and is monitored by sensors within the enclosure. The pressure and temperature sensors interface with microprocessors which can trigger a shut down of the vehicle's components should anomalous pressure or temperature conditions occur within the enclosure. The vehicle also has permanent magnet tracks pivotally attached thereto to enable the vehicle to traverse between intersecting magnetic wall surfaces.

18 Claims, 30 Drawing Sheets

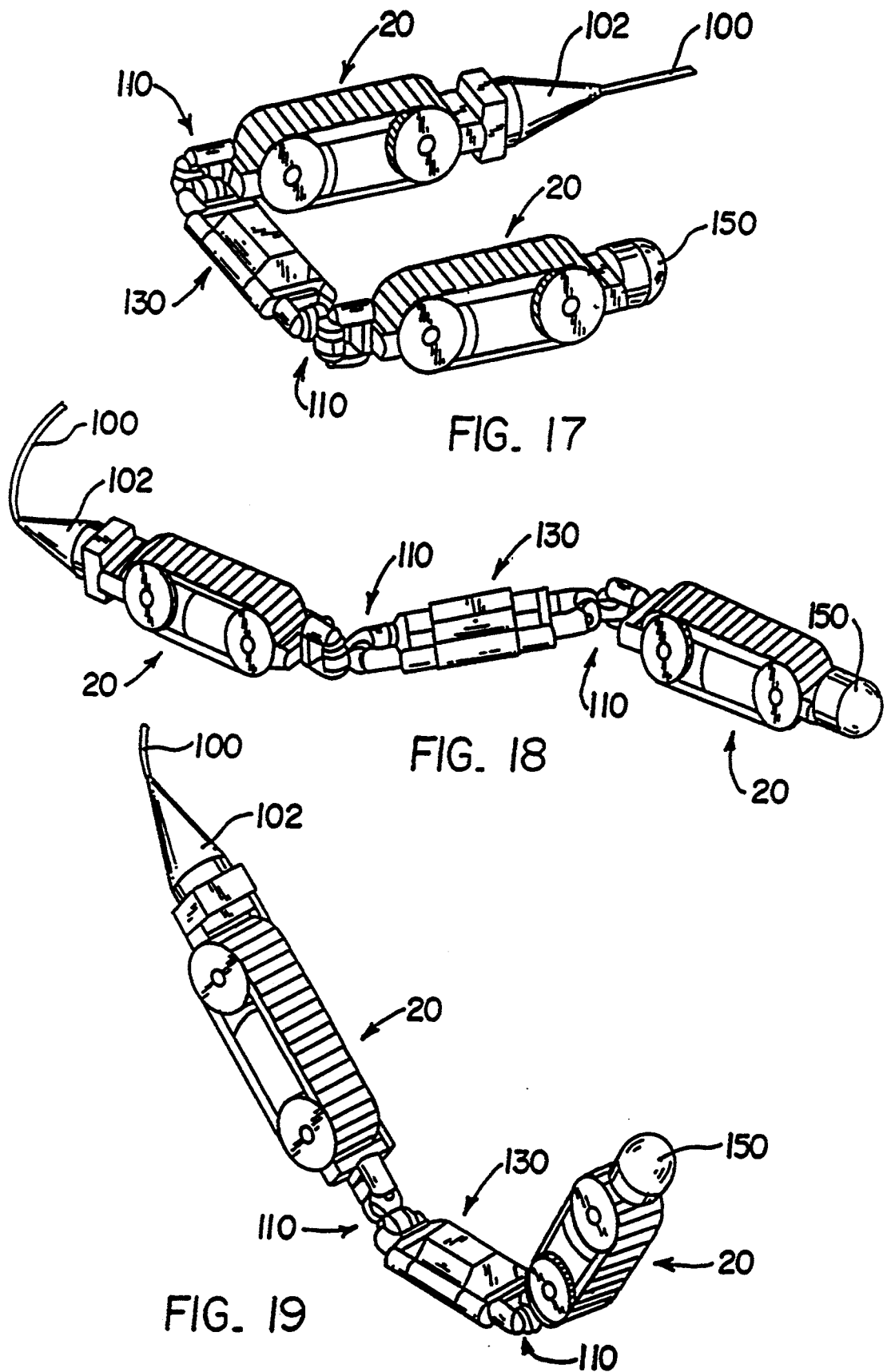

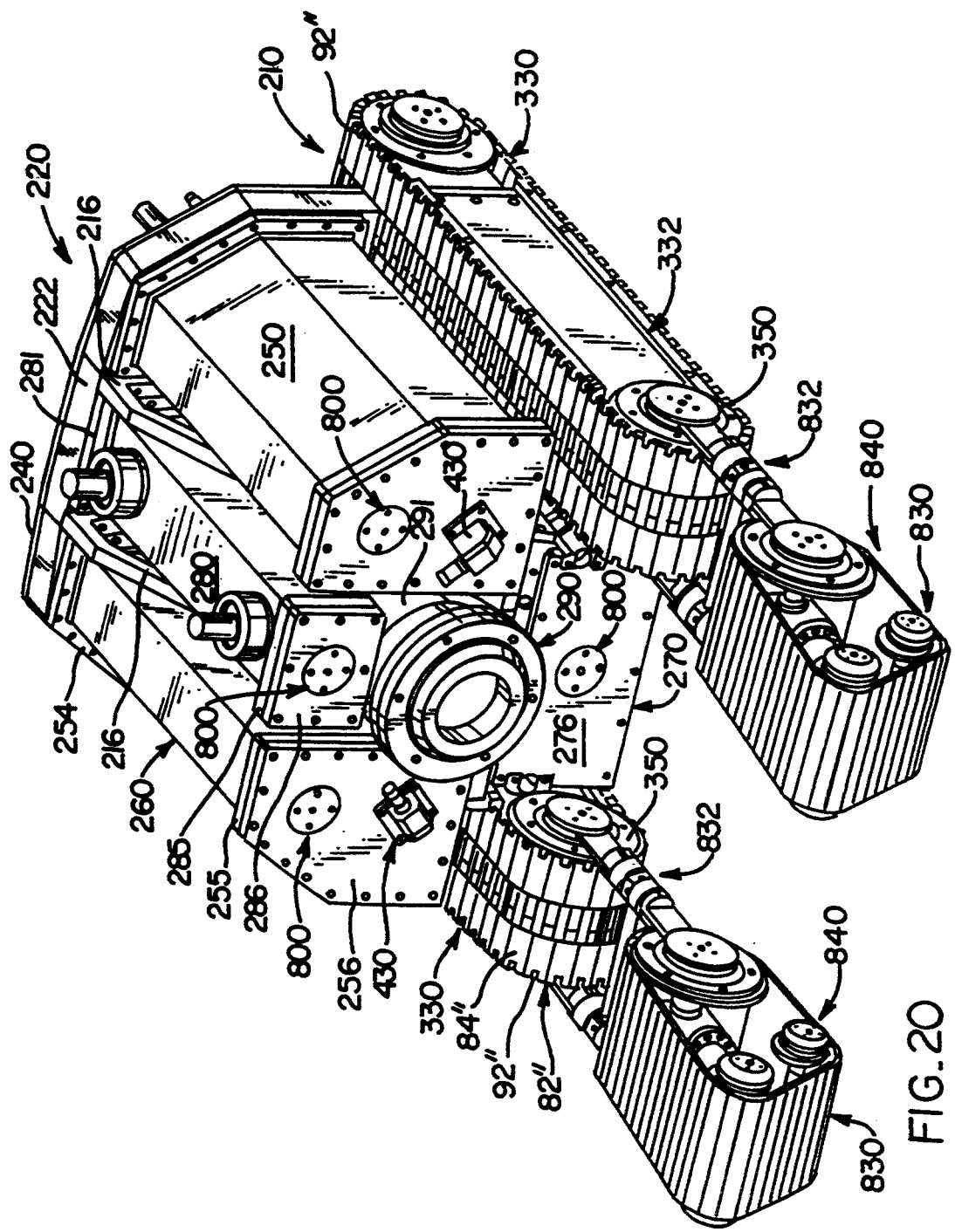

RECONFIGURABLE MOBILE VEHICLE WITH MAGNETIC TRACKS

This invention was made in part under U.S. Army Construction Engineering Research Laboratory Contract No. DACW88-93-C-0010.

This is a continuation-in-part of application Ser. No. 08/062,797 filed on May 14, 1993, U.S. Pat. No. 5,363,935.

BACKGROUND OF THE INVENTION

1. Field of the Invention

The present invention relates to mobile vehicles and, more particularly, is directed to reconfigurable mobile vehicles having selectively magnetizable propulsion means that are capable of entry into a storage tank or infrastructure having constrained entry points and that are equipped with apparatuses to perform various visual and ultrasonic thickness inspection tasks for performing corrosion assessment thereof.

2. Description of the Invention Background

Nikolaus Otto is credited with inventing the internal combustion engine in 1877. In 1908, using the principles developed by Mr. Otto, Henry Ford introduced the Model T Ford, which has been called the first affordable automobile. Little did Mr. Otto and Mr. Ford know that their inventive prowess would spawn many of the billion dollar industries that we know today.

For example, with the development of the automobile came the need for petroleum refineries and filling stations for supplying gasoline to power the automobile between destinations. Soon, filling stations began to appear all over the country. Today, there are thousands of filling stations across the United States alone.

Such filling stations typically store gasoline in steel underground tanks that are periodically replenished by fuel transport trucks that transport the fuel from similar aboveground storage tanks located at refinery to the filling station. Over the years, due to the corrosive influence of the surrounding environment, most underground and aboveground fuel storage tanks periodically develop leaks and ruptures in the walls thereof. Often, such tank leaks go undetected permitting gasoline to be slowly leached into the surrounding soil. Initially, such leaks go undetected until they become noticeably larger. However, once it is apparent that the tank is leaking, it is difficult, if not impossible using known methods and techniques, to determine the exact location of the leak without first emptying the tank.

As such, a variety of tank inspection methods have been developed. One such method involves emptying the tank and sending human inspectors into the tank in an effort to identify and repair the leak and to ascertain the tank's fuel holding integrity. That method, however, is fraught with many inaccuracies, dangers, and disadvantages. In particular, the inspectors must be equipped with explosion proof lights and inspection equipment that can be safely operated in an atmosphere containing explosive vapors and gases. In addition, the inspectors must wear respirators to protect them from inhaling harmful vapors. That additional cumbersome equipment, however, tends to hinder their ability to maneuver within the tank. In addition, this tank inspection method is very time consuming and, because the tank must be emptied before the inspection can take place, the tank cannot be used while the inspection thereof is being conducted.

Another tank inspection method involves first removing the tank's contents and thereafter further evacuating the tank. After a certain amount of vacuum is drawn within the tank, vacuum gages can be used to monitor whether there is a loss of vacuum due to air infiltration through a leak in the tank. In the alternative, sensitive listening devices may be placed within the tank to detect the inrush of air therein. That method, however, is incapable of analyzing the overall structural integrity of the tank.

Another tank inspection method involves removing the fuel from the tank and lowering a camera on a cable to view the tank's interior. This method also lacks the capability of analyzing the structural integrity of the tank's walls to identify other deteriorating portions thereof. Yet another method involves removing the tank from the ground so that its outer perimeter can be inspected. That method, however, is ineffective for detecting leaks in double-walled tanks because the integrity of the interior wall cannot be ascertained from a visual or ultrasonic inspection of the exterior tank wall.

It will be appreciated that the above-described problems are not limited to underground or above-ground storage tanks that contain gasoline or other petroleum products. Such problems may also be encountered with tanks and structures containing a variety of other hazardous or contaminated waste materials. It will be further appreciated that dams and penstocks are also plagued with similar inspection problems. In particular, those structures typically must be inspected by divers or they must be decommissioned and drained before they can be inspected.

A variety of vehicles and robots have been developed for conducting various operations in hostile or hazardous environments. Some of those vehicles are manned such as the vehicle disclosed in U.S. Pat. No. 4,645,023 to Rea et al. That vehicle, while suited for travel on a variety of terrain configurations and conditions, is ill-suited for use inside of an enclosed tank where human access is prohibited. Furthermore, that vehicle could not traverse the vertical walls or ceiling of the vessel to perform inspections thereof.

Other apparatuses have been developed for cleaning the interior of enclosed vessels such as storage tanks. In particular, the mobile, remotely powered robot disclosed in U.S. Pat. No. 4,817,653 to Krajicek et al. is equipped with a spraying device and is adapted to ride upon the floor of the tank. To use that apparatus, however, the tank must first be substantially emptied and a robot entry way must be provided through the side of the tank. The component parts of the robot are then passed through the entry way into the tank wherein they are reassembled and operated by personnel located within the tank. That device is also ill-suited for use in tanks or vessels where, due to the nature of the material stored therein, human access is prohibited. In addition, the Krajicek apparatus could not be used to inspect storage tanks that may be substantially weakened by providing therein an entryway large enough to permit the passage of the robot's components therethrough.

Other robots adapted to operate in hostile environments are known. For example, U.S. Pat. No. 4,932,831 to White et al. and U.S. Pat. No. 5,022,812 to Coughlan et al. disclose track-propelled robots that can be operated from a remote location by means of a tether line that is attached to the robot. Those apparatuses, while somewhat compact, are not collapsible to the extent necessary to permit them to be entered into an enclosed area through a small existing manway or pipe riser therein. In addition, those vehicles cannot traverse along the vertical sides and ceiling of the tank or vessel to perform inspections thereof.

Still other single tracked vehicles are known that could be adapted for entry into a vessel through a small opening therein. For example, U.S. Pat. No. 3,548,962 to Best and U.S. Pat. No. 4,909,341 to Rippingale et al. disclose single tracked articulated vehicles that are capable of assuming a variety of different configurations. Those vehicles, much like the vehicles disclosed in the above-mentioned patents, cannot travel around the vertical walls and ceiling of a tank or vessel to perform various inspection tasks.

A wall-crawling vehicle has been developed, however, by Naito et al. and is disclosed in U.S. Pat. No. 4,828,059. That apparatus comprises a dual or triple-tracked vehicle that, due to its large size, would be unable to enter an enclosed vessel through a small existing manway or pipe riser therein. In addition, the vehicle obtains its wall-crawling abilities by a plurality of permanent magnets attached to the outer perimeter of the crawler tracks.

The apparatus is equipped with a guide device adapted to selectively cause the magnets to move between positions wherein they can magnetically engage the wall surface and a position wherein they do not magnetically engage the wall surface. However, if during the course of operation, operational power should be lost to the guide device, the permanent magnets would remain magnetically attached to the walls of the vessel, thus, making it difficult, if not impossible, to retrieve the apparatus from the vessel. In addition, this apparatus would be ill-suited for travel in a vessel containing some loose magnetic material, as that material could collect around the track and frame and hamper the operation of the guide device.

As will be appreciated from the above discussion, those devices and apparatuses that are used in vessels containing explosive materials must be made "explosion proof" to prevent ally malfunction thereof from causing an explosion within the vessel. Those apparatuses and devices that are used in such hazardous environments may be "certified" for use in such environments by satisfying various requirements contained in the National Electric Code and other requirements established by various agencies and entities such as the National Fire Protection Agency, Underwriter Laboratories, and the Factory Mutual Research Corporation.

A number of different methods have been developed to explosion proof apparatuses for use in environments containing combustible materials. For example, one of the most common methods of explosion proofing an apparatus involves enclosing the components of the apparatus in enclosures that could withstand an internal explosion without igniting the surrounding gaseous mixture. Such explosion proofing method, however, is ill-suited for use in connection with mobile apparatuses adapted to be used in confined environments due to the typical bulkiness and weight of the explosion proof enclosures.

Alternatively, an apparatus can be made "intrinsically safe" by limiting the amount of power supplied thereto such that under no circumstances can the device ignite a gaseous mixture. That method typically cannot be used in apparatuses that have high energy consuming devices such as, for example, sensors and locomotors.

Another method that may be used to explosion proof apparatuses that consume a large amount of energy, involves housing the apparatus in an enclosure that is continuously purged with a fresh/inert air/gas mixture at a predetermined pressure and flow rate. Such method, however, requires that the apparatus be attached to a supply of the air/gas mixture located remote from the apparatus by supply and return lines that can inhibit the maneuverability of the apparatus.

Yet another method for safely operating an apparatus in an environment containing combustible materials is to avoid powering such apparatus by electricity. Such apparatuses are typically hydraulically or pneumatically powered. This method, however, often involves the use of bulky hydraulic or pneumatically controlled components and requires hydraulic/air supply and return lines to direct the pressure medium to and from the apparatus.

Thus, there is a need for a vehicle that can enter an enclosed structure through a constrained entry point and be safely operated by personnel located outside of the structure to perform a variety of inspection and other tasks within the structure. There is a further need for a vehicle that can safely perform a variety of tasks within a vessel containing liquid and/or combustible gaseous material without first removing the material from the vessel. There is still another need for a remotely operable vehicle that can enter an enclosed vessel through a constrained entry point and travel along the vessel walls, bottom and ceiling to assess the structural integrity of the vessel. There is also a need for a method of explosion proofing mobile apparatuses that does not require the use of heavy and/or bulky equipment.

SUMMARY OF THE INVENTION

In accordance with the present invention, there is provided a mobile vehicle for use in a vessel having walls with interior surfaces capable of supporting a magnetic circuit. The vehicle comprises a frame member and an endless driven member that is operably received on the frame member for travel on the interior surfaces of the vessel. A motor is provided for driving the endless member. A magnetic system is also attached to the frame member and comprises a magnet, a fixed magnetic circuit member, and a movable magnetic circuit member for establishing first and second magnetic circuits. A clutch is provided to selectively connect the movable magnetic circuit member to the motor to move the movable magnetic circuit member between a first position wherein the first magnetic circuit is established between the endless member, the magnet, and the fixed and movable magnetic circuit members such that the endless member can magnetically engage one of the interior surfaces of the vessel, and a second position wherein the second magnetic circuit is established between the magnet and the fixed and movable magnetic circuit members such that the endless member does not magnetically engage one of the interior surfaces of the vessel. The vehicle can also be equipped with permanent magnet tracks that are pivotally attached to the frame member and are adapted to pivotally engage the interior surfaces of the walls of the vessel to enable the vehicle to move from a first vessel surface to a second vessel surface that intersects the first vessel surface.

The vehicle also incorporates a method for preventing the ignition of combustible materials within a constrained area by an apparatus having electronically powered components operating therein which comprises the steps of: (i) housing the electronic components in a substantially hermetically sealed housing; (ii) pressurizing the substantially hermetically sealed housing with a noncombustible medium to a predetermined pressure; (iii) monitoring the predetermined pressure within the substantially hermetically sealed housing; and (iv) discontinuing the electrical power to the electrical powered components when the predetermined pressure within the substantially hermetically sealed housing changes more than a predetermined amount. In addition, the temperature with the substantially hermetically sealed housing may also be monitored such that when temperature therein exceed a predetermined amount, the electrical power to the electrical components is discontinued.

It is an object of the present invention to provide a mobile vehicle that can be entered into an enclosed area having constrained entry points to perform a variety of tasks therein.

It is another object of the present invention to provide a mobile vehicle that can be remotely operated in an enclosed area by personnel located outside of the enclosed area.

Yet another object of the present invention is to provide a mobile vehicle that has drive members adapted to engage the surfaces of a steel vessel such that the vehicle can drive thereupon and collect corrosion data pertaining thereto.

Still another object of the present invention is to provide a mobile vehicle that can perform corrosion data collection in enclosed vessels that house an explosive or non-explosive liquid material therein without first removing that material from the vessel.

Another object of the present invention is to provide a vehicle constructed from component parts that may be arranged in a serial or parallel arrangement depending upon the size of the opening through which it is to be deployed.

Another object of the present invention is to provide a mobile vehicle that can assume a first position such that it can pass through a constrained opening and then reconfigure itself into a variety of different configurations that are suited to the terrain being traversed.

Yet another object of the present invention is to provide a vehicle that can traverse from one magnetic surface to an intersecting magnetic surface.

Another object of the present invention is to provide a method for preventing the ignition of combustible materials housed within a constrained area by an apparatus having electrical powered components that is operating therein.

Accordingly, the present invention provides solutions to the aforementioned problems associated with detecting leaks and analyzing the structural integrity of fuel storage vessels and the like. The reader will appreciate that, in addition to the aforementioned details and objects, other advantages associated with the use of the present invention will become apparent as the following detailed description of the present preferred embodiment thereof proceeds.

BRIEF DESCRIPTION OF THE DRAWINGS

In the accompanying drawings, there is shown a preferred embodiment of the invention wherein like reference numerals are employed to designate like parts and wherein:

FIG. 17 is a perspective view of configuration assumable bye vehicle of the present invention;

FIG. 18 is a perspective view of yet another configuration assumable by the vehicle of the present invention;

FIG. 19 is a perspective view of still another configuration assumable by the vehicle of the present invention;

FIG. 20 is a front perspective view of another vehicle of the present invention;

DETAILED DESCRIPTION OF PREFERRED EMBODIMENTS

Figure 1:
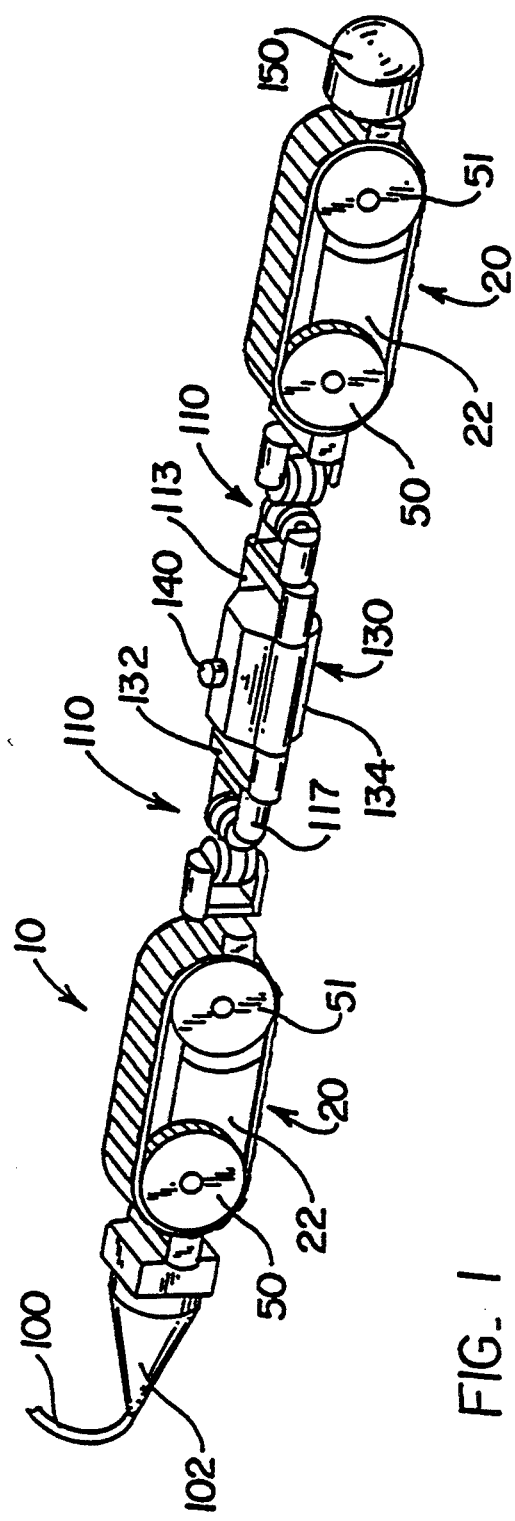
FIG. 1 is a perspective view of a preferred vehicle assembly of the present invention.

Referring now to the drawings for the purposes of illustrating a present preferred embodiment of the invention only and not for purposes of limiting the same, the Figures show a reconfigurable mobile vehicle 10 that is particularly well adapted for deployment into underground and above-ground storage tanks containing a variety of different liquid or solid materials. The skilled artisan will readily appreciate, however, that the subject invention can be deployed into and used in a variety of other enclosed and non-enclosed areas having constrained access points.

More particularly and with reference to FIG. 1, there is shown a preferred mobile vehicle, generally designated as 10, that preferably comprises two independently powered and controlled track modules 20 and a sensor module 130 that is interconnected between the track modules 20 in serial arrangement by steering modules 110.

Figure 2:
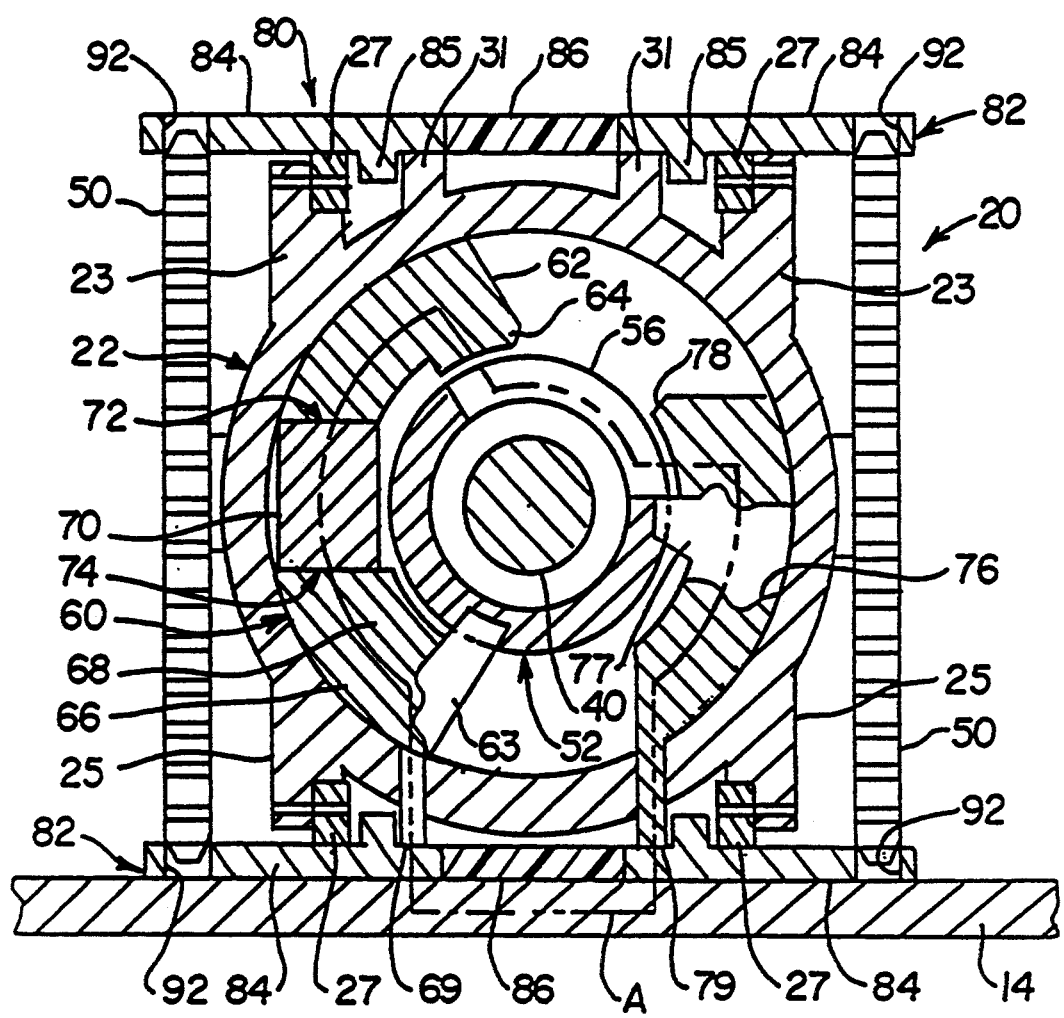
FIG. 2 is a partial cross-sectional elevational view of a track module of the present invention with the hollow cylindrical member thereof being rotated to a first magnetic circuit creating position.
Figure 3:
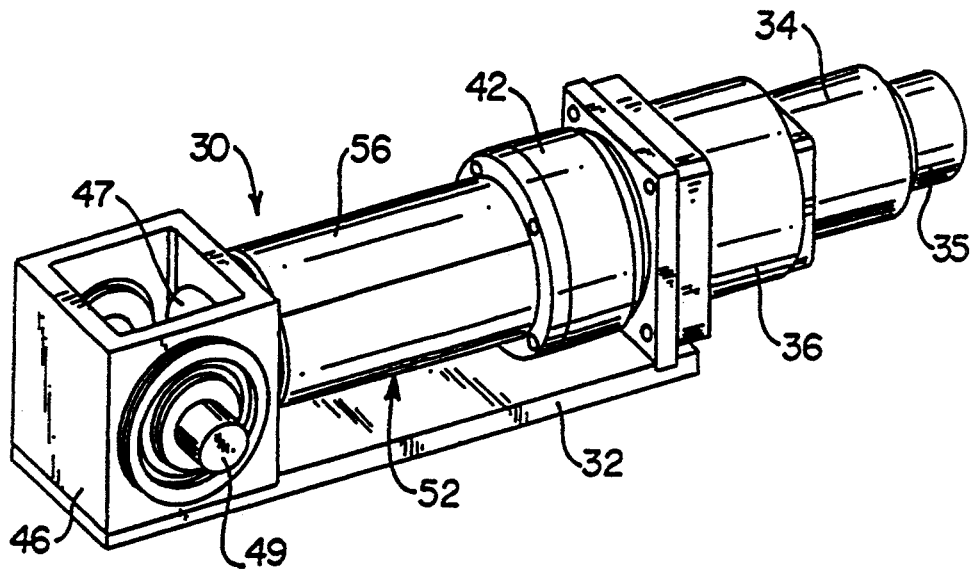
FIG. 3 is a perspective view of the drive assembly of the track module of FIG. 2.
Figure 4:
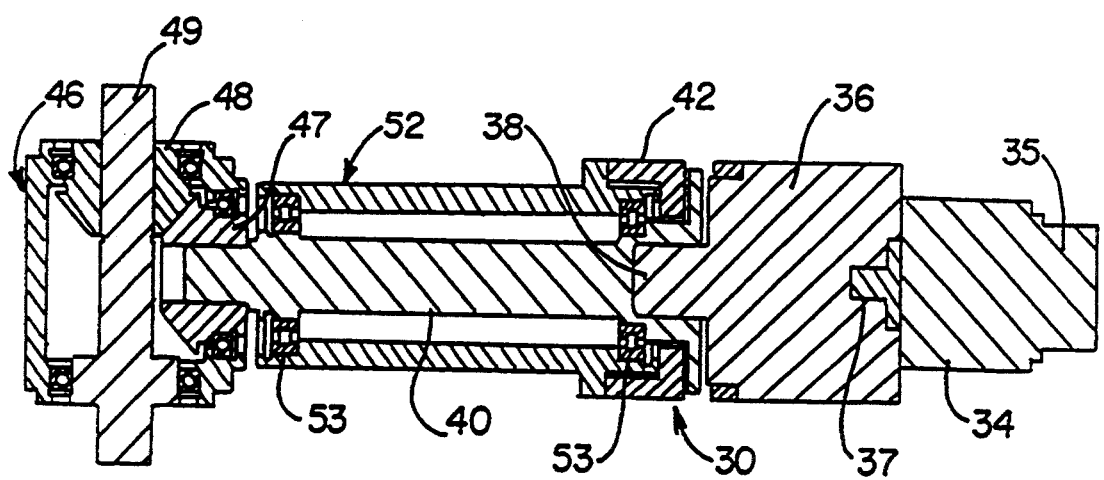
FIG. 4 is a longitudinal cross-sectional view of the drive assembly of FIG. 3.

As can be seen in FIG. 2, each track module 20 includes a hollow cylindrical housing 22 that is preferably fabricated from non-magnetic stainless steel or other suitable material having similar corrosion resistance and non-magnetic properties. Received within the housing 22 is drive assembly 30 that, in a preferred form, includes a stand member 32 that coaxially supports a drive motor 34, a planetary gear box 36, a drive shaft 40, a toothed clutch assembly 42 and a bevel gear box 46 arranged as illustrated in FIGS. 3 and 4. More specifically, the drive assembly 30 is preferably powered by an electrically driven motor 34 that has a resolver/brake 35 operatively connected thereto. In a preferred embodiment, a motor and resolver/brake combination such as Model No. DC-11000 manufactured by SL-Montevideo Technology, Inc. of 2002 Black Oak Avenue, Montevideo, Minn. 56265 are used. However, the skilled artisan will recognize that other pneumatic and hydraulic powered motors may also be used to power a track module 20.

Attached to the output shaft 37 of motor 34 is planetary gear box 36. As can be seen in FIG. 4, the output shaft 38 of planetary gear box 34 is attached to a drive shaft 40. Drive shaft 40 is operatively connected to a bevel gearbox generally designated as 46. In particular, bevel gear box 46 contains a first bevel gear 47 that is attached to the end of the drive shaft 40. A second bevel gear 48, arranged at right angles to the first bevel gear 47 and meshing therewith, is attached to an output shaft 49 which, as will be discussed in further detail below, has drive sprockets 50 attached thereto.

As can most particularly be seen in FIG. 4, a hollow cylindrical shaft 52 is coaxially and rotatably supported on drive shaft 40 by bearings 53. The skilled artisan will appreciate that such construction permits the drive shaft 40 to independently rotate with respect to the hollow cylindrical shaft 52. Communicating with the drive shaft 40 and the hollow cylindrical shaft 52 is a solenoid operated toothed clutch 42. Clutch 42 is configured to permit the hollow cylindrical shaft 52 to be selectively locked to the drive shaft 40 to rotate therewith such that the hollow cylindrical shaft 52 is caused to rotate to at least two predetermined positions as will be further discussed below.

Figure 5:
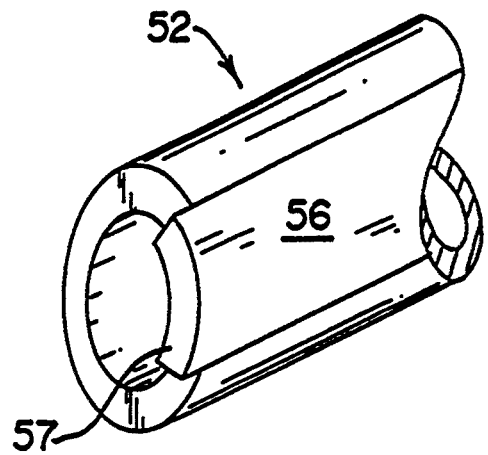
FIG. 5 is a partial perspective view of the hollow cylindrical member of the drive assembly of FIG. 4.
Figure 6:
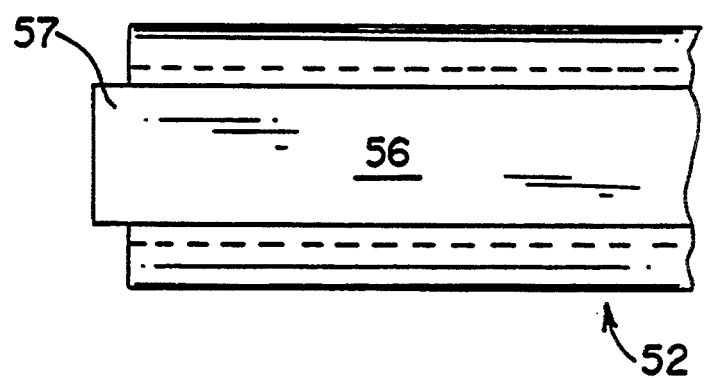
FIG. 6 is a partial side elevational view of the hollow cylindrical member of FIG. 5.

The hollow cylindrical shaft 52 is preferably fabricated from a non-magnetic material such as non-magnetic stainless steel and is fitted with a magnetic circuit portion 56 (preferably fabricated from magnetic stainless steel) that extends along the longitudinal length thereof. See FIGS. 5 and 6. A portion 57 of the magnetic circuit portion 56 preferably extends outwardly approximately 0.3175 cm (⅛ inch) past the end of the hollow cylindrical shaft 52 in the manner illustrated in FIGS. 5 and 6.

Figure 7:
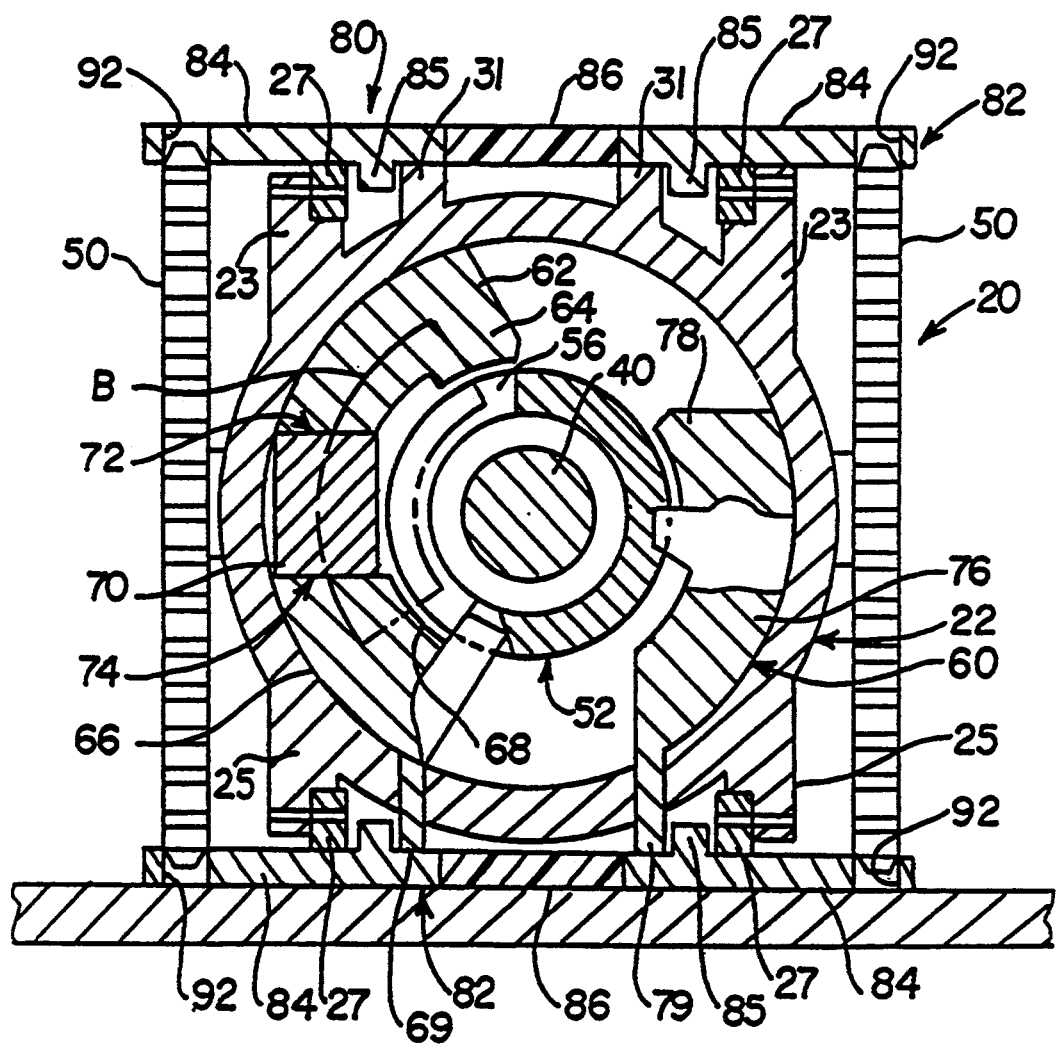
FIG. 7 is another partial cross-sectional elevational view of the track module of FIG. 2 with the hollow cylindrical member thereof being rotated to a second position.

A multi-piece yoke member, generally designated as 60, is arranged to surround the hollow cylindrical shaft 52 as shown in FIGS. 2 and 7. In a preferred embodiment, the yoke member 60 comprises an upper magnetic circuit piece 62, a first lower magnetic circuit piece 66, a permanent magnet 70 having a north pole 72 and a south pole 74, and a second lower magnetic circuit piece 76. The upper magnetic circuit piece 62 is preferably fabricated from a magnetic material such as, for example, iron or magnetic stainless steel and is arcuate in shape and has an arcuate shaped, outwardly extending arm portion 64 as shown in FIGS. 2 and 7. The upper magnetic circuit piece 62 is preferably fastened to the interior of housing 22 by a collection of clamps (not shown) such that an airspace of preferably not more than approximately 0.1588 cm (0.0625 inch) is maintained between the arm portion 64 and the outer perimeter of the hollow cylindrical shaft 52.

The first lower magnetic circuit piece 66 is also preferably fabricated from a magnetic material such as iron or magnetic stainless steel and is arcuate in shape and has an outwardly extending arm portion 68. The first lower magnetic circuit piece 66 is preferably fastened to the interior of housing 22 by collection of clamps or screws (not shown) such that an airspace of preferably not more than approximately 0.1588 cm (0.0625 inch) is achieved between the arm portion 68 and the outer perimeter of the hollow cylindrical shaft 52. In addition, the first lower magnetic circuit piece 66 has a downwardly extending leg portion 69 that extends through the housing 22 as shown in FIGS. 2 and 7. In a preferred embodiment the leg portion 69 is arranged such that an air space of preferably not more than approximately 0.1588 cm (0.0625 inch) is achieved between the end portions 84 of the track cleats 82 and the end of the leg portion 69. The first lower magnetic circuit piece 66 also preferably has an inwardly extending stop member 63 attached thereto that is arranged to engage the outwardly extending portion 57 of the magnetic circuit piece 56 in the manner discussed below.

Attached to the upper magnetic circuit piece 62 and the first lower magnetic circuit piece 64 and extending therebetween is the permanent magnet 70. Permanent magnet 70 is preferably fastened to the upper magnetic circuit piece 62 and the first lower magnetic circuit piece 64 by appropriate glue or screws (not shown). Positioned as shown in FIGS. 2 and 7, is a second lower magnetic piece 76 that is arcuate in shape and is preferably fabricated from iron or magnetic stainless steel. Second lower magnetic circuit piece 76 also has an outwardly extending arm portion 78 and is positioned such that an airspace of preferably not more than approximately 0.1588 cm (0.0625 inch) is maintained between the arm portion 78 and the hollow cylindrical shaft 52. The second lower magnetic circuit piece 76 also has a downwardly extending leg portion 79 that extends through the housing 22 and is arranged such that an airspace of preferably not more than 0.1588 cm (0.0625 inch) is created between the end portions 84 of the track cleats 82 and the end of the leg portion 79. Also attached to the second lower magnetic circuit piece 76 is a second stop member 77 that is arranged to engage the extended portion 57 of magnetic circuit member 56.

Figure 8:
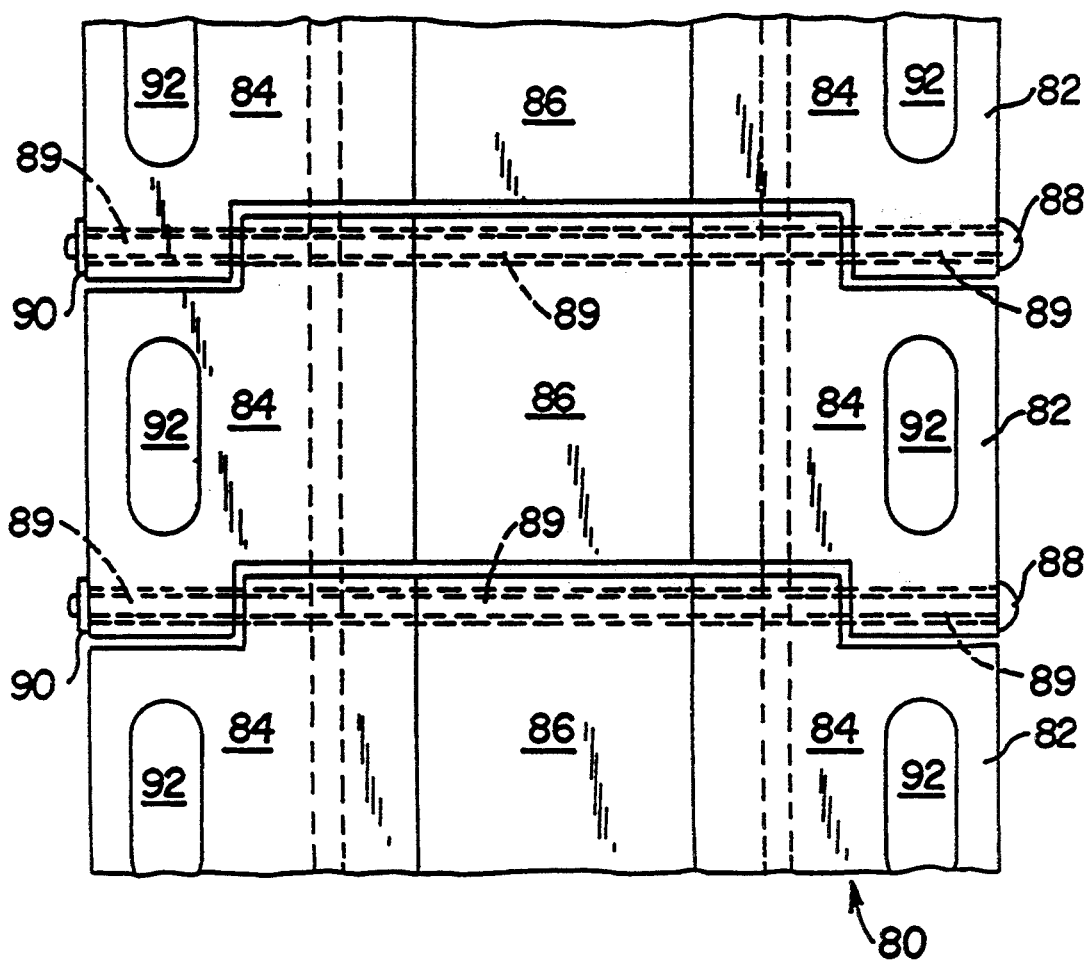
FIG. 8 is a top view of a portion of the endless track of the track module of FIG. 2.

The track module 20 is propelled by an endless track 80 that comprises a plurality of track cleats 82 that are pivotally interconnected connected together as shown in FIG. 8. In particular, each track cleat 82 has two end portions 84 that are fabricated from a magnetic material such as, for example, magnetic stainless and a central portion 86 that is fabricated from a non-magnetic material such as brass. In a preferred embodiment, the end portion 84 and the central portion 86 are fastened together by screws (not shown) to form one continuous cleat 82. Preferably, the cleats 82 are pivotally interconnected by a pin member 88 that extends through bores 89 in the end portions 84 and central portions 86 of each cleat 82. The pins are preferably retained in position by removable clips 90; however other removable fasteners may be used.

The endless track 80 is driven by two drive sprockets 50 that are received on shaft 49. Two additional idler sprockets 51 are also provided at the opposite end of the track module 20 from the drive sprockets 50 for rotatably supporting the endless track 80 thereon. See FIG. 1. In a preferred embodiment seals (not shown) are provided between shaft 49 and housing 22 to create a fluid-tight seal therebetween. Similar seals are also provided to create a fluid-tight seal between the idler sprocket shaft (not shown) and the housing 22. The teeth of sprockets 50 and 51 are adapted to extend through teeth engaging openings 92 that are provided in each end portion 84 of each cleat 82 as shown in FIG. 8. As can also be seen in FIGS. 2 and 7, housing member 22 has two upwardly extending longitudinal support members 23 and two downwardly extending longitudinal support members 25 that have rotatably pinned thereto support rollers 27 that rollably support the endless track 80 on the housing 22. Preferably, support rollers 27 are fabricated from a nonmagnetic material that has excellent friction reducing properties. In a preferred embodiment, rollers 27 are fabricated from teflon; however, other suitable materials may be used. As can also be seen in FIGS. 2 and 7, the upper portion of the housing 22 has two additional upwardly extending longitudinal retaining bosses 31 that cooperate with downwardly extending bosses 85 on each end portion 84 of each track cleat 82 to restrict the lateral travel of the endless track 80 on the housing 22 to thereby prevent the track 80 from being laterally disengaged from the sprockets 50 and 51.

As can be seen in FIG. 1, operational power is supplied to the track module 20 by means of a tether line 100 that is attached to the housing 22 by a tether attachment member, generally designated as 102. Such tether attachment members are well known in the art concerned with the deployment and operation of undersea vehicles. For example, the ball joint tow point adapter and termination and tether strain relief apparatuses manufactured by PMI Industries, Inc. of 5300 St. Clair Avenue, Cleveland, Ohio are well suited for attaching the tether line 100 to a track module 20.

The driving and magnetic engagement of the endless track 80 of a track module 20 with a surface 14 capable of supporting a magnetic circuit such as steel or iron will now be described with reference being specifically made to FIGS. 2 and 7. As was discussed above, the endless track 80 is driven by the drive sprockets 50 that are received on drive shaft 49. By supplying operational power to motor 20, drive shaft 40 is caused to rotate in a desired direction. That rotational motion is transferred to shaft 49 through bevel gear box 46 which ultimately causes the drive sprockets 50 to rotate and drive the endless track 80 around the housing 22. It will be appreciated that in a preferred embodiment, the motor 34 is selectively reversible thus making it possible to drive the endless track 80 in a forward or rearward direction.

One of the novel features of the present invention is its ability to magnetically engage and drive upon the walls and/or ceiling of an enclosed vessel manufactured from steel or other material capable of conducting a magnetic circuit. In particular, when it is desired to have the endless track 80 magnetically engage the surface 14, clutch 42 is engaged to cause the hollow cylindrical shaft 52 to rotate to a first magnetic circuit creating position as shown in FIG. 2. In particular, clutch 42 is engaged to rotate the hollow cylindrical shaft 52 until the extended portion 57 contacts stop member 77 as shown in FIG. 2. At this point, the hollow cylindrical shaft 52 can no longer be rotated in that direction and the clutch 42 is thereafter disengaged. The first magnetic circuit, depicted by flux line "A" in FIG. 2 causes the end portions 84 of the track cleats 82 that are adjacent to the surface 14 to magnetically engage surface 14. In particular, the magnetic flux from permanent magnet 70 flows through upper magnetic circuit piece 62, through the magnetic portion 56 of hollow cylindrical shaft 52, through the second lower magnetic circuit piece 76, into end portions 84 of the track cleats 82, through the surface 14, back through the end portions 84 of track cleats 82, through the first lower magnetic circuit piece 66 and back to the permanent magnet 70 thereby creating a continuous magnetic circuit. The skilled artisan will readily appreciate that, when the track module 20 is magnetically engaged to the surface 14, it may be propelled therealong by driving the drive sprockets 50 in the manner described above. As such, the track module 20 can be driven along the vertical walls and ceiling of a closed vessel to perform a variety of different inspection tasks.

A track module 20 may also be driven along a surface 14 without being magnetically engaged therewith in the following manner. More specifically, to cause the magnetic circuit described above and represented by flux line "A" in FIG. 2 to be reconfigured so that the magnetic engagement between the endless track 80 and the surface 14 is discontinued, clutch 42 is engaged so as to cause the hollow cylindrical shaft 52 to rotate to a second magnetic circuit creating position wherein the extended portion 57 of magnetic circuit portion 56 contacts stop member 63 as shown in FIG. 7. After the extended portion has contacted the stop member 63 and the hollow cylindrical shaft 52 cannot rotate any further in that direction, clutch 42 is disengaged. When in that position, the portion of the hollow cylindrical shaft 52 that extends between the arms 64 and 78 is incapable of conducting a magnetic circuit therethrough and therefore the magnetic circuit depicted in FIG. 2 is broken. As such, the endless track 80 is free to ride upon the surface 14 without any magnetic attraction existing therebetween. It will be appreciated that, when the hollow cylindrical shaft 52 is rotated to that second magnetic circuit creating position, shaft 52 is retained in that position by virtue of the magnetic circuit represented by flux line "B" in FIG. 7. As such, the hollow cylindrical shaft 52 is prevented from accidentally rotating to the first magnetic circuit creating position as the track module 20 is driven, perhaps, over uneven surfaces or terrain.

Figure 9:
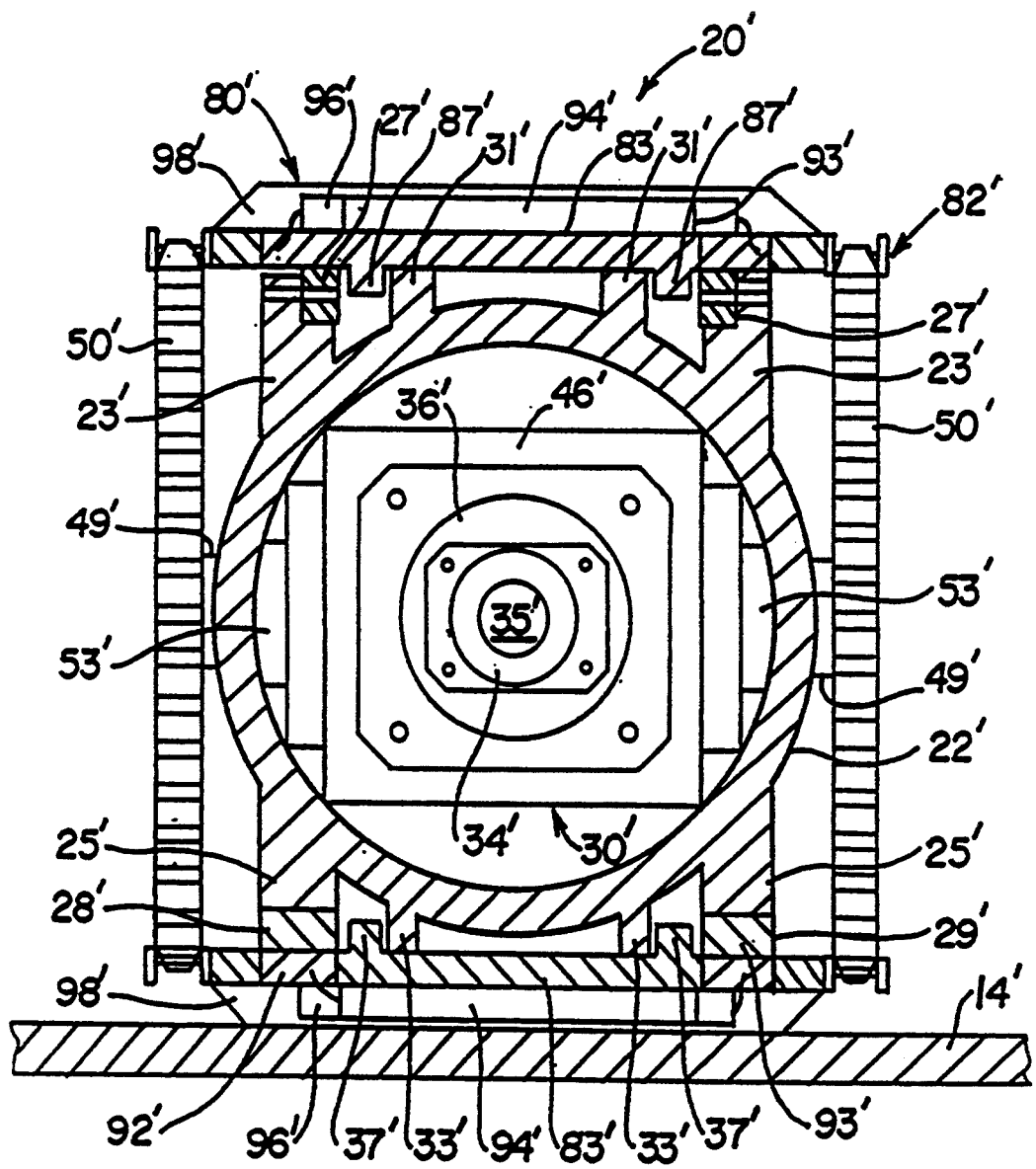
FIG. 9 is a partial cross-sectional elevational view of another track module of the present invention.
Figure 10:
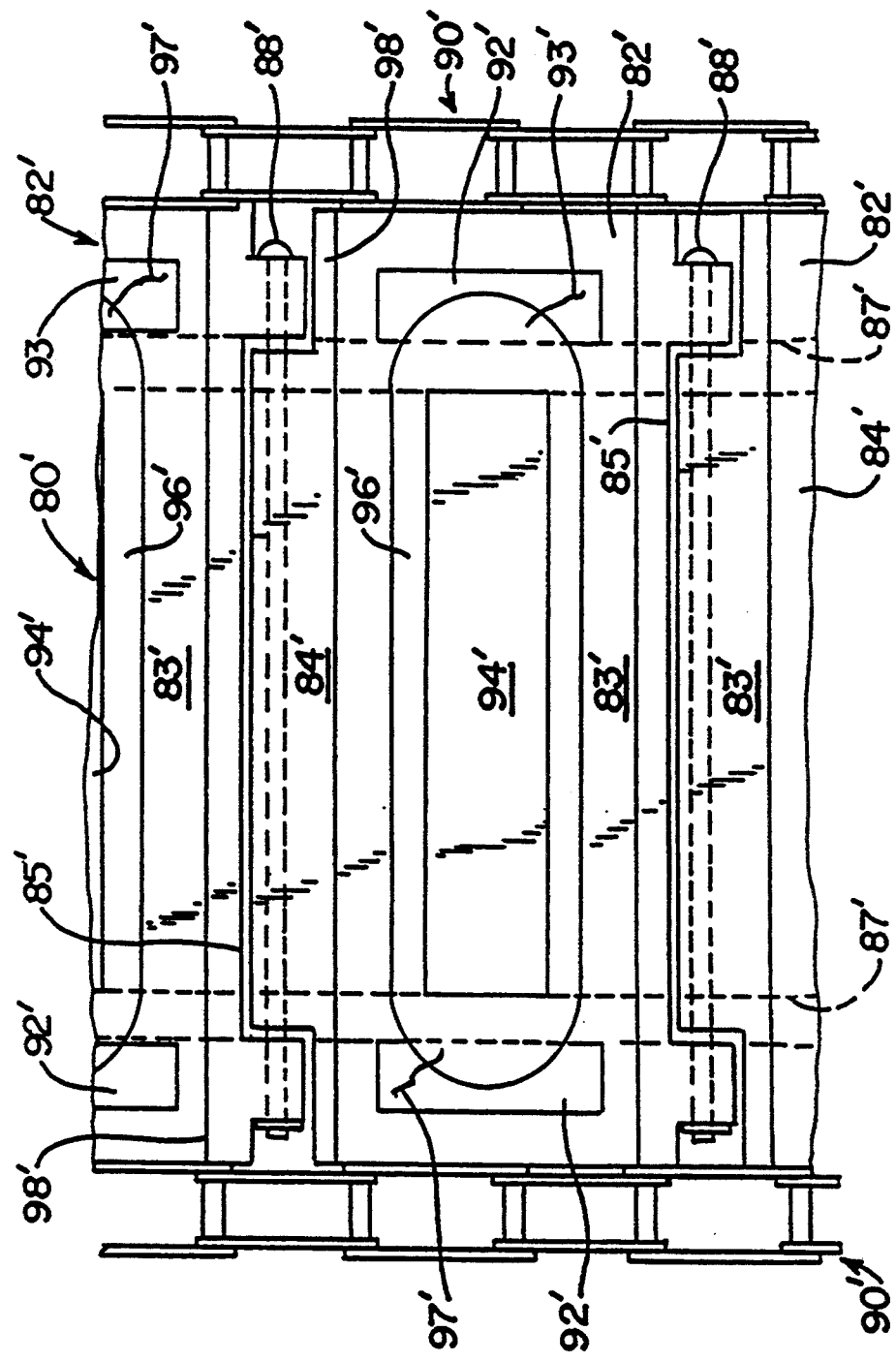
FIG. 10 is a top view of a portion of the endless track of the track module of FIG. 9.
Figure 11:
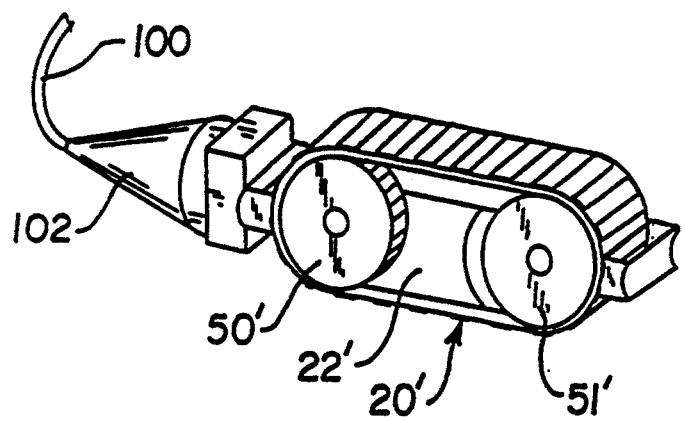
FIG. 11 is a perspective view of a vehicle powered by a single track module of FIG. 2.

Another track module embodiment is depicted in FIGS. 9-11. In that embodiment, the track module 20' comprises a housing member 22' that is preferably fabricated from non-magnetic stainless steel or other material having similar properties thereto. Housed within the housing 22' is a drive unit 30' that is powered by an electrically powered motor 34' that is equipped with a resolver/brake 35'. The motor 34' can be of the type described hereinabove; however, the skilled artisan will readily appreciate that other pneumatically or hydraulically powered motors may also be used.

Attached to the output shaft (not shown) of the motor 34' are planetary gears 36'. The output shaft (not shown) from the planetary gears 36' is operatively coupled to a bevel gear box 46' that has an output shaft 49' extending therefrom on both sides thereof as shown in FIG. 9. Output shaft 49' extends through the housing 22' to receive thereon drive sprockets 50'. Seals 53', fabricated from material that is compatible with the materials and environment in which the module 20' will be operating are provided in a known manner around output shaft 49' to provided a fluid-tight seal between the shaft 49' and the housing 22'. Two additional idler sprockets 51' are mounted to the other end of the track module 20' but are not interconnected to the above-described drive train 30'.

As can most particularly be seen in FIG. 9, the housing 22' is equipped with two upwardly extending longitudinal support members 23' that extend along the length of the housing 22'. The upwardly extending longitudinal support members 23' have rotatably pinned thereto, along the length thereof, support rollers 27' that rollably support the endless track 80' on the housing 22'. In addition, the housing 22' also has two downwardly extending longitudinal support members 25' that extend along the length of the housing 22'. One support member 25' has a copper bar 28' attached thereto and extends along the length thereof and the other support member 25' has a copper bar 29' attached thereto as shown in FIG. 9.

FIGS. 9 and 10 illustrate the preferred endless track construction for this embodiment of the present invention. As can be seen in those Figures, the endless track 80' consists of a plurality of pivotally interconnected cleat members 82'. Each cleat member 82' comprises a base member 83' that is preferably fabricated from stainless steel in the illustrated configuration. Each base member 83' is equipped with an extended portion 84' and a recessed portion 85' and are pivotally interconnected to adjacent base members 83' as shown in FIG. 10 by a removable pin member 88'. Drive chains 90' are also removably attached (e.g., by screws) to the ends of the base members 83' to enable the endless track 80' to be received on sprockets 50' and 51'. Each base member 83' is equipped with two downwardly extending bosses 87' that are received between the support rollers 27' and two upwardly extending guide members 31' that extend along the upper length of the housing 22'. The bottom portion of the housing 22' is also preferably provided with two downwardly extending guide members 33' that serve to retain the bosses 87' between the guide members 33' and the downwardly extending longitudinal support members 25' to restrict the lateral travel of the track 80' on the housing 22'.

Attached to each of the base members 83' by, for example, mechanical fasteners such as cap screws (not shown) are two copper plate members 92' and 93'. In addition, each base member 83' has attached thereto (by mechanical fasteners such as screws—not shown) a plate member 94' preferably fabricated from iron or similar material. Each plate member 94' has a wire winding around the perimeter thereof that consists of a plurality of wires that are collectively designated as 96' in FIGS. 9 and 10. As can most particularly be seen in FIG. 10, the winding 96' is attached to the copper bars 92' and 93' by lead wires 97'. Preferably, the entire plate and winding assembly is encapsulated in an epoxy potting material generally designated as 98'.

The magnetic attraction between the track cleats 82' located along the bottom of the housing 22' and the surface 14' upon which the track module is riding is selectively achieved as follows. Electrical power is supplied to the copper bar 28' via a lead wire (not shown). The reader will appreciate that electrical power is supplied to the track module by the tether 100' and the tether termination member 102' in the same manner as was described above. As the cleats 82' are driven along the bottom of the housing 22' by the drive sprockets 52' the copper bars 92' of each cleat are brought into electrical contact with the copper bars 28' attached to the housing 22'. Electrical current flows from the copper bar 28' through the copper bars 92' on each cleat 82', through the lead wires 97' and into the winding 96' of each cleat 82'. The electrical circuit is completed by contact between the copper bars 93' and copper bar 29'. The skilled artisan will readily appreciate that the above-described arrangement causes each track cleat 82 to function as an electro-magnet which magnetically engages the steel surface 14' upon which the track module 20' is riding. To discontinue the magnetic engagement of the track module 20' with the surface 14', the electrical power supplied to the copper bar 28' is discontinued. The skilled artisan will readily appreciate that if power is lost to the vehicle, the endless track 80' will no longer magnetically engage the surface 14' upon which it is traveling. Therefore, the vehicle 10 can then be easily retrieved from the vessel without being hampered by the magnetic attraction of the track 80' with the walls of the vessel. As such, this embodiment of the present invention is most advantageous when compared to vehicles having permanent magnets affixed to their tracks, as those vehicles are much more difficult to retrieve from the vessel due to their continuous magnetic attraction with the walls of the vessel. Also, the permanent magnet cleats of such vehicles can become fouled with loose magnetic material that is found within the vessel.

Figure 12:
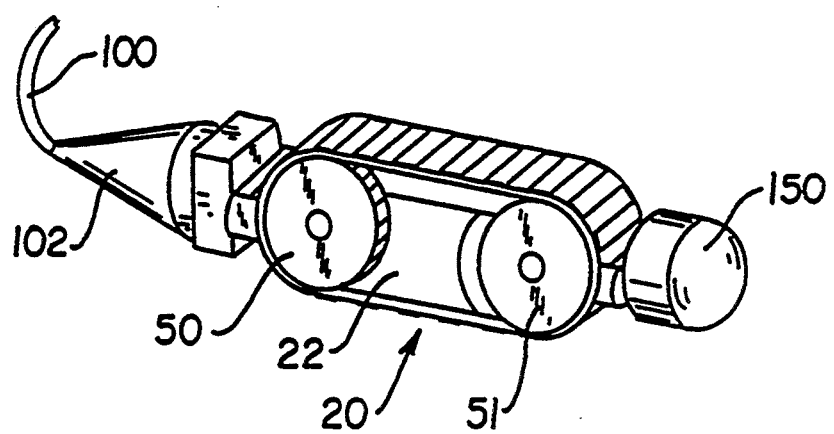
FIG. 12 is a perspective view of a vehicle powered by a track module of FIG. 9.
Figure 13:
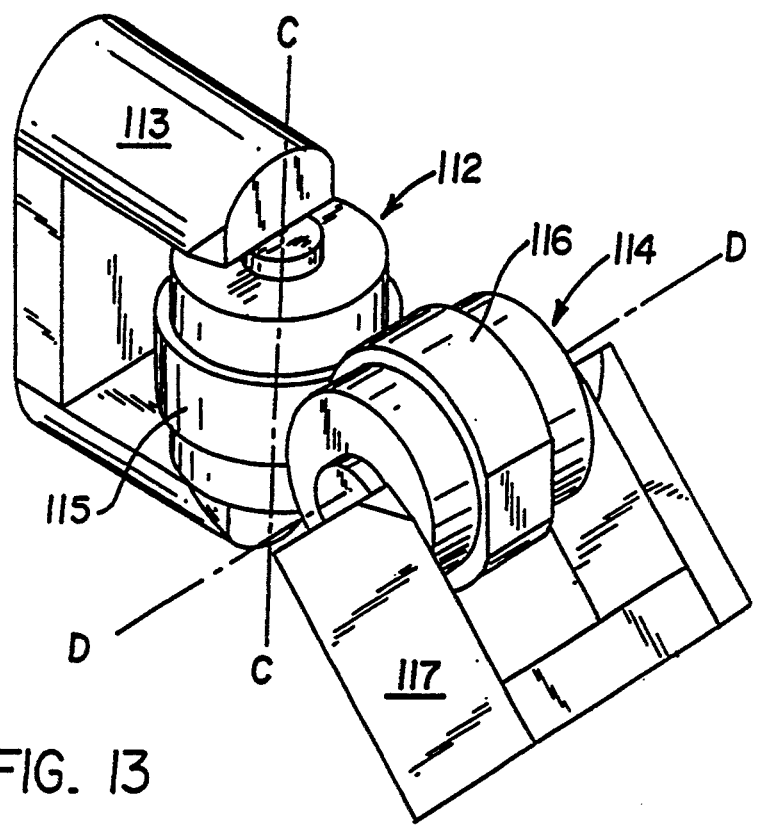
FIG. 13 is a perspective assembly view of a steering module of the present invention.
Figure 14:
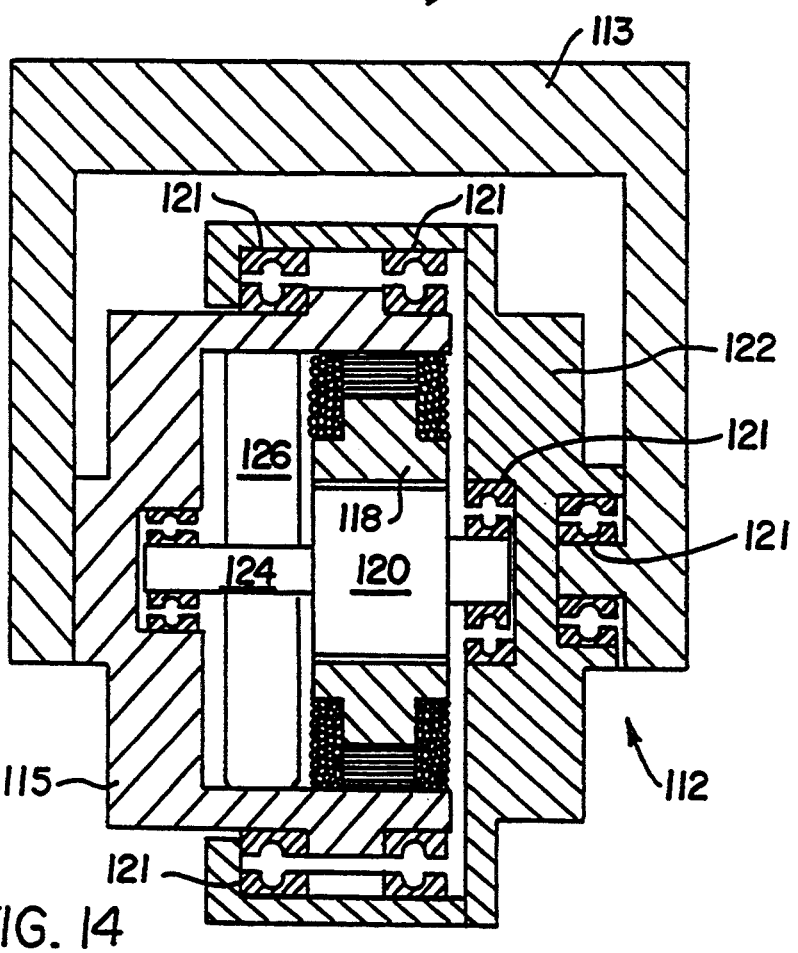
FIG. 14 is a is a cross-sectional view of a typical pitch/yaw actuator of the steering module of FIG. 13.

As illustrated in FIG. 12, a single track module 20 can be adapted for travel in an enclosed environment regardless of which magnetic system arrangement is used. Such single track vehicle is particularly well adapted to travel into continuous pipelines for performing a variety of tasks therein. Operational power is supplied to the module by the tether 100. A camera and other inspection and sampling devices (as will be discussed in further detail below) may be attached to the housing 22 of the track module 20. A preferred embodiment, as shown in FIG. 1 utilizes a plurality of (preferably two) track modules 20 connected in serial arrangement by steering modules 110. In that embodiment, a separate sensor module 130, housing various sensor apparatuses and components, is received between the steering modules 110. As shown in FIGS. 13 and 14, a steering module 110 preferably comprises a yaw actuator 112 and a pitch actuator 114 that are operably interconnected together. More specifically, the yaw actuator 112 is attached to the frame 132 of the sensor module 130 by an output brace 113 and is arranged to selectively provide pivotal motion about a yaw axis "C-C". Rigidly attached to the rotary output collar 115 of the yaw actuator 112 is the rotary output collar 116 of the pitch actuator 114. The pitch actuator 114 is similarly attached to the housing of the track module 20 by an output brace 117. In a preferred embodiment, the yaw actuator 112 and the pitch actuator 114 are substantially identical in construction. Accordingly, the preferred construction of the yaw actuator 112 will be herein described with it being understood that the pitch actuator 114 is preferably constructed in a similar manner.

The yaw actuator 112, as shown in FIG. 14, preferably comprises a motor stator 118 and a rotor 120 arranged and rotatably supported on a collection of bearings 121 housed within an input housing 122 that is rotatably affixed to the output brace 113. Attached to the rotor 120 is an input shaft 124 that has an input gear 126 affixed thereto. Input gear 126 is arranged in meshing engagement with rotary output collar 115 which is rigidly affixed to the output brace 113. The skilled artisan will understand that by supplying electrical current to the stator 118 rotational movement of the rotor 120 and, ultimately, the output collar 115 and brace 113 can be achieved. Thus, by selectively powering the yaw actuator 112 and pitch actuator 114, the track module 20 can be made to rotate around yaw axis "C-C" and a pitch axis "D-D" to permit the vehicle 10 to assume a variety of different configurations as will be discussed in further detail below. The skilled artisan will also appreciate that a myriad of other known pitch/yaw actuator arrangements may be used without departing from the spirit and scope of the present invention.

As was briefly discussed above, in this embodiment, the vehicle 10 is provided with a sensor module 130 that can carry a variety of different sensing and operational components. In particular, the sensor module 130 comprises a frame member 132 that is preferably removably attached to the output braces 113 and 117 of the steering modules 110 as illustrated in FIG. 1. Attached to the frame 132 is a preferably fluid-tight housing member 134 configured as shown in FIG. 1. Although the housing 134 may be used to house a variety of different components, we prefer to include therein an ultrasonic inspection sensor for ultrasonically inspecting and analyzing the thickness and integrity of the surface upon which the vehicle 10 is traveling. It will be appreciated that a variety of commercially available ultrasonic sensors/transducer systems may be successfully used. For example, the OPTIMA ultrasonic/transducer systems manufactured by NDT Instruments of 15751 Graham Street, Huntington Beach, Calif. 92649 or the P-SCAN ultrasonic corrosion mapping system, manufactured by Force Institute and distributed by Swain Distribution, Inc. of No. 2 Research Drive, P.O. Box 99, Searcy, Ariz. 72143 are well-adapted for this application. The skilled artisan will also readily appreciate that the output signals from the ultrasonic sensors can be analyzed and manipulated by known methods and computer software packages to develop contour models and displays of the portion of the vessel wall being analyzed. The information received from such analysis can be used in known statistical models for predicting when a particular wall cross section may fail. Such information is invaluable in performing preventative maintenance tasks to prevent the future rupture of deteriorating tank wall sections.

To assist with steering the vehicle 10 within an enclosed area or vessel where human access is prohibited, known acoustical navigation systems, represented by transponder 140 are preferably used. For example, the SHARPS acoustic positioning system manufactured by the Marquest Group of 8 Otis Park Drive, Bourne, Mass. 02532 is well adapted for this purpose. It will be appreciated by those of ordinary skill in the art that, through known methods, the location of the vehicle 10 can be constantly ascertained and communicated to the operating personnel located outside of the enclosed area or vessel to ensure that every portion of the vessel wall is ultrasonically analyzed.

Also in a preferred embodiment, one of the track modules 20 is preferably equipped with a camera 150 to transmit a video picture to the personnel located outside of the vessel. For example, the camera/video systems manufactured by Benthos Inc. of 49 Edgerton Drive, North Falmouth Mass. 02556-2826 or the video systems manufactured Crestone Products, Inc. of 4175 W. Quail Ridge Dr., Boise, Id. 83703 are well adapted for this purpose.

In addition to the above-mentioned components, the skilled artisan will appreciate that a variety of other sensors and apparatuses may be attached to and deployed with the vehicle 10. For example, depending upon the type of environment in which the vehicle 10 will be operating, the sensor module may contain vapor sensors, radiation detectors and other sampling and detection devices. It will be further appreciated that the vehicle 10 may be equipped with high or low pressure spraying apparatuses for cleaning purposes. Also, the present vehicle may be equipped with a variety of known material handling apparatuses such as manipulators, plows, etc. that are sized to permit entry through a constrained opening such as a pipe riser or manway.

Figure 15:
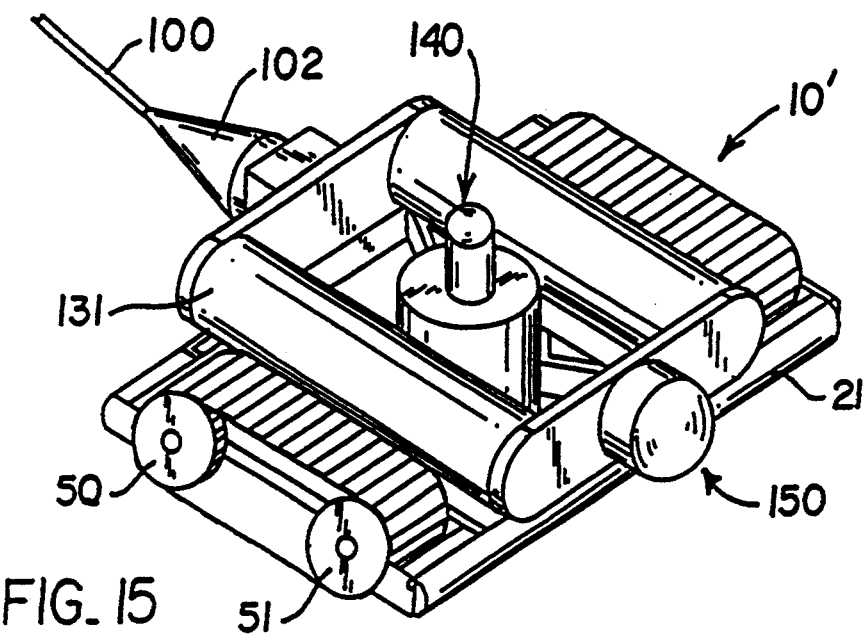
FIG. 15 is a perspective view of another vehicle configuration the present invention.

In another embodiment, as shown in FIG. 15, the vehicle 10' has a frame member and two track modules 20 attached thereto in a parallel configuration. In that embodiment, the above-mentioned sensing and control components are housed in lateral housing members 131. In addition, the acoustic navigational transponder 140 is situated in the center of the vehicle 10'. Control power is supplied to the vehicle by the tether 100 that is connected thereto by tether termination member 102. The video camera system 150 is also attached to the vehicle 10 as shown in FIG. 15. The reader will appreciate that this embodiment is suited for entry into vessels that have somewhat larger access points such as, for example, aboveground storage tanks. Preferably, the above described track modules 20 and steering modules 110 are removably interconnected such that they may be quickly and easily assembled in a serial arrangement (FIG. 1) or they may be attached in a parallel arrangement (FIG. 15) by using simple hand tools.

As was mentioned above, control power is supplied to the vehicle (10, 10') through tether 100. It will be appreciated that the output lines from the above mentioned components are also housed in the tether 100. In addition to supplying the control power to the vehicle (10, 10'), the tether 100 provides a means whereby the vehicle (10, 10') can be deployed into and retrieved from an enclosed vessel. Such tether lines are known in the art and the tether lines such as the ones manufactured by BIW Cable Systems, Inc. of 22 Joseph E. Warner Blvd. No. Dighton, Mass. 02764 are well suited for this application. In addition, a tether line management system, generally designated as 170, such as one of the systems manufactured by Dynacon, Inc., 831 Industrial Blvd., Bryan, Tex. 77803 is particularly suited for controlling the deployment and retrieval of the tether line 100 from an enclosed vessel.

Figure 16:
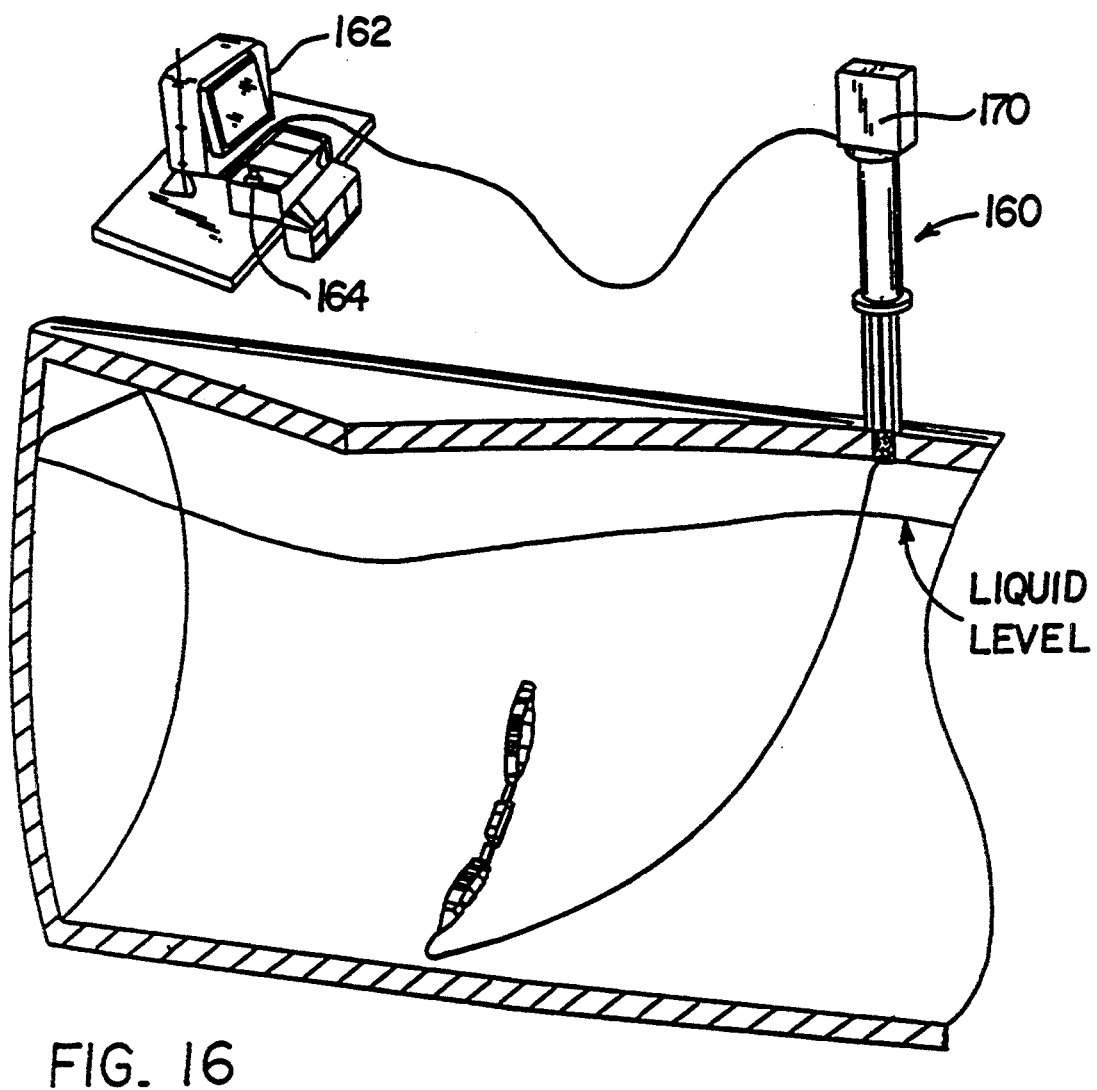
FIG. 16 is a partial cross-sectional perspective view of the vehicle of FIG. 1 deployed in a vessel containing a liquid.

The tether line management system 170 can be externally mounted on a deployment pod 160 (See FIG. 16) or preferably is housed within a deployment pod 160. The deployment pod 160 is preferably designed to achieve an airtight seal around the vessel's entry point to prevent fumes, vapors, etc. from escaping into the atmosphere. A deployment pod equipped and having the capabilities of the deployment pod disclosed in U.S. patent application Ser. No. 08/041,563, the disclosure of which is hereby incorporated by reference, is preferably used to control the deployment, retrieval, decontamination and storage of the vehicle 10.

In a preferred embodiment, the vehicle (10, 10') is controlled from a control console 162 that contains the controls and monitors for the various components attached to the vehicle 10. The preferred method of operation for controlling the driving of the track modules 20 comprises a known joy stick control system, generally designated as 164, such as one of the joy stick control systems manufactured by RedZone Robotics, Inc. of 2425 Liberty Avenue, Pittsburgh, Pa. 15222-4639. As illustrated in FIGS. 16–19, the vehicle 10 can assume a variety of configurations by magnetically engaging one track module 20 with the vessel surface and manipulating the other track module 20, by means of the appropriate steering assembly 110 to cause it to be pivoted about the yaw axis "C-C" and/or pitch axis "D-D" thereof to cause that track module 20 to assume the desired orientation. That track module 20 can then be caused to magnetically engage the vessel surface and the vehicle 10 can then be driven thereon in that configuration. It will be readily appreciated that, by magnetically engaging one or both track modules 20 with the vessel surface in various sequences, a variety of different vehicle configurations such as those illustrated in FIGS. 16–19 can be achieved. The skilled artisan will also appreciate that the configurations illustrated in FIGS. 16–19 are just a few of the myriad of different configurations that the vehicle 10 can assume and, as such, those Figures should not be construed as depicting the universe of vehicle configurations attainable by the present invention. With respect to the vehicle 10' as shown in FIG. 15, it will be understood that the vehicle 10' is controlled and steered by the joy stick assembly in much the same manner as are known parallel tracked vehicles. However, either or both of the track modules 20 may be selectively caused to magnetically engage or disengage the vessel surface as desired to assist with steering the vehicle 10' or to enable it to traverse along vertical or suspended surfaces.

The reader will also appreciate that the vehicle (10, 10') is particularly well adapted for deployment into vessels containing a variety of different liquids. See FIG. 16. In those applications, however, the skilled artisan will appreciate that the operational components and control wiring must be properly sealed to avoid exposure to the liquid. In those applications wherein the liquid is combustible, all electrical connections are explosion proof in accordance with the various state and federal regulations governing such applications. In addition, the skilled artisan will readily appreciate that the construction of the present invention lends itself well to quick disassembly and reassembly in a desired configuration. For example, the track modules 20 can be easily disassembled from the steering assemblies 110 and reattached to a vehicle frame component such that the track modules 20 are arranged in the parallel configuration as illustrated in FIG. 15. Similarly, the sensor module 130 may be quickly detached from the steering assemblies 110 and another sensor module or module containing material handling or manipulation devices may be reattached.

In another preferred embodiment, as shown in FIG. 20, the vehicle 210 is propelled by two locomotor track modules 330 that are arranged in a permanent parallel configuration. Although specific dimensions for the various components of vehicle 210 will not be herein disclosed, the skilled artisan will readily appreciate that the various components comprising vehicle 210 can be sized such that the vehicle 210 can be admitted through a constrained opening in a tank, vessel or other area wherein access is limited.

This embodiment utilizes a unique method for explosion proofing or "safing" the vehicle 210 so that it can be safely used in tanks/vessels containing flammable/combustible materials such as, for example, kerosene, gasoline, jet-fuel, or other light-crude derivatives. As will be discussed in further detail below, the present vehicle safing method preferably comprises placing all of the vehicle's on-board electronic components inside enclosures which are sealed and internally pressurized to a predetermined pressure before deployment. During operation of the vehicle, the temperature and pressure of each pressurized enclosure is carefully monitored using known monitoring techniques and apparatus to detect any deviation therein. The system's pressure and temperature sensors interface with on-board microprocessors which relay the information to an operator console located outside of the tank. Preferably, software backups are provided for triggering a shut-down of the vehicle 210 under anomalous pressure and temperature conditions, should the operator not act on warnings displayed on the control console after a predetermined period of time has lapsed.

Unless otherwise noted, the structural members and enclosures of the vehicle 210, a preferred construction of which will be discussed in detail below, are preferably fabricated from 6061-T6 aluminum and/or 304 or 316 stainless steel. While other materials such as carbon steel and similar materials can be satisfactorily used, it has been found that the aforementioned materials provide optimum corrosion resistance and dimensional stability in the presence of temperature variations. Those of ordinary skill in the art will also appreciate that the exposed portions of such components could also be "hard-coat" anodized by methods known in the art to reduce gouging and scratching of those components during operation.

As will also be discussed in detail below, the various component enclosures of vehicle 210 are preferably sealed with appropriately sized O-rings. Unless otherwise noted, the O-rings used in this embodiment are preferably fabricated from vinylidene fluoride hexafluoropropylene available from E. I. Du Pont de Nemours & Company under the trademark VITON and are coated with tetrafluoroethylene that is also available from E. I. Du Pont de Nemours & Company under the trademark TEFLON. However, the O-rings used in vehicle 210 can be fabricated from a variety of other materials that are compatible with the environment in which the vehicle 210 is used. In addition, each enclosure interface on vehicle 210 preferably has a double O-ring seal. The skilled artisan will appreciate, however, that other known sealing schemes may be used to achieve a substantially hermetic seal in the various component enclosures while selectively permitting access to the components housed therein. Thus, the scope of protection afforded to this and other preferred embodiments, should not be limited to enclosures that are fabricated from 6061-T6 aluminum and/or 304 or 316 stainless steel and utilize at least two teflon coated viton O-rings as sealing mediums.

Figure 21:
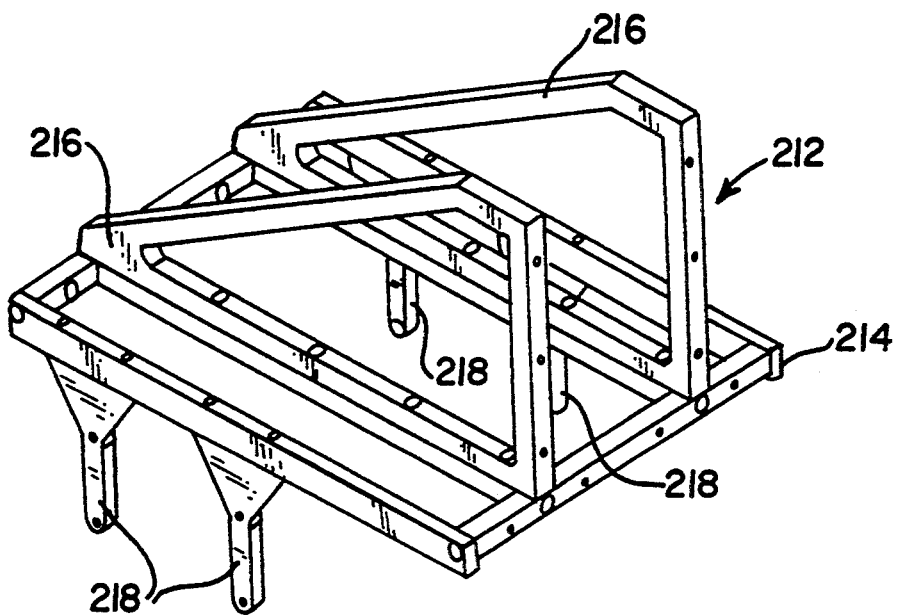
FIG. 21 is a perspective view of the frame of the vehicle depicted in FIG. 20.

In a preferred form, the vehicle 210 has a frame 212 that is configured as shown in FIG. 21. In particular, the frame 212 has a rectangular base member 214 that has two upwardly extending strut members 216 attached thereto preferably by appropriately sized capscrews or bolts fabricated from 303 stainless steel. However, frame 212 can be of welded construction or assembled with other types of known fasteners fabricated from a variety of other materials that are compatible with the environment in which the vehicle 210 is to be used. As can also be seen in FIG. 21, the frame member 212 has four downwardly extending locomotor attachment lugs 218 bolted thereto. The reader will appreciate that such frame construction makes it possible to adjust the amount of clearance between the frame 212 and the surface upon which the vehicle is riding by varying the length of the locomotor lugs 218. Preferably, the frame 212 is configured such that a telemetry enclosure 250, an electronics enclosure 260, an ultra-sonic detection enclosure 270, a navigation components enclosure 280, a camera enclosure 290, and two locomotor track modules 330 can be attached thereto in a preferred configuration as depicted in FIG. 20.

Figure 22:
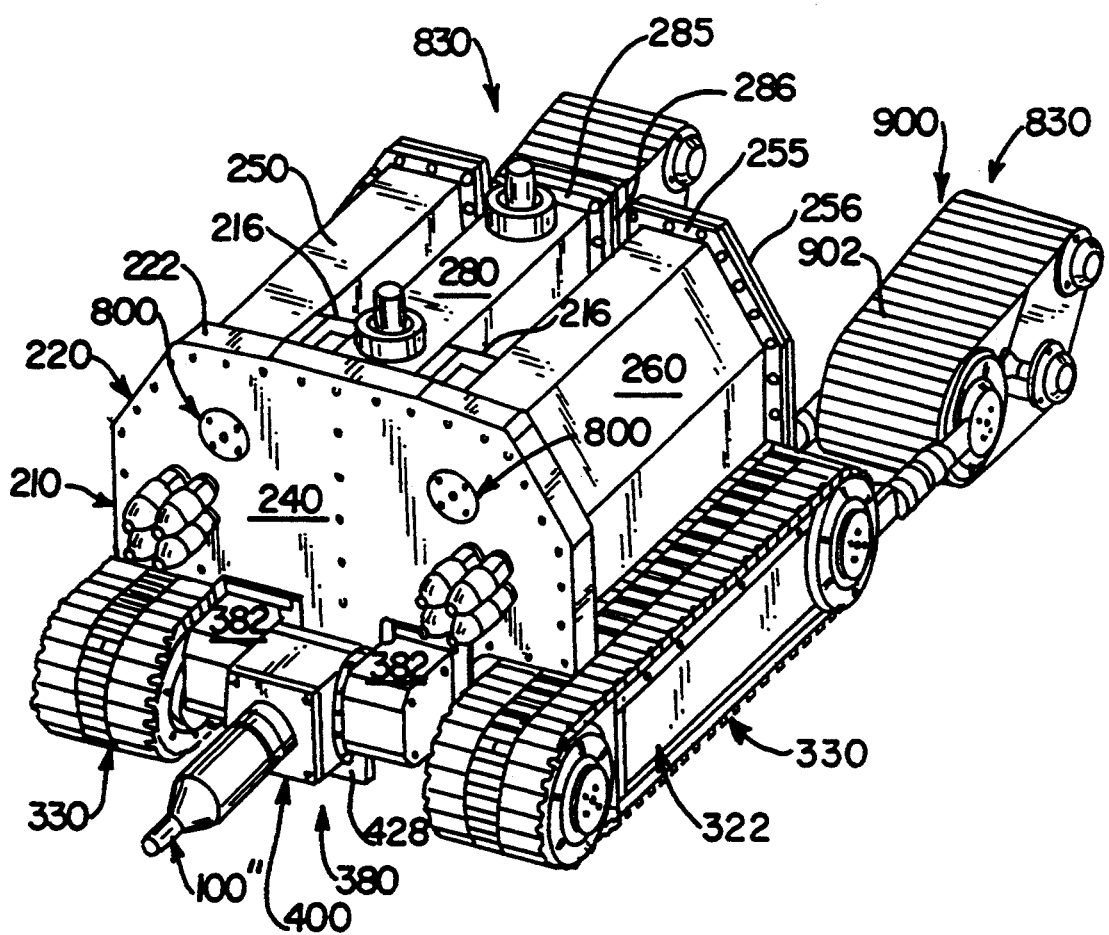
FIG. 22 is a rear perspective view of the vehicle of FIG. 20.

As can be seen in FIGS. 20 and 22, the frame 212 has an enclosure end plate assembly 220 attached thereto that serves as the main structural element of the vehicle 210 because it supports and connects all of the above-mentioned enclosures in a common plane. In its preferred form, the end plate assembly 220 comprises an inner plate member 222 and outer end plate member 240. The inner plate member 222 is preferably bolted to the upwardly extending strut members 216 in the position shown in FIG. 20. In a preferred embodiment, the inner plate 222 has shallow recesses machined therein (not shown) that are adapted to receive the corresponding portions of the frame 212 to assist in the assembly of the vehicle 210.

Figure 23:
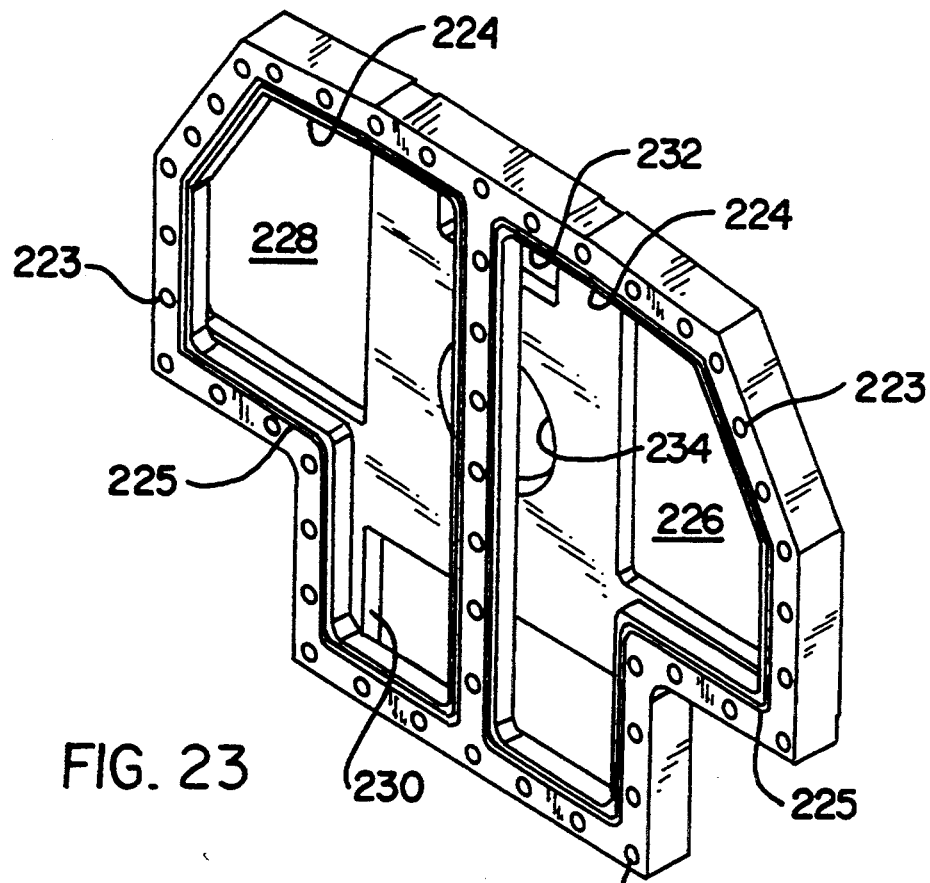
FIG. 23 is a perspective view of a preferred inner plate of the vehicle of FIG. 20.
Figure 24:
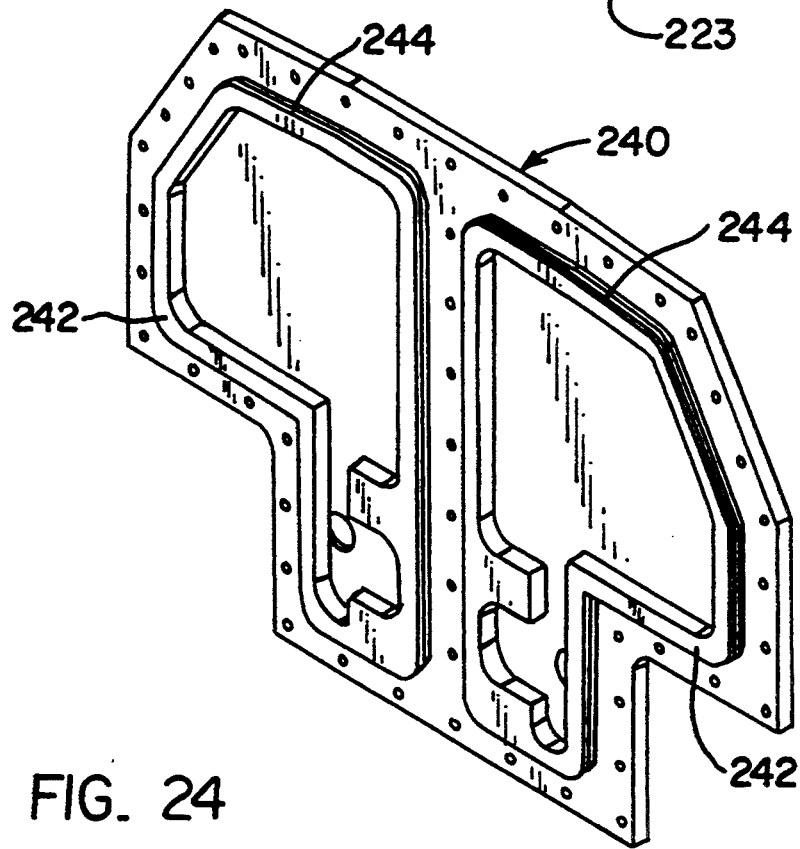
FIG. 24 is a perspective view of a preferred end plate of the vehicle of FIG. 20.

The side of the inner plate 222 that faces the end plate cover 240 (see FIG. 23) has a plurality of bolt receiving bores 223 therein that are adapted to receive capscrews for attaching the end plate cover 240 to the inner plate 222. Preferably, each bore 223 has a full-body threaded insert of the type manufactured by CAMLOC Products of Hasbrouck Heights, N.J. under the trademark "HELICOIL", to increase the strength and durability of those threaded joints. As can be seen in FIG. 24, the side of the end plate cover 240 that faces the inner plate 222 is preferably provided with a pair of outwardly extending boss members 242 that are adapted to be received in correspondingly shaped cavities 224 provided in the inner plate 222. To achieve a substantially hermetic seal between the inner plate 222 and the end plate cover 240, a groove is provided around each boss 242 for receiving an appropriately sized O-ring 244 therein. In addition, grooves are provided around each opening 224 to receive O-rings 225 therein. Thus, the reader will appreciate that, when the end plate cover 240 is bolted to the inner plate 222, the O-rings 225 and 244 serve to establish and maintain a substantially hermetic seal between the inner plate 222 and the end plate cover 240. The reader will understand that the phrase "substantially hermetic seal" as used herein means a seal that will not permit more than about $10^4$ cm$^3$ of medium to leak therethrough over a period of about 1 hour.

In a preferred embodiment, the inner plate 222 has a plurality of openings therein that enable wires to be routed between the vehicle's various enclosures. The inner plate 222 is also provided with a plurality of bores (not shown) for attaching the various enclosures to the inner plate member 222. Preferably, each bore is equipped with a steel threaded insert of the type described above.

Figure 25:
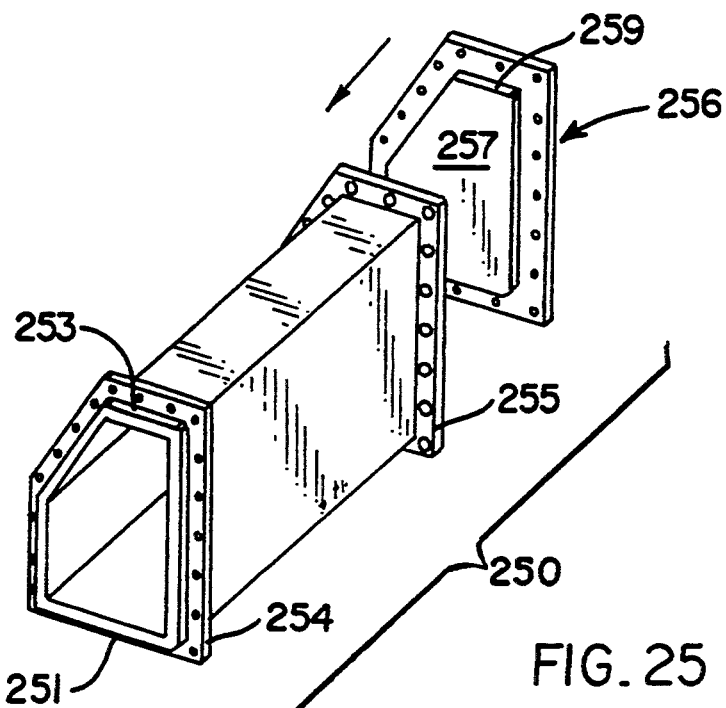
FIG. 25 is an exploded assembly view of a preferred telemetry components enclosure of the vehicle of FIG. 20.
Figure 26:
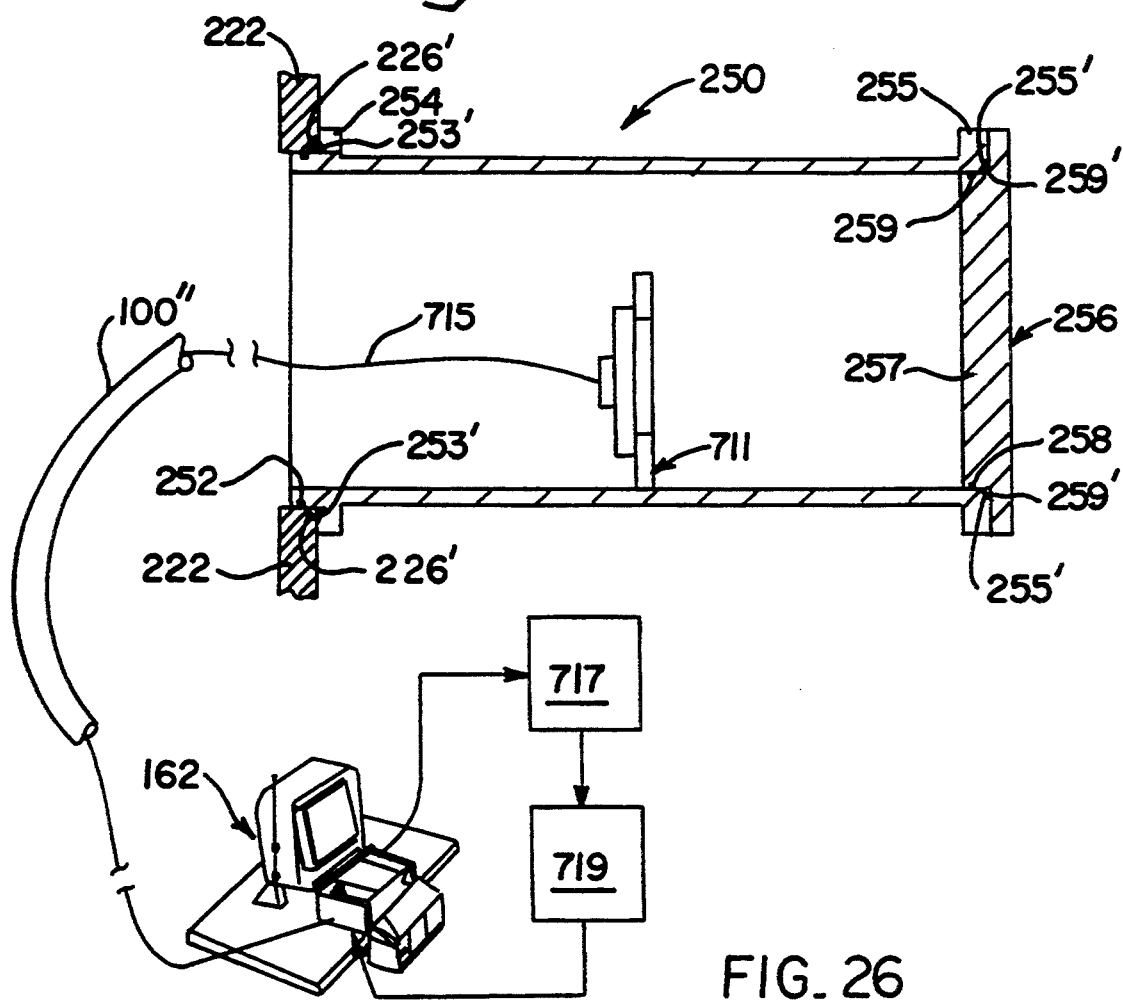
FIG. 26 is a cross-sectional assembly view of the enclosure of FIG. 26 attached to the inner plate of the vehicle of FIG. 20.

As can be seen in FIG. 20, the vehicle 210 preferably has an electronics enclosure 250 attached thereto that is adapted to house various on-board electrical components for controlling the vehicle. The electronics enclosure 250 is preferably shaped as shown in FIGS. 25 and 26, and is fabricated from 6061-T6 aluminum plates that are welded together such that the enclosure 250 can maintain a predetermined amount of pressure (i.e., 500 psig) therein. The end of the enclosure 250 that is adapted for attachment to the inner plate 222 has an outwardly extending boss 251 that is adapted to be sealingly received in a correspondingly shaped opening 226 in the inner plate 222. See FIG. 23. Preferably, boss 251 has a groove 252 that extends around its outer perimeter that is adapted to receive an appropriately sized O-ring 253 therein. Additionally, inner plate 222 preferably has a chamfered edge that extends around the perimeter of opening 226 to create an O-ring receiving cavity 226' between inner plate 222 and an attachment flange 254 attached to the electronics enclosure 250. See FIG. 26. A second O-ring 253' is received in cavity 226' to create a "face" seal between the inner plate 222 and the flange 254. It will be appreciated that flange 254 is equipped with a plurality of bolt holes (not shown) for attaching the electronics enclosure 250 to the inner plate 222. Thus, this preferred attachment arrangement serves to provide a radial seal and a face seal between the electronics enclosure 250 and the inner plate 222.

As can be seen in FIGS. 25 and 26, the free end of the electronics enclosure 250 is equipped with a second flange member 255 that enables an end cap 256 to be removably attached thereto for quick access into the interior of the electronics enclosure 250. To achieve a substantially hermetic seal between the end cap 256 and the enclosure 250, the end cap 256 is preferably provided with an outwardly extending boss member 257 that is sized to be sealingly received in the free end of the enclosure 250. A radial groove 258 is provided around the perimeter of the boss member 257 and is adapted to receive an appropriately sized O-ring 259 therein. Also, a portion of the flange member 255 is chamfered to create an 0-ring receiving cavity 255' between the end cap 256 and the flange 255 for receiving a second O-ring 259' therein. It will be appreciated that when the end cap 256 is attached to the enclosure 250 by appropriately sized fasteners (i.e., No. 10-32 stainless steel capscrews), the O-rings 259 and 259' serve to establish and maintain a substantially hermetic seal between the enclosure 250 and the end cap 256.

The vehicle 210 is also preferably equipped with a telemetry enclosure 260 for housing various on-board components of the vehicle's telemetry system. In a preferred embodiment, the telemetry enclosure 260 is the mirror image of the electronics enclosure 250 and is sealingly received in an opening 228 in inner plate member 222.

The vehicle 210 is also preferably equipped with apparatus for ultrasonically analyzing the integrity of the surface upon which the vehicle 210 is riding. The electronic processing boards for such ultrasonic analysis equipment is preferably housed in an enclosure 270 that is attached to the inner plate 222 such that it extends between the locomotor lugs 218 of the frame 212. The enclosure 270 preferably comprises an electronic seam-welded rectangular box fabricated from ¼" thick 6061-T6 aluminum plates that is adapted to safely contain a gas at a predetermined pressure. The skilled artisan will appreciate, however, that enclosure 270 can be fabricated from a myriad of other materials in alternative manners such that the enclosure 270 can safely maintain a predetermined amount of pressure (i.e., up to 500 psig) therein.

Figure 27:
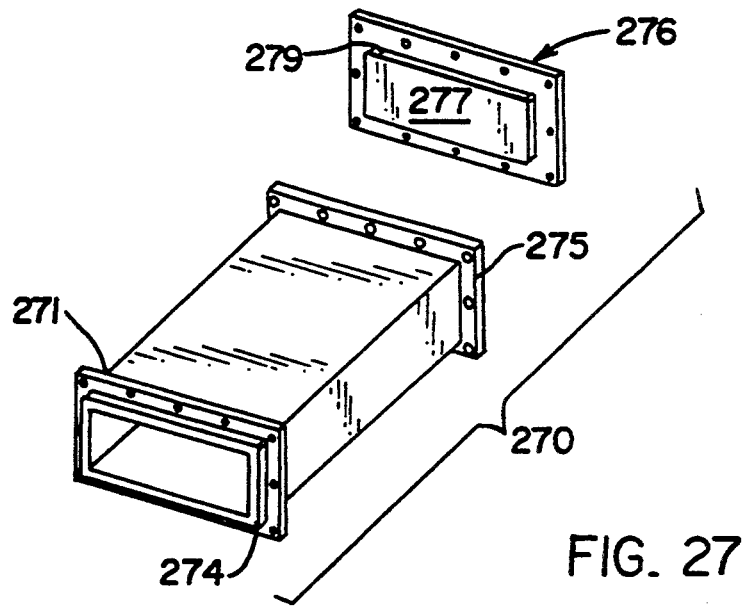
FIG. 27 is an exploded assembly view of a preferred enclosure for housing ultra sonic sensor apparatus of the vehicle of FIG. 20.
Figure 28:
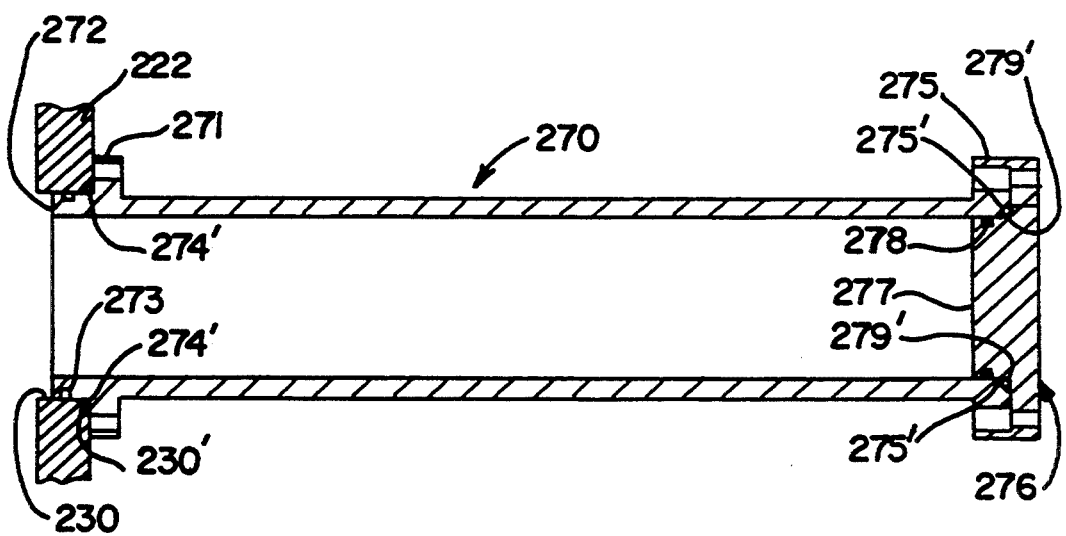
FIG. 28 is a cross-sectional assembly view of the enclosure of FIG. 27 attached to the inner plate of the vehicle of FIG. 20.

As can be seen in FIGS. 27 and 28, the enclosure 270 is attached to the inner plate member 222 by a flange member 271 that has a plurality of holes adapted to permit a plurality of corresponding fasteners to extend therethrough to be threadedly received in corresponding bores provided in the inner plate 222. Preferably, the one end of the enclosure 270 has an outwardly extending boss 272 machined therein that is sized to be sealingly received in a correspondingly shaped opening 230 provided in the inner plate 222. See FIG. 23. To achieve a substantially hermetic seal between the enclosure 270 and the inner plate 222, a groove 273 is provided in the boss 272 that is adapted to receive an appropriately sized O-ring 274 therein. Additionally, inner plate 222 preferably has a chamfered edge that extends around the perimeter of opening 230 to create an O-ring receiving cavity 230' between inner plate 222 and an attachment flange 271 attached to the enclosure 270. See FIG. 28. A second O-ring 274' is received in cavity 230' to create a "face" seal between the inner plate 222 and the flange 271. The O-rings 274 and 274' serve to establish and maintain a substantially hermetic seal between the enclosure 270 and the inner plate 222 when the flange member 271 is bolted to the inner plate 222.

As can be seen in FIGS. 27 and 28, the free end of the enclosure 270 has a second flange member 275 attached thereto that enables a removable end cap 276 to be removably attached thereto for quick access into the interior of the telemetry enclosure 270. To achieve a substantially hermetic seal between the end cap 276 and the enclosure 270, the end cap 276 is preferably provided with an outwardly extending boss member 277 that is sized to be sealingly received in the free end of the enclosure 270. A radial groove 278 is provided around the perimeter of the boss member 277 and is adapted to receive an appropriately sized O-ring 279 therein. Also, a portion of the flange member 275 is chamfered to create an O-ring receiving cavity 275' between the end cap 276 and the flange 275 for receiving a second O-ring 279' therein. It will be appreciated that when the end cap 276 is attached to the enclosure 270 by appropriately sized fasteners (i.e., No. 10-32 stainless steel capscrews), the O-rings 279 and 279' serve to establish and maintain a substantially hermetic seal between the enclosure 270 and the end cap 276.

The vehicle 210 is also preferably equipped with an acoustical navigation system of the type mentioned above. The on-board electrical components for the acoustical navigational system are preferably housed in an enclosure 280 that is preferably a smaller version of enclosure 270. In particular, the enclosure 280 preferably comprises an electronic seam-welded, rectangular box fabricated from ¼" thick 6061-T6 aluminum plates that is adapted to hold a pressurized gas at 60 psig. The skilled artisan will appreciate, however, that enclosure 280 can be fabricated from a myriad of other suitable materials in alternative manners.

Figure 29:
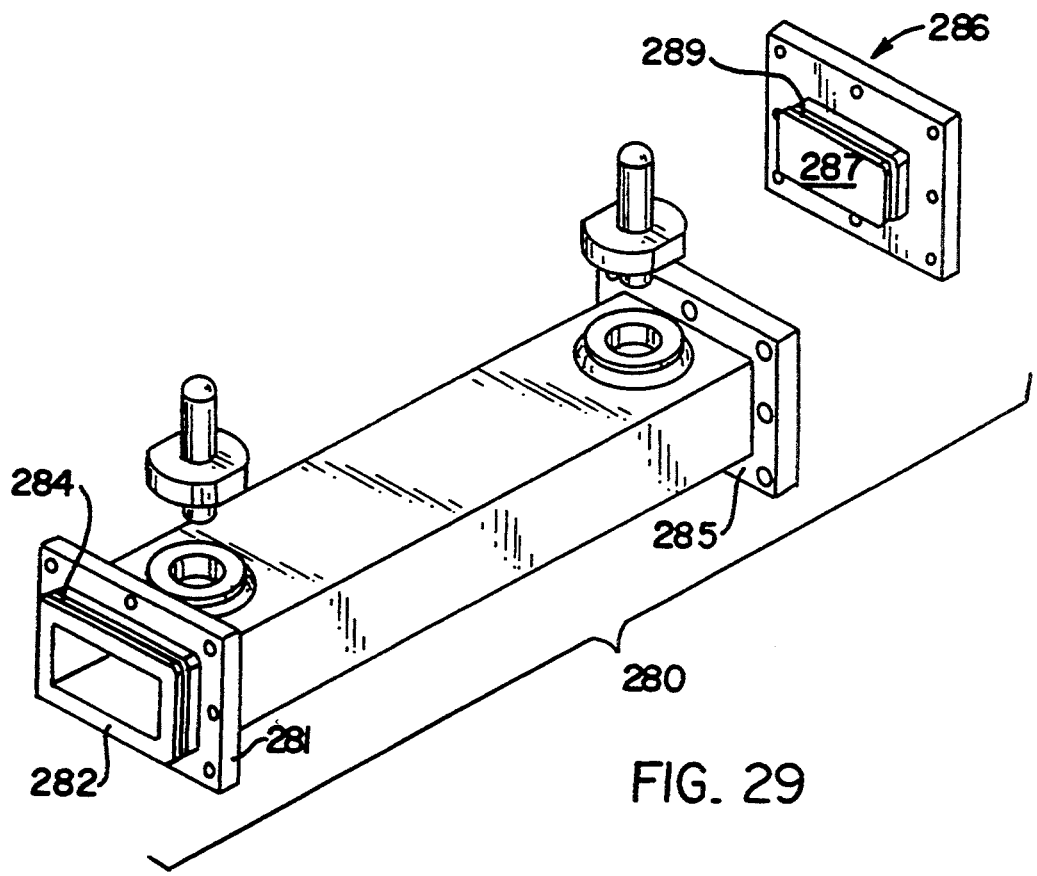
FIG. 29 is an exploded assembly view of a preferred enclosure for housing acoustic navigation components of the vehicle of FIG. 20.
Figure 30:
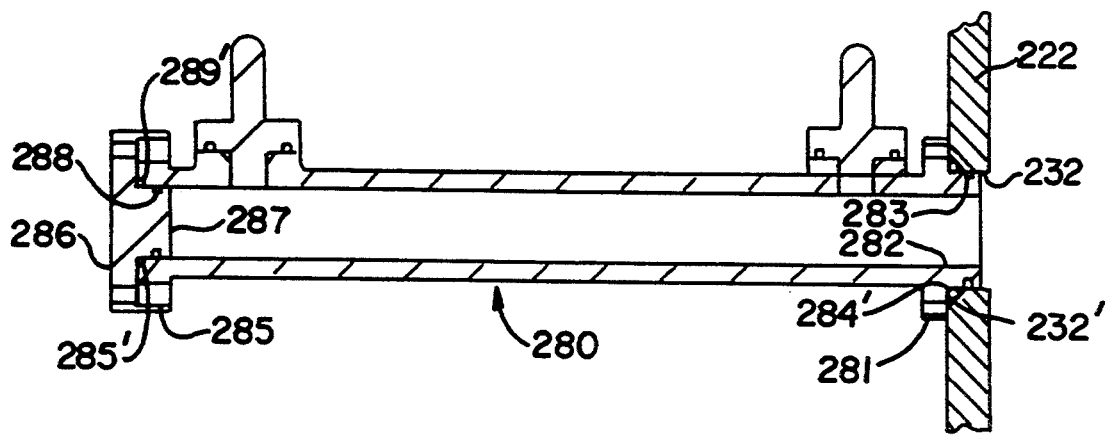
FIG. 30 is a cross-sectional assembly view of the enclosure of FIG. 29 attached to the inner plate of the vehicle of FIG 20.

As can be seen in FIGS. 29 and 30, the enclosure 280 is equipped with a flange member 281 that has a plurality of holes adapted to permit a plurality of corresponding fasteners to extend therethrough to be threadedly received in corresponding bores provided in the inner plate 222. Preferably, the one end of the enclosure 280 has an outwardly extending boss 282 machined therein that is sized to be sealingly received in a correspondingly shaped opening 232 provided in the inner plate 222. See FIGS. 23 and 30. To achieve a substantially hermetic seal between the enclosure 280 and the inner plate 222, a groove 283 is provided in the boss 282 that is adapted to receive an appropriately sized O-ring 284 therein. Additionally, inner plate 222 preferably has a chamfered edge that extends around the perimeter of opening 232 to create an O-ring receiving cavity 232' between inner plate 222 and an attachment flange 281 attached to the enclosure 280. See FIG. 30. A second O-ring 284' is received in cavity 232' to create a "face" seal between the inner plate 222 and the flange 281. The O-rings 284 and 284' serve to establish and maintain a substantially airtight seal between the enclosure 280 and the inner plate 222 when the flange member 281 is bolted to the inner plate 222.

As can also be seen in FIGS. 29 and 30, the free end of the enclosure 280 is equipped with a second flange member 285 that enables an end cap 286 to be removably attached thereto for quick access into the interior of the telemetry enclosure 280. To achieve a substantially hermetic seal between the end cap 286 and the enclosure 280, the end cap 286 is preferably provided with an outwardly extending boss member 287 that is sized to be sealingly received in the free end of the enclosure 280. A radial groove 288 is provided around the perimeter of the boss member 287 and is adapted to receive an appropriately sized O-ring 289 therein. Also, a portion of the flange member 285 is preferably chamfered to create an O-ring receiving cavity 285' between the end cap 286 and the flange 285 for receiving a second O-ring 289' therein. It will be appreciated that when the end cap 276 is attached to the enclosure 270 by appropriately sized fasteners (i.e., No. 10-32 stainless steel capscrews), the O-rings 279 and 279' serve to establish and maintain a substantially hermetic seal between the enclosure 2870 and the end cap 286.

Figure 30A:
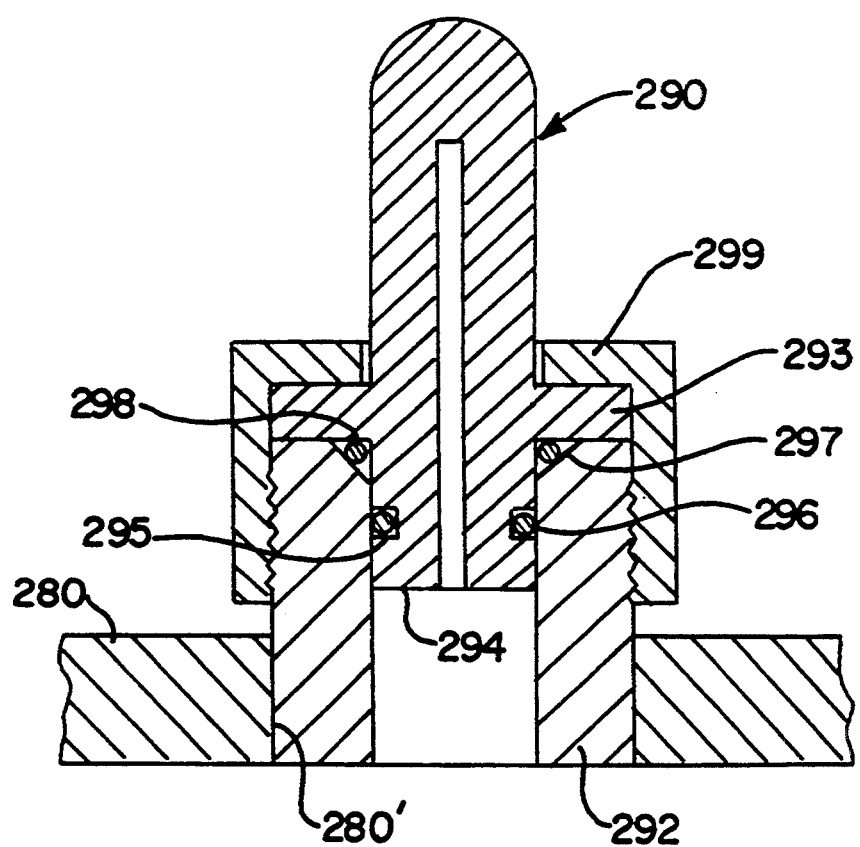
FIG. 30A is a cross sectional assembly view of a preferred acoustic transponder attached to the enclosure of FIGS. 29 and 30.

FIG. 30A illustrates a preferred method of attaching a plurality (preferably two) of commercially available transponders 290 for controlling the navigation of the vehicle 210 in a known manner. Preferably, transponders 290 have an epoxy-potted piezo-electric crystal and are manufactured by Marquest, Inc. of Pocasset, Massachusetts; however, other commercially available transponders may also be successfully used. In a preferred embodiment, an externally threaded attachment sleeve 292 is received within a corresponding bore 280' in enclosure 280 and is attached to enclosure 280 preferably by welding. The bottom of the transponder 290 has a flanged portion 293 that is adapted to be received on the top of the attachment member 292 as shown in FIG. 30A. The transponder 290 also has a hollow sleeve portion 294 that is adapted to receive the transponder control wires (not shown). To achieve a radial seal between the attachment member 292 and the sleeve member 294, a radial groove 295 is provided in the sleeve member 294 for receiving an O-ring 296 therein. Also, to create a face seal between the flange portion 293 and the attachment member 292, the top portion of the attachment member 292 is chamfered to create an O-ring receiving cavity 297 adapted to receive an O-ring 298 therein. Thus, O-rings 296 and 298 serve to create and maintain a substantially hermetic seal between the attachment member and the transponder 290. As can also be seen in FIG. 30A, the transponder 290 is preferably attached to the attachment sleeve by a ring member 299 (preferably fabricated from brass) that is adapted to threadedly engage the outer threaded portion of the attachment member 290. The skilled artisan will appreciate, however, that other methods for hermetically and removably attaching the transponders 290 to the enclosure 280 may also be used.

Figure 31:
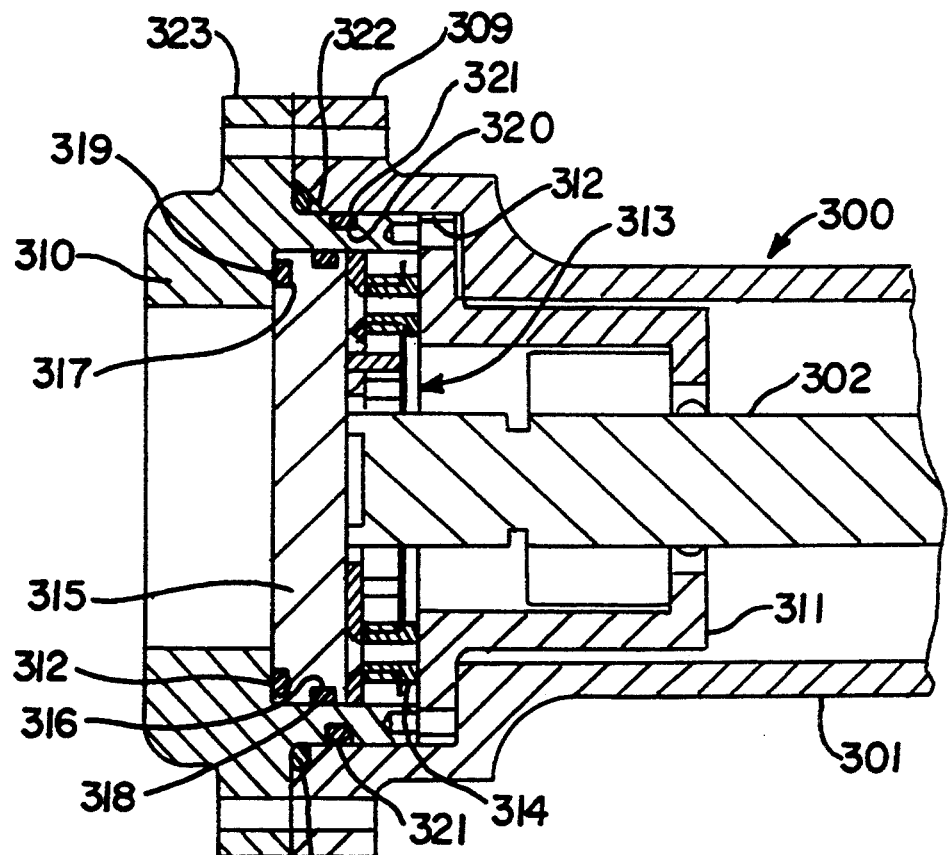
FIG. 31 ms a partial cross-sectional assembly view of a preferred camera enclosure of the vehicle of FIG. 20.
Figure 32:
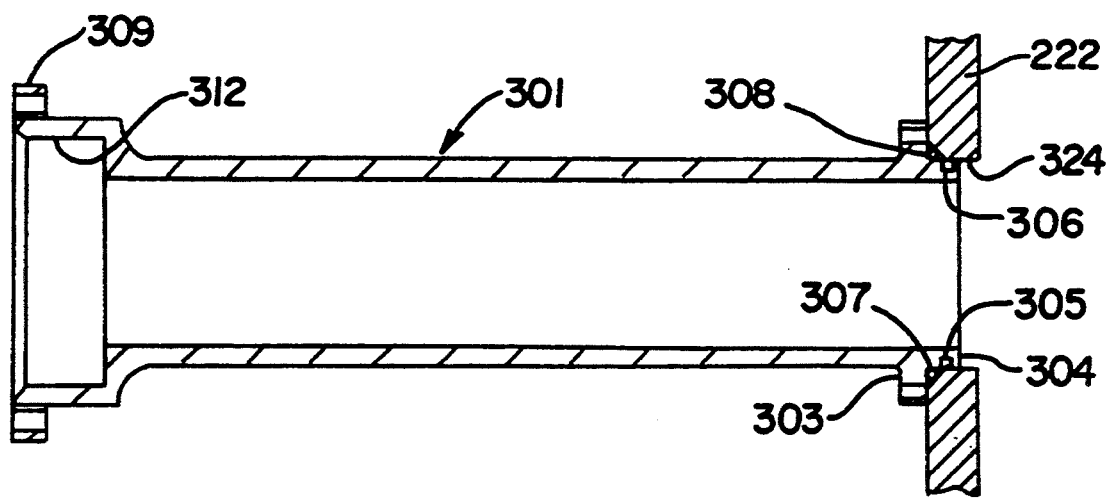
FIG. 32 is a partial cross-sectional assembly view of the enclosure of FIG. 31 attached to the inner plate of the vehicle of FIG. 20.

In a preferred embodiment, the vehicle 210 is also equipped with a miniature video camera 302 such as a SONY color CCD camera that is housed within a camera enclosure 300. As can be seen in FIGS. 31 and 32, the camera enclosure 300 preferably comprises a round cylindrical housing 301 that has a first attachment flange 303 for attachment to the inner plate 222. In particular, flange member 303 has a plurality of holes adapted to permit a plurality of corresponding fasteners (not shown) to extend therethrough to be threadedly received in corresponding bores provided in the inner plate 222. Preferably, one end of the enclosure 300 has an outwardly extending boss 304 that is sized to be sealingly received in a correspondingly shaped opening 234 provided in the inner plate 222. See FIGS. 23 and 32. To achieve a substantially hermetic seal between the enclosure 300 and the inner plate 222, a groove 305 is provided in the boss 304 that is adapted to receive an appropriately sized O-ring 306 therein. As can also be seen in FIG. 32, the inner perimeter of the opening 234 is chamfered to create an O-ring receiving cavity 307 between flange 303 and the inner plate 222. A second O-ring 308 is received in cavity 307 and, in connection with O-ring 306, serves to create a substantially hermetic seal between the enclosure 300 and the inner plate 222 when the flange member 303 is bolted to the inner plate 222.

As can also be seen in FIGS. 31 and 32, the free end of the enclosure 300 has a second flange member 309 attached thereto that enables a removable end cap 310 to be removably attached thereto for quick access to the camera 302. More specifically, in a preferred embodiment, the camera 302 is concentrically supported by a retaining bracket 311 that is adapted to be received in a cavity 312 provided in the housing 300. Also in a preferred embodiment, a lighting ring 313, containing a plurality (preferably ten) miniature cool halogen lamps 314 which can be individually controlled to deliver a desired level of illumination is received within the housing 300. The halogen lamps 314 are controlled from a commercially available PC-board (not shown) that is interfaced with an on-board microprocessor (not shown) using known control techniques. As can be most particularly seen in FIG. 31, the lighting ring 313 is adapted to be retained between a view port 315 and the camera retaining bracket 311. Preferably, view port 315 is fabricated from ⅜" thick PYREX glass and has a pair of grooves 316 and 317 in which O-rings 318 and 319 are respectively received to achieve a substantially hermetic seal between the view port 315 and the end cap 310. To achieve a substantially hermetic seal between the enclosure housing 301 and the end cap 310, a groove 320 is provided in the end cap 310 for receiving an O-ring 321 therein. Also, as can be seen in FIG. 32, the outer edge of cavity 312 is chamfered to create an O-ring receiving cavity 322 between the flange 323 of end cap 310 and flange 309 on enclosure housing 301 when the flange 323 is bolted to flange 309. An O-ring 324 is preferably provided in O-ring receiving cavity 322. The reader will appreciate that O-rings 321 and 324 serve to provide a substantially hermetic seal between the end cap 310 and the enclosure housing 301.

Figure 33:
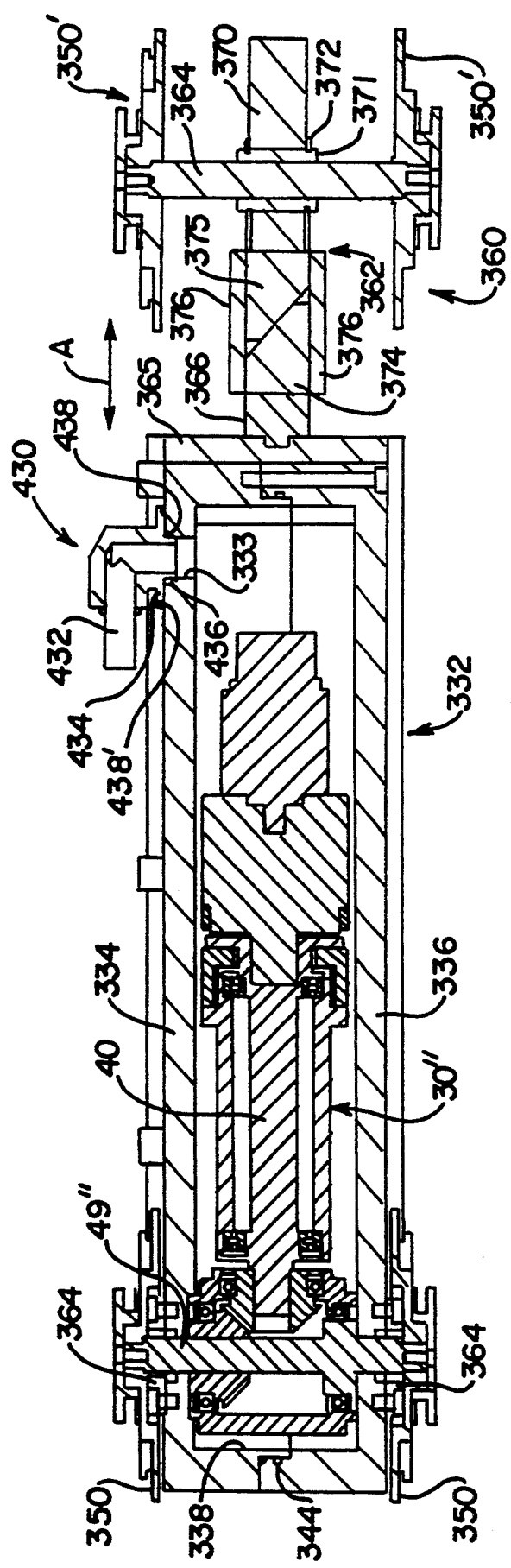
FIG. 33 is a partial cross-sectional view of a preferred locomotor module of the vehicle of FIG. 20.
Figure 34:
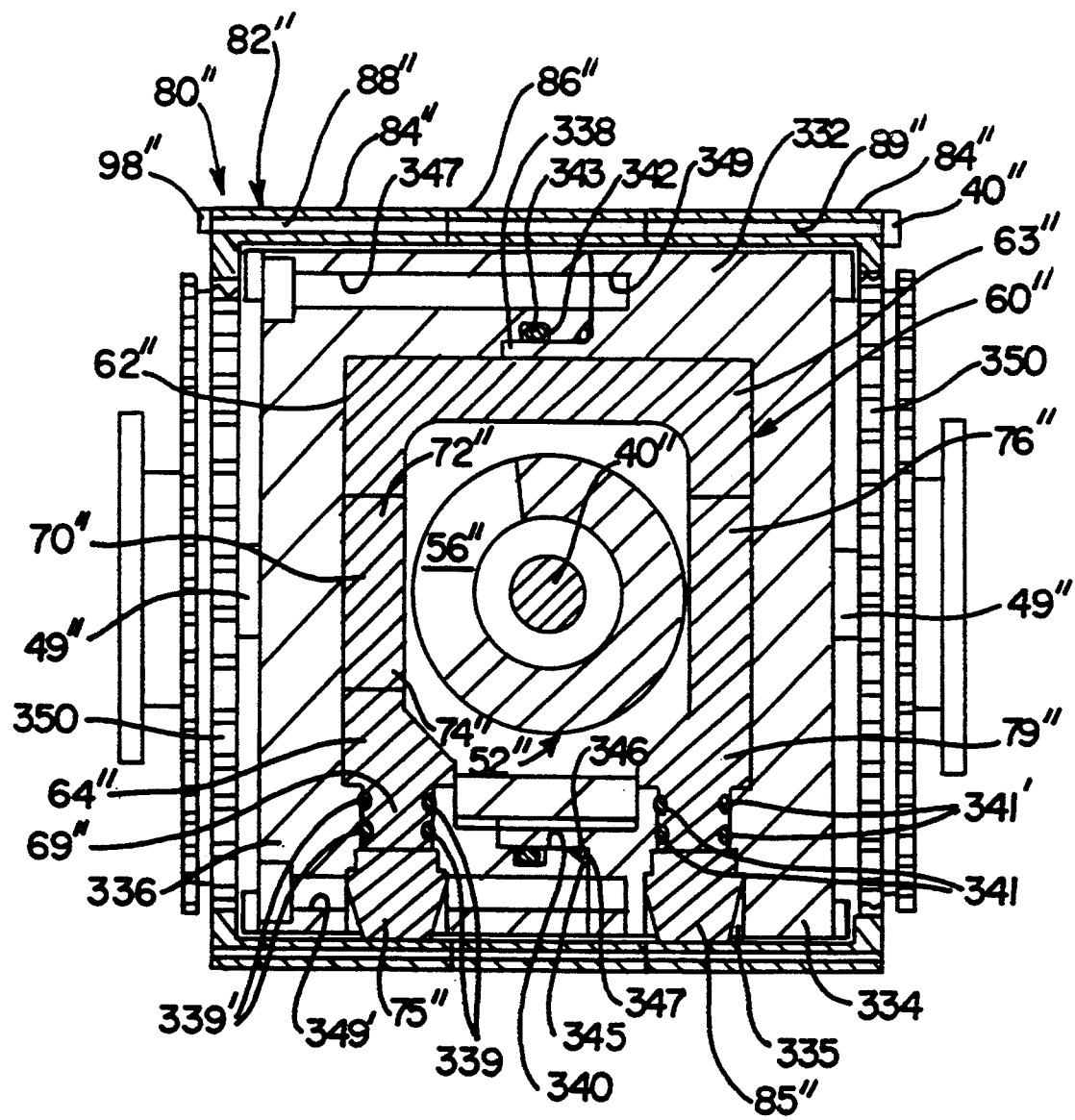
FIG. 34 is a partial cross-sectional end view of the locomotor module of FIG. 33.
Figure 35:
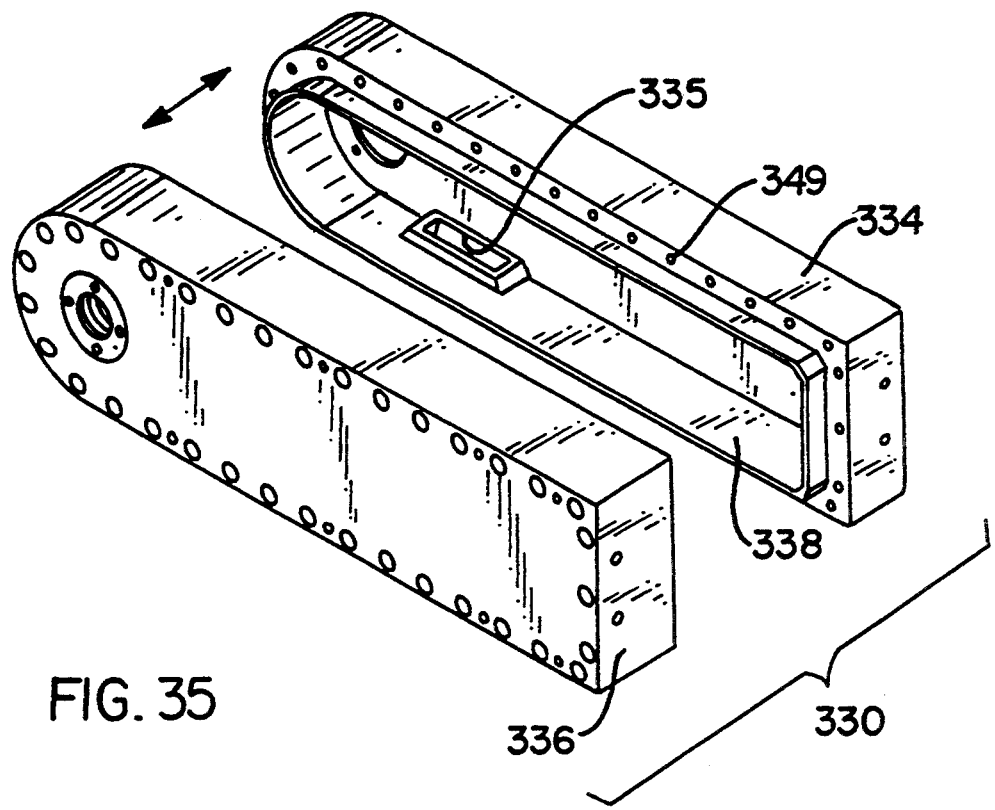
FIG. 35 is an exploded bottom assembly view of a locomotor enclosure of the vehicle of FIG. 20.
Figure 36:
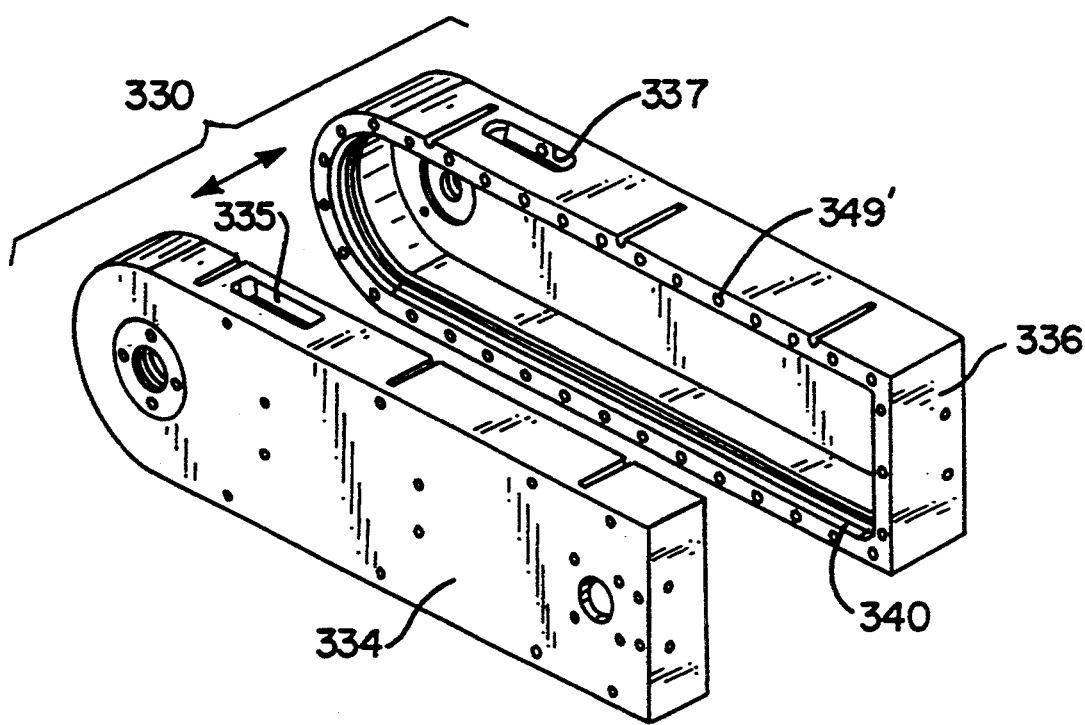
FIG. 36 is an exploded top assembly view of a locomotor enclosure of the vehicle of FIG. 20.

The vehicle 210 is preferably propelled by two locomotor track modules 330 that are identical in construction. Each track module 330 is preferably equipped with a drive assembly 30", the construction and operation of which was described in detail above. See FIGS. 33 and 34. The drive assembly 30" is housed within a substantially hermetically sealed enclosure, generally designed as 332, that comprises a first enclosure member 334 and a second enclosure member 336. As can be seen in FIGS. 34-36, the first enclosure member 334 has an outwardly extending boss member 338 that is adapted to be received in a correspondingly shaped cavity 340 provided in the enclosure member 336. To achieve a substantially hermetic seal between the enclosure members 334 and 336, enclosure member 336 is provided with a radial groove 342 that extends around the cavity 340 and is adapted to receive an appropriately sized radial O-ring 343 therein. See FIG. 34. In addition, enclosure member 336 is provided with a chamfered surface 345 that is arranged to create an O-ring receiving cavity 346 between the enclosure 336 and the boss member 338 adapted to receive an O-ring 347 therein. Thus, O-rings 343 and 347 serve to substantially hermetically seal enclosures 334 and 336 when they are fastened together. As can also be seen in FIGS. 35 and 36, a plurality of threaded bores 349 are provided around the perimeter of enclosure 334. Similarly, enclosure 336 has a plurality of bores 349' that correspond with threaded bores 345 to enable the enclosures 334 and 336 to be bolted together by capscrews (not shown). In a preferred embodiment, the capscrews are fabricated from 303 stainless steel and the threaded bores 345 are equipped with HELICOIL steel threaded inserts. Those of ordinary skill in the art will appreciate, however, that the enclosures 334 and 336 may be hermetically sealed together by other conventional fastener and seal arrangements.

As mentioned above, each locomotor track module 330 contains a drive unit assembly 30" that operates in the same manner as drive assemblies 30 and 30'. See FIG. 33. For the purposes of explanation, those components of drive assembly 30" that operate in the same manner and perform the same function as the components of drive assembly 30 will be designated by a double prime, i.e., ". Thus, the reader may refer to the above-recited discussion pertaining to the operation and function of the components of drive assembly 30 for a complete understanding of the operation of drive assembly 30".

In this embodiment, the multi-piece yoke member 60" is preferably configured as shown in FIG. 34. In particular, the yoke member 60" comprises two upper magnetic circuit pieces (62", 63") a first lower magnetic circuit piece 64", a permanent magnet 70", having a north pole 72" and a south pole 74", and a second magnetic circuit piece 76". The upper magnetic circuit pieces (62", 63") are preferably fabricated from a magnetic material such as, for example, iron or magnetic stainless steel and are preferably fastened to the interior of locomotor enclosures 334 and 336 by a collection of clamps or fasteners (not shown).

The first lower magnetic circuit piece 64" is also preferably fabricated from a magnetic material such as iron or magnetic stainless steel and has a downwardly extending leg portion 69" that extends through a corresponding opening 337 in enclosure 336. See FIG. 34. The first lower magnetic circuit piece 64" is preferably fastened to the interior of enclosure 336 by a plurality of clamps or screws(not shown) and is preferably provided with a pair of O-ring receiving grooves 339. O-rings 339' are received in grooves 339 for establishing a substantially hermetic seal between the first lower magnetic circuit piece 64" and the enclosure 336. In addition, a bottom magnetic pole piece 75", preferably fabricated from carbon steel, extends through the opening 337 in enclosure member 336 and is attached to the first lower magnetic circuit piece 64" and enclosure member 336 by capscrews or other suitable fasteners.

Attached to the upper magnetic circuit piece 62" and the first lower magnetic circuit piece 64" and extending therebetween is the permanent magnet 70". Permanent magnet 70" is preferably fastened to the upper magnetic circuit piece 62" and the first lower magnetic circuit piece 64" by appropriate glue or screws (not shown). A second lower magnetic piece 76" is positioned as shown in FIG. 34 and is preferably fabricated from iron or magnetic stainless steel. Second lower magnetic circuit piece 76" also has a downwardly extending leg portion 79" that extends through an opening 335, in the enclosure member 334 and is preferably provided with O-ring receiving grooves 341. See FIG. 34. O-rings 341' are received in grooves 341 to establish and maintain a substantially hermetic seal between the second lower magnetic piece 76" and the enclosure member 334. In addition, a bottom magnetic pole piece 85", preferably fabricated from carbon steel, extends through the opening 335 in enclosure member 334 and is attached to the second lower magnetic circuit piece 76" and enclosure member 334 by carbon steel flat head capscrews or other suitable fasteners.

The locomotor track modules 330 are each propelled by a corresponding endless track 80" that essentially operates in the same manner as track 80 as was described above. In particular, track 80" preferably comprises a plurality of track cleats 82" that are pivotally interconnected together as shown in FIG. 34. Each track cleat 82" has two end portions 84" that are fabricated from a magnetic material such as, for example, magnetic stainless steel and a central portion 86" that is fabricated from a non-magnetic material such as brass or aluminum. In a preferred embodiment, the end portions 84" and the central portion 86" are pivotally interconnected to form a continuous cleat 82" by a pin member 88" that extends through bores 89" in the end portions 84" and central portions 86" of each cleat 82". The pins are preferably retained in position by removable clips 90"; however other removable fasteners may be used.

Figure 37:
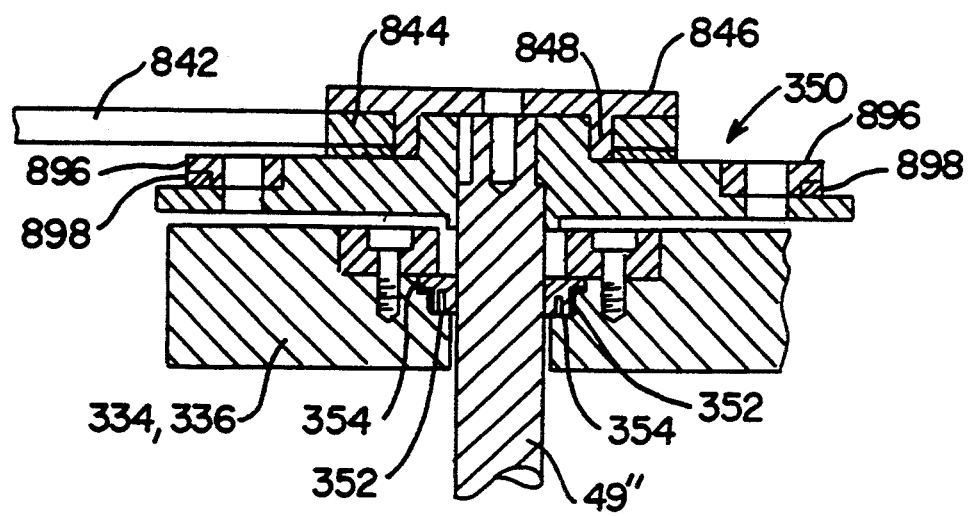
FIG. 37 is a partial cross sectional assembly view of a drive sprocket assembly of the vehicle of FIG. 20.

The endless track 80" is driven by two drive sprockets 350 that are received on shaft 49". See FIGS. 33 and 34. Two additional idler sprockets 350' are also provided at the opposite end of the locomotor track enclosure 332 from the drive sprockets 350 for rotatably supporting the endless track 80" thereon. As can be seen in FIG. 37, rotary seals 354 are provided between shaft 49 and enclosure members 334 and 336 to create a substantially hermetic seal therebetween. In a preferred embodiment, seals 354 are fabricated from fluorocarbon material and are configured as shown in FIG. 37. Such seals are manufactured by Furon of Los Alamitos, Calif.; however, other suitable seals may also be used. Seals 354 are preferably received in a corresponding recessed area 352 provided in enclosure members 334 and 336 and are retained in position by a corresponding retaining plate 364 that is attached to enclosures 334 and 336 by appropriately sized cap screws (not shown). The teeth of sprockets 350 and 350' are adapted to extend through teeth engaging openings 92" that are provided in each end portion 84" of each cleat 82" as shown in FIG. 20.

Figure 38:
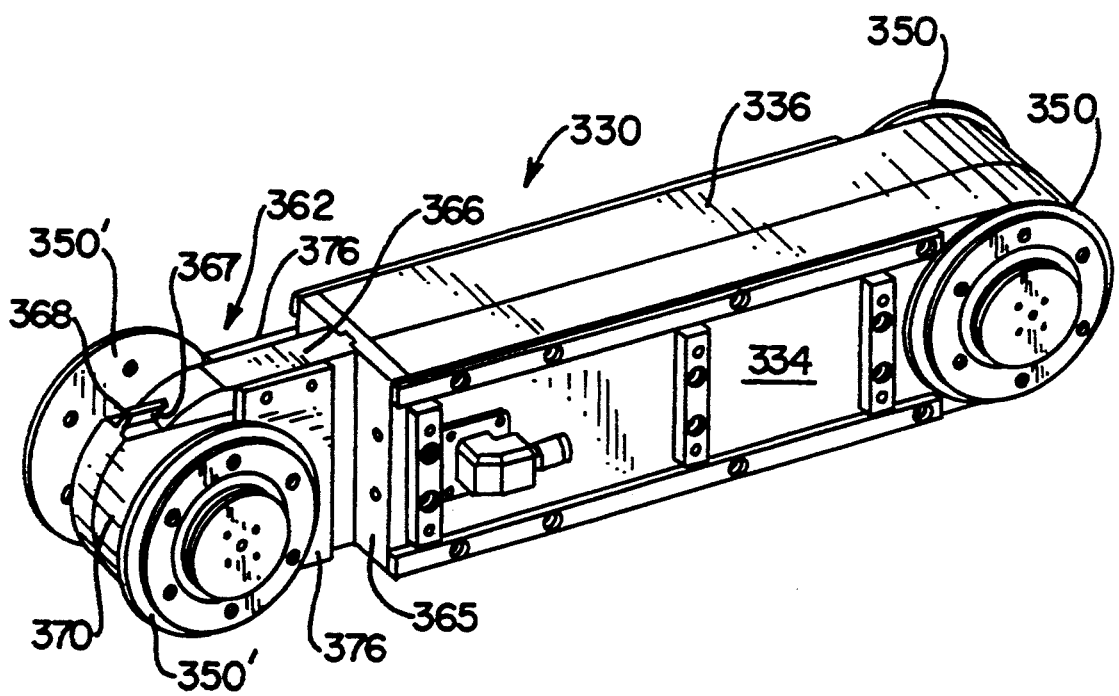
FIG. 38 is a perspective view of a locomotor module of the vehicle of FIG. 20 with the endless track removed therefrom for clarity.

Attached to the opposite end of locomotor track enclosure 332 from the drive shaft 49" is an idler sprocket assembly 360. Idler sprocket assembly 360 preferably comprises a tensioning assembly 362 that supports an idler shaft 364. More specifically and with reference to FIGS. 33 and 38, the tensioning assembly 362 preferably comprises an attachment plate 365 that is attached to the end of the enclosure 332 by conventional fasteners. A "C"-shaped retaining plate 366 is attached to the retaining plate 366 and has grooves 367 therein that are adapted to receive corresponding tongue plates 368 that are machined into a slider plate 370 that is slidably supported within the retaining plate 366. A conventional linear/rotary bearing 371 is attached to the slider plate 370 preferably by conventional retaining rings 372 and is adapted to rotatably support the idler shaft 364 therein. Received within the C-shaped retaining plate 366 are two opposing, wedge-shaped slider members 374 and 375. Slider members (374, 375) are retained within the retaining plate 366 by two side plates 376 that are attached to the retainer plate 366 by appropriately sized bolts. The skilled artisan will appreciate that by drawing the side plates 376 together by tightening the attachment bolts, the slider members (374, 375) will be compressed therebetween and, thus, cause the slider plate 370 to move in one of the directions indicated by arrow "A". See FIG. 33. Accordingly, it will be understood that the track 80" may be tensioned on sprockets 350 and 350' by adjusting the position of the slider plate 370 in the above-described manner.

Figure 39:
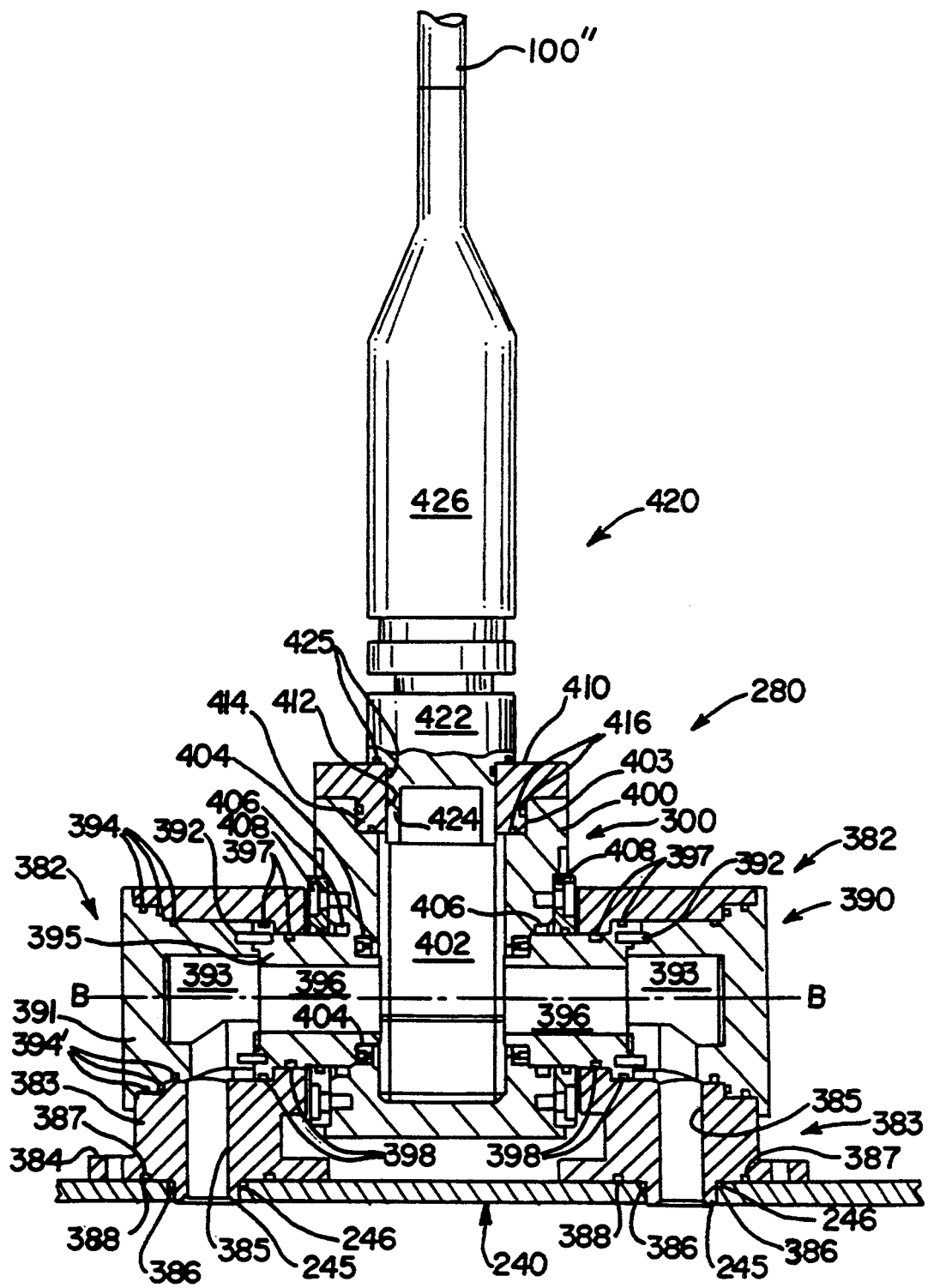
FIG. 39 is a partial cross-sectional assembly view of a preferred tether attachment device for the vehicle of FIG. 20.

As can be seen in FIG. 22, operational power is supplied to the vehicle 210 by means of a tether line 100" that is attached to the end plate assembly 220 by a substantially hermetically sealed swivel assembly 380. The swivel assembly 380, in a preferred form, comprises a central attachment member 400 that is pivotally supported on two hollow axial support assemblies 382 that are identical in construction. As can be seen in FIG. 39, an axial support assembly 382 comprises a support member 383 that is equipped with an attachment plate 384 that has a wire receiving port 385 therein that is adapted to be received in a corresponding bore 245 provided in the end plate 240. Preferably, the bore 245 has a chamfered edge 246 to create an O-ring receiving pocket between the attachment plate 384 and the end plate 240 for receiving a first O-ring 386 therein. In addition, a groove 387 is preferably provided in the attachment plate 384 for receiving an O-ring 388 therein. The reader will appreciate that O-rings 386 and 388 serve to establish and maintain a substantially hermetic seal between the attachment plate 384 and the end plate 240 when the attachment plate 384 is bolted thereto.

Received within the axle support assembly 382 is a two-piece axle assembly, generally indicated as 390. More specifically, axle assembly 390 comprises an outer axle block 391 and an inner axle block 395 that are concentrically pinned together by pins 392. As can be seen in FIG. 39, outer axle block 391 has a wire-receiving bore 393 that is adapted to correspond with the bore 385 in the support member 383. Likewise, inner axle block 395 has a wire-receiving bore 396 that corresponds to bore 393 in the outer axle block 391. In a preferred embodiment, a substantially hermetic seal is achieved between the axle assembly 390 and the support member 383 by a collection of O-rings. In particular, inner axle block is preferably provided with two grooves 397 that are adapted to receive O-rings 398 therein. Similarly, outer axle block is preferably provided with three grooves 394 that are adapted to receive O-rings 394' therein. The reader will appreciate that O-rings 394' and 398 serve to establish and maintain a substantially hermetic seal between the support member 383 and the axle assembly 390 when the axle assembly 390 is bolted thereto.

The central attachment member 400 is adapted to be pivotally supported on the inner axle blocks 395 as shown in FIG. 39. Preferably, the central attachment member 400 has an elongated wire-receiving cavity 402 into which portions of inner axle blocks 395 extend. In addition, the central attachment member 400 has two conventional roller bearings 404 pressed therein for rotatably receiving portions of the inner axle blocks 395 therein. The reader will appreciate that such construction permits the central attachment member 400 to pivot about pivot axis B-B. In a preferred embodiment, lip seals 406, of the same type and configuration as the lip seals 354 used to create a substantially hermetic seal between the shaft 49" and the enclosure members 334 and 336, are received in corresponding cavities provided in the central attachment member 400. Each of the seals 406 are retained in their corresponding cavities by a corresponding removable seal plate 408 that is attached to the central attachment member 400 by capscrews (not shown). It will be appreciated that seals 406 serve to establish and maintain a substantially hermetic seal between the inner axle blocks 395 and the central attachment member 400.

As can be seen in FIG. 39, an outer seal plate 410 is attached to the top of the central attachment member 400 preferably by appropriately sized capscrews (not shown). The upper seal plate 410 has an internally threaded bore 412 therethrough that corresponds with the bore 402 in the central attachment member 400. As can also be seen in FIG. 39, the outer seal plate preferably has a boss portion 414 that is adapted to be received in a corresponding counterbore 403 in the central attachment member 400. A substantially hermetic seal is established and maintained between the central attachment member 400 and the upper seal plate 410 by O-rings 416 that are received in grooves provided in the outer seal plate 410.

In a preferred embodiment, the tether 100" is terminated at the vehicle 210 using an in-line hermetically sealed connector system 420 manufactured by D. G. O'Brien of Seabrook, N.H. This preferred connector arrangement comprises a bulkhead connector 422 and a plug connector 426. The bulkhead connector 422 has a threaded portion 424 adapted to be received in the internally threaded bore 412 provided in the outer seal plate 410. A substantially hermetic seal is established and maintained between the bulkhead connector 422 and the outer seal plate by O-rings 425 that are received in grooves provided in the bulkhead connector 422. The connector 426 is also adapted to be threadedly connected to the bulkhead connector 422. Preferably, the connector 426 is potted and strain relieved onto the tether cable 100" and has hermetically sealed glass inserts (not shown). Also, the connector 426 and bulkhead connector 422 are preferably interconnected by a safety cable (not shown) which is attached in a known manner after the two parts are mated. As can be seen in FIG. 22, a bumper plate 428 is preferably attached to the central attachment member 400 to limit the pivotal travel thereof to prevent the connector assembly from contacting the surface upon which the vehicle 210 is riding.

As was mentioned above, the vehicle 210 is controlled and operated in the same manner as the vehicles (10, 10'). The tether line 100" houses the fiber optic cable and other wires for supplying the necessary control power from the control console located outside of the vessel to the vehicle 210. It will also be appreciated that the output lines from the various components of the vehicle 210 are also carried in the tether line 100". As can be seen in FIGS. 20 and 33, each locomotor enclosure 332 and the telemetry enclosure 250 and the electronics enclosure 260 are each equipped with a "feedthru" connector assembly 430 for interconnecting the power and control wires running between those enclosures. The connectors 430, in their preferred form, comprise a right angle hollow connector 432 that is attached to a base plate 434. As can be most particularly seen in FIG. 33, a boss member 436 extends from the base member 434 and is adapted to be received in a correspondingly sized bore 333 in the respective enclosure (334, 336). The outer edge of the bore 333 is chamfered to create an O-ring receiving cavity between the bore 333 and the boss 436 that is adapted to receive an O-ring 438 therein. In addition, an O-ring receiving groove is provided in a portion of the base plate 434 that is adapted to receive a second O-ring 438' therein. It will be appreciated that O-rings 438 and 438' serve to establish and maintain a substantially hermetic seal between the corresponding enclosure (250, 260, 332) and the connector 430 when the base member 434 is bolted thereto. A commercially available wire harness tube (not shown), preferably comprising a thick-walled teflon tube with stainless steel braided overwire is crimped in a known manner to the connector 432 such that a substantially hermetic seal is established therebetween. It will be understood that such wire harness tube serves to safely carry the power and control wires between the various enclosures (250, 260, 332).

The tether line 100" is managed and controlled by a tether line management system that is somewhat similar to the tether line management system 170 that was discussed above. However, in this embodiment, the winch member that is adapted to payout and collect the tether 100" is also substantially hermetically sealed and pressurized.

Figure 40:
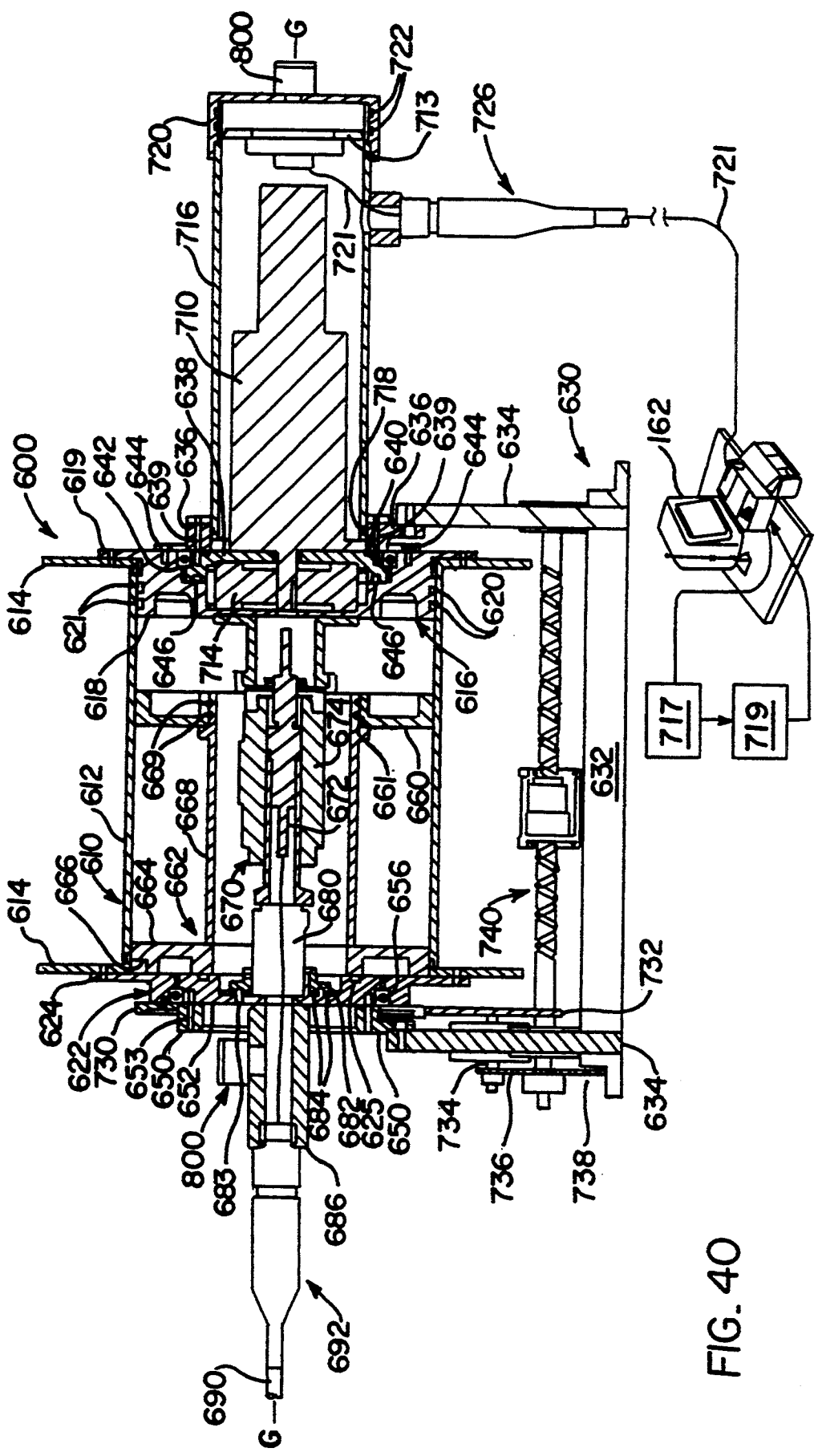
FIG. 40 is a cross-sectional side elevational view of a preferred tether drum assembly used in connection with the vehicle of FIG 20.
Figure 41:
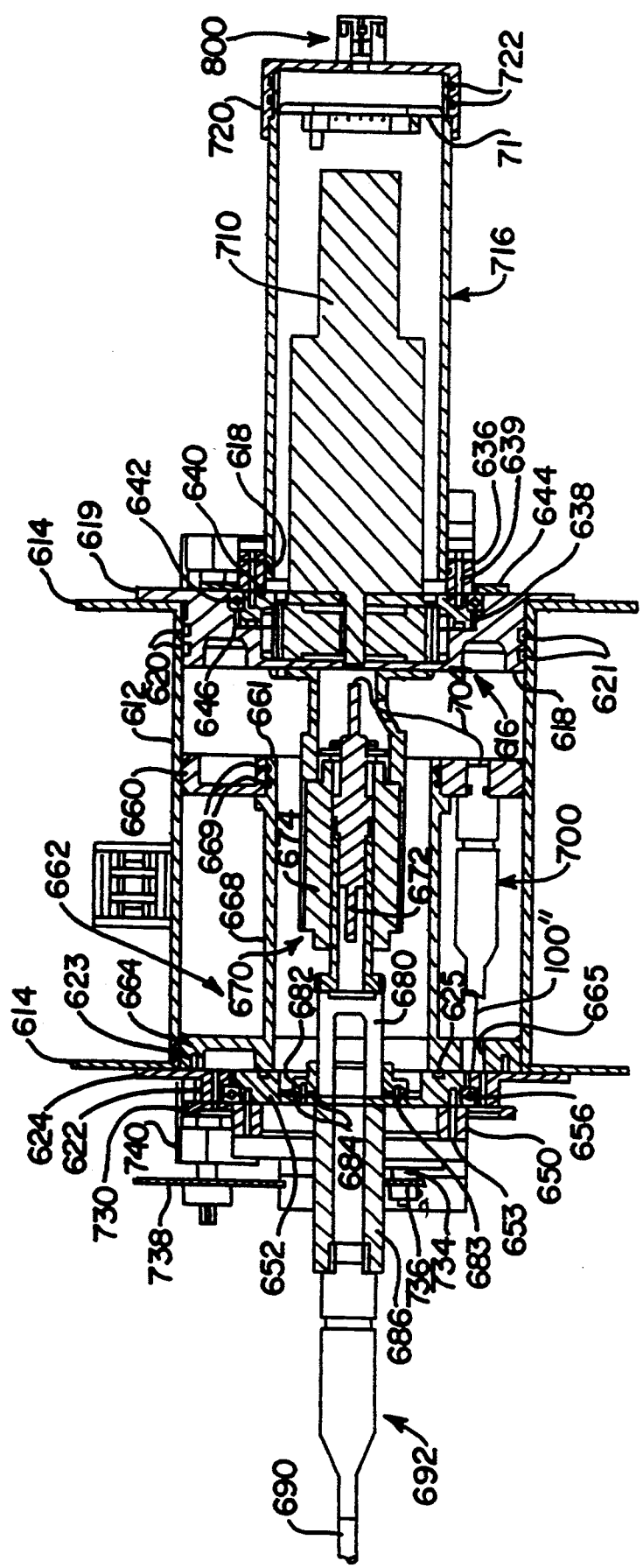
FIG. 41 is cross sectional plan view of the tether drum assembly of FIG. 40.

More specifically and with reference to FIGS. 40 and 41, there is shown a preferred winch assembly 600 for this embodiment of the present invention. As can be seen in those Figures, the winch assembly 600 comprises a motor driven internally pressurized cable drum assembly 610 that is rotatably supported on a stand assembly 630. In a preferred form, the drum assembly 610 comprises a hollow cylindrical portion 612 that has two flanges 614 preferably welded thereto. An end cap 616, having a center portion 618 sized to be received in the hollow cylindrical portion 612 and a flange portion 619, is attached to one of the flanges 614, preferably by removable fasteners such as bolts or capscrews (not shown). A pair of grooves 620 are provided around the perimeter of the center portion 618 for receiving O-rings 621 therein. It will be appreciated that O-rings 621 serve to establish and maintain a substantially hermetic seal between the cylindrical portion 612 and the center portion 618.

The other end of the drum assembly also preferably has an end cap 622 attached thereto. End cap 622 preferably has a flanged portion 624 that is attached to one of the flanges 614 preferably by conventional removable fasteners (not shown). As will be further explained below, the end caps 616 and 622 serve to rotatably support the drum assembly 610 on the stand assembly 630.

The stand assembly 630 preferably comprises a base 632 that has two upstanding support members 634 attached thereto. Attached to the upstanding support members 634, preferably by threaded capscrews (not shown), are drum support collars 636 and 650. In a preferred embodiment, an inner support ring 638, configured as shown in FIGS. 40 and 41, is attached to the support collar 636 by pins 639. A substantially hermetic seal is achieved between the drum support collar 636 and the inner support ring 638 by an O-ring 640 that is received in a groove provided in the inner support ring 638. A conventional roller bearing 642 is received on inner support ring 638 to rotatably support the end cap 616 thereon. Bearing 642 is preferably retained in position by a bearing retainer plate 644 that is attached to the end cap 616 preferably by-removable fasteners (not shown). A substantially hermetic seal is achieved between the end cap 616 and the inner support ring 638 by an O-ring 646 that is received in a groove provided in the end cap 616.

Also in a preferred embodiment, an inner support ring 652, configured as shown in FIGS. 40 and 41, is attached to the support collar 650 by pins 653. A conventional roller bearing 656 is received on inner support ring 652 to rotatably support the end cap 622 thereon. Bearing 656 is preferably retained in position by a ring gear 730, the purpose of which will be explained in further detail below. The reader will appreciate that the above arrangement of bearings 642 and 656 serve to rotatably support the drum assembly 610 on the stand assembly 630 such that the drum assembly can freely rotate about axis G-G. See FIG. 40.

Figure 42:
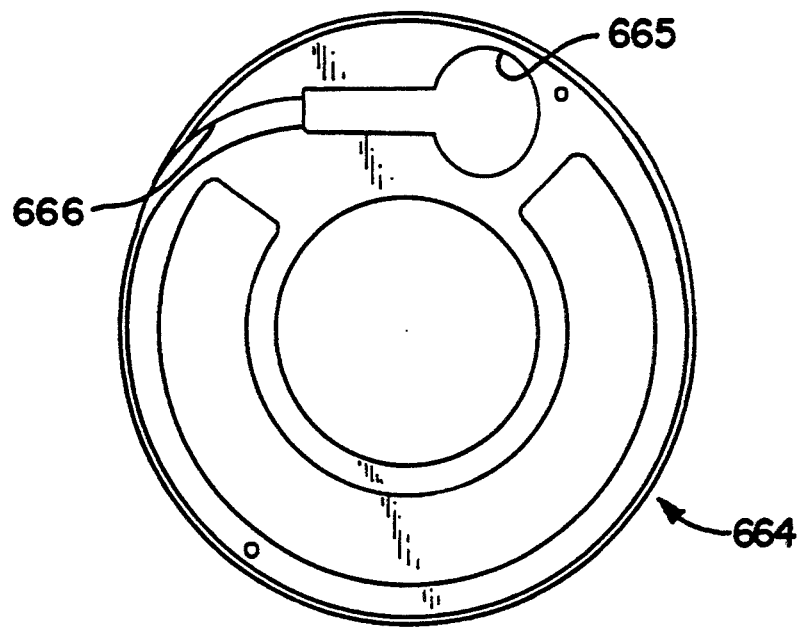
FIG. 42 is an end view of a preferred feedthru disc of a tube assembly of the tether drum of FIG. 40.

An end disc 660 is also preferably received within the hollow cylindrical portion 612 and is preferably welded thereto to achieve an airtight seal therebetween. Also received within the hollow cylindrical portion 612 is a tube seal assembly 662. More specifically, tube seal assembly 662 preferably comprises a feedthru disc 664 that has a hollow tube sleeve 668 concentrically welded thereto. As can be seen in FIGS. 41 and 42, feedthru disc 664 has a tether receiving bore 665 therethrough and a tether guiding groove 666 machined therein. Feedthru disc 664 is also preferably welded to the hollow cylindrical portion 612 in the position shown in FIGS. 40 and 41. The free end of the tube sleeve 668 is adapted to be sealingly received in a bore 661 provided in the end disc 660. A substantially hermetic seal is established between the tube sleeve 668 and the end disc 660 by two O-rings 669 that are received in grooves provided in the tube sleeve 668. As can most particularly be seen in FIG. 41, end cap 622 is also preferably pinned to feedthru disc 664 by pins 623. Also, a substantially hermetic seal is created between the end cap 622 and the feedthru disc 664 by an O-ring 625 received in a groove provided in the end cap 622.

Housed within the tube seal assembly 662 is a slip ring assembly, generally designated as 670. In a preferred embodiment, slip ring assembly comprises a commercially available optical fiber slip ring 672, such as slip ring Model No. F03588-1 manufactured by Litton Aerospace, Inc. of Blacksburg, Va. and a conventional mercury power slip ring 774, such as Model No. MXT-6 manufactured by Meridian Laboratories, Inc. of Middleton, Wis. The operation of slip rings 672 and 674 are well known in the art and thus will not be herein described. Slip ring assembly 670 is supported within the tube seal assembly 662 by a support sleeve 680 that is attached to the slip ring assembly 670 by a plurality of set screws (not shown) and an interference fit with the outer housing of the mercury power slip ring 774. Sleeve 680 is preferably welded to an attachment flange 682 that is preferably pinned to the inner support ring 652 by pins 683. A substantially hermetic seal is achieved between the attachment flange 682 and the inner support ring 652 by a pair of O-rings 684 that are received in grooves provided in the attachment flange 682.

As can be seen in FIGS. 40 and 41, a feedthru sleeve 686 extends through the support collar 650 and is attached to the inner support ring 652, preferably by welding. Control power and output signals are supplied to and from the winch assembly 600 to the control console by control line 690 that is substantially hermetically attached to the feedthru sleeve 686 by a connector assembly 692. Connector assembly 692 is constructed in the same manner as connector 420, the construction and attachment of which was described in detail above. The control wires from the connector assembly 692 to the slip ring 672 are collectively represented by line 694.

In a preferred embodiment, the tether 100" is attached to the winch assembly 600 by a connector assembly 700. See FIG. 41. More specifically, tether 100" has a connector assembly 700 attached thereto that is constructed in the same manner as connector 420 and is adapted to be substantially hermetically attached to the end disc 660 in the manner that was described above. The tether 100" is adapted to be fed through openings (not shown) provided in one of the flanges 614 and the hollow cylindrical portion 612 that correspond with the tether guiding groove 666 in feedthru disc 664. The tether 100" is received in groove 666 and extends through bore 665 in feedthru disc 664 so that the connector assembly can be attached to the end disc 660. The input and output signals are transferred from the slip ring 670 assembly in a known manner through control wires collectively represented by line 704.

Drum assembly 610 is rotated by a motor 710 that is attached to a conventional transmission 714 such as model no. HDUR-40-200-2-6-SP manufactured by HD Systems, Inc. of Hauppauge, N.Y. Transmission 714 is attached to the inner support ring 638 by conventional means and is adapted to selectively engage the end cap 616 in a known manner to control the rotation of the drum assembly 610. Preferably, motor 710 is mounted within a flanged motor housing 716 that is attached to support collar 636 by pins 639. A substantially hermetic seal is achieved between the housing 716 and the support collar 636 by an O-ring 618 that is received in a groove provided in the end of the motor housing 716. Motor housing 716 also has an end cap 720 threadedly attached thereto to enable the motor 710 and the electronic components therefor to be accessed. A substantially hermetic seal is achieved between the housing 716 and the end cap 720 by a pair of O-rings 722 that are received in grooves provided in the end cap 720. Motor control power is supplied to the motor housing 716 by a connector assembly 726 in the manner described above.

Also in a preferred embodiment, a large ring gear 730 is pinned to the end cap 622 such that it can rotate therewith. Ring gear 730 is arranged to mesh with a second gear 732 that is attached to a shaft 734 that is rotatably attached to one of the upstanding support members 634 of stand assembly 630 in a known manner. A third gear 736 is attached to the shaft 734 and is arranged to mesh with a fourth gear 738 that is attached to a conventional "levelwind" assembly 740. The skilled artisan will readily appreciate that gears (730, 732, 736, 738) are sized to achieve a preferred reduction ratio such that the levelwind assembly 740 causes the tether 100" to be evenly wound on the drum assembly 610 in a known manner. The skilled artisan will appreciate that the levelwind assembly 740 comprises a double-helix cut screw which allows a nut to travel linearly back and forth thereon to thereby guide the cable on and off the drum. Such levelwind mechanisms are commercially available from Flennor, Inc. of Ridgefield, Conn. under the Model No. BR1827-1; however, other commercially available devices can also be used.

Figure 43:
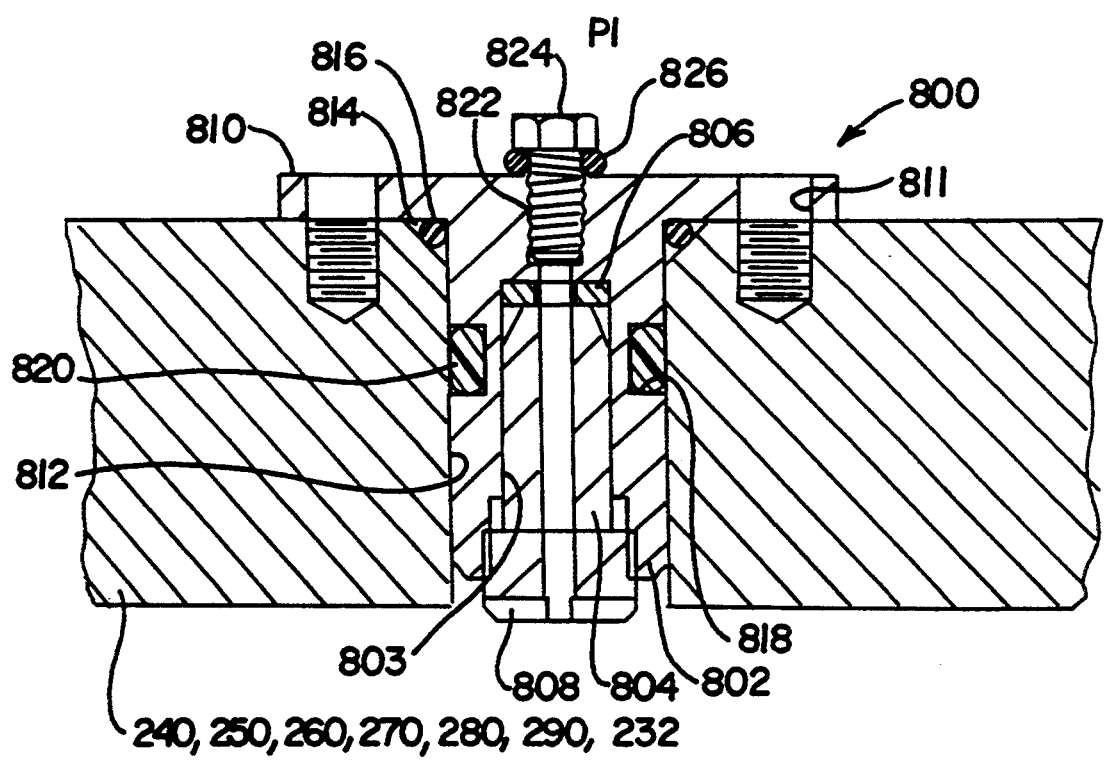
FIG. 43 is a cross-sectional assembly view of a preferred check valve assembly used in connection with the vehicle in FIG. 20.

In a preferred embodiment, the enclosures (240, 250, 260, 270, 280, 332), end plate assembly 220, drum assembly 610, and motor housing 716 are each equipped with a check valve assembly 800. As can be seen in FIG. 43, each check valve assembly 800 preferably comprises a check valve body 802 that has a bore 803 that is sized to receive a commercially available check valve 804 such as check valve Model No. 2201 manufactured by Kepner Valve Co., Inc. of Villa Park, Ill. The check valve 804 is pressed into bore 803 and sealingly retained therein between a teflon washer 806 and a threaded end cap 808 that is adapted to threadedly engage the end of the valve body 802. The valve body 802 has a flanged portion 810 that has bores 811 therethrough for receiving fasteners (not shown) for attaching the body 802 to an enclosure (250, 260, 270, 280, 290, 332), the end plate 240, the feedthru sleeve 686, and the motor housing end cap 720. The body 802 is sized to extend into a corresponding bore 812' provided in one of those enclosures or the end plate 240. The upper portion of the bore 812 is chamfered to create an O-ring receiving cavity 814 between the body 802 and the bore 812 that is adapted to receive an O-ring 816. Additionally, the valve body 802 is also preferably equipped with a radial groove 818 adapted to receive an O-ring 820 therein. It will be appreciated that when the flange member 810 is bolted to a corresponding enclosure (250, 260, 270, 280, 290, 332), the end plate 240, the feedthru sleeve 686, or the motor housing end cap 720, a substantially hermetic seal is achieved therebetween. As also illustrated in FIG. 43, the valve body 802 has a threaded bore 822 that extends through the flange 810 to communicate with a bore in the check valve 804. A capscrew 824 having an O-ring 826 received thereon is adapted to be threadedly received in the threaded bore 822.

To pressurize the enclosure, the seal screw 824 is removed and a pressurized gas (i.e, air or nitrogen) is introduced by known means through a hollow needle screw (not shown) that is adapted to be threaded into the bore 822. The hollow needle screw has an extension member that biases the flow restrictor in the check valve 804 out of sealing engagement with the O-ring therein to permit the gas to flow into the enclosure. After the pressure within the enclosure reaches a predetermined magnitude (i.e., 50 psia), the needle screw is removed and the seal screw 456 is replaced. The hollow needle screw can also be used to purge the enclosure 250 in the same manner when the needle screw is not attached to a source of compressed gas.

In a preferred embodiment, enclosures (250, 260, 270, 280, 290, 332), the end plate assembly 220, the drum assembly 610, and the motor housing 716 are purged with several (i.e., preferably at least four) volumes of air or nitrogen or other fluid/gas before they are sealed and the enclosure internals are pressurized. Other gases and gas mixtures such as carbon dioxide or a fluorocarbon material available from E. I. Du Pont de Nemours & Company under the trademark FREON can also be successfully used. Preferably, the enclosures are pressurized to 50 psia with air/GN2 before deployment. It will be understood that because the enclosures (240, 250, 260, 270, 280, 290) are interconnected and substantially hermetically sealed to the end plate assembly and because the locomotor enclosures 322 are interconnected and substantially hermetically sealed to the electronics enclosure 250 by the feedthru connector assemblies 430, the pressure and temperature of those components,, collectively comprising the substantially hermetically sealed vehicle 210, can be monitored by temperature and pressure sensor boards 711 and 713 housed, for example, in the electronics enclosure 250 and the winch motor housing 716, respectively. See FIGS. 26 and 40. In particular, the temperature and pressure sensing boards 711 and 713 are each equipped with commercially available temperature and pressure sensors such as those manufactured by Lucas Nova Sensor of Fremont, Calif. for monitoring the temperature and pressure within the vehicle 210 enclosures and the winch assembly 600, respectively. The sensors of board 711 communicate with on board microprocessors such as those manufactured by Motorola, Inc. under Model No. 68HC11 in a known manner and communicate, via wires (collectively designated as 715) housed in tether line 100", which, ultimately, communicate with the operator console 162. Likewise, the sensors of board 713 communicate, via wires, collectively designed as 721, with the operator console 162. It will be appreciated that operator console 162, among other things, controls the power supplied to the vehicle 210 and the winch assembly 600 from a power source generally designated as 719. Commercially available software, generally designated as 717, and loaded within the operator console 162, among other functions, serves to compare the outputs from the temperature and pressure sensors on the boards 711 and 713 with predetermined values (i.e., 212° F. and 40 psia). Should the temperature and/or pressure in any of the vehicle enclosures, or the winch assembly 600 exceed the predetermined values, by a predetermined amount (i.e., 10° F. and 5 psia), the software triggers a warning light or alarm on the console 162. Preferably, if the operator does not act on the warning signals by a predetermined amount of time, the software will automatically shut off the power being supplied to the vehicle 210. Thus, if any of the electronic components in the vehicle 210 or the winch assembly 600 should malfunction which would cause anomalous temperature and/or pressure conditions within the vehicle, the operator can take the necessary actions to prevent an explosion from occurring. The above-recited pressure and temperature values and their threshold values are provided as preferred examples. The skilled artisan will appreciate that other temperature and pressure values may be successfully used without deviating from the spirit and scope of the present invention.

As can be seen in FIGS. 20 and 22, the vehicle 210 is preferably provided with a set of permanent magnetic tread outriggers 830 that allow the vehicle 210 to make the transition from, for example, the floor of a storage tank onto one of the vertical tank walls. The reader will appreciate that while the permanent magnetic track outriggers, 830 are herein depicted for use with vehicle 210, they could easily be adapted for use in connection with vehicles (10, 10') described above. In addition, while FIGS. 20 and 22 depict two outriggers 830 mounted to the front of the vehicle 210, the outriggers 830 could be alternatively mounted to the rear of vehicle 210 or four outriggers 830 (two in front and two in back) could also be used.

Figure 44:
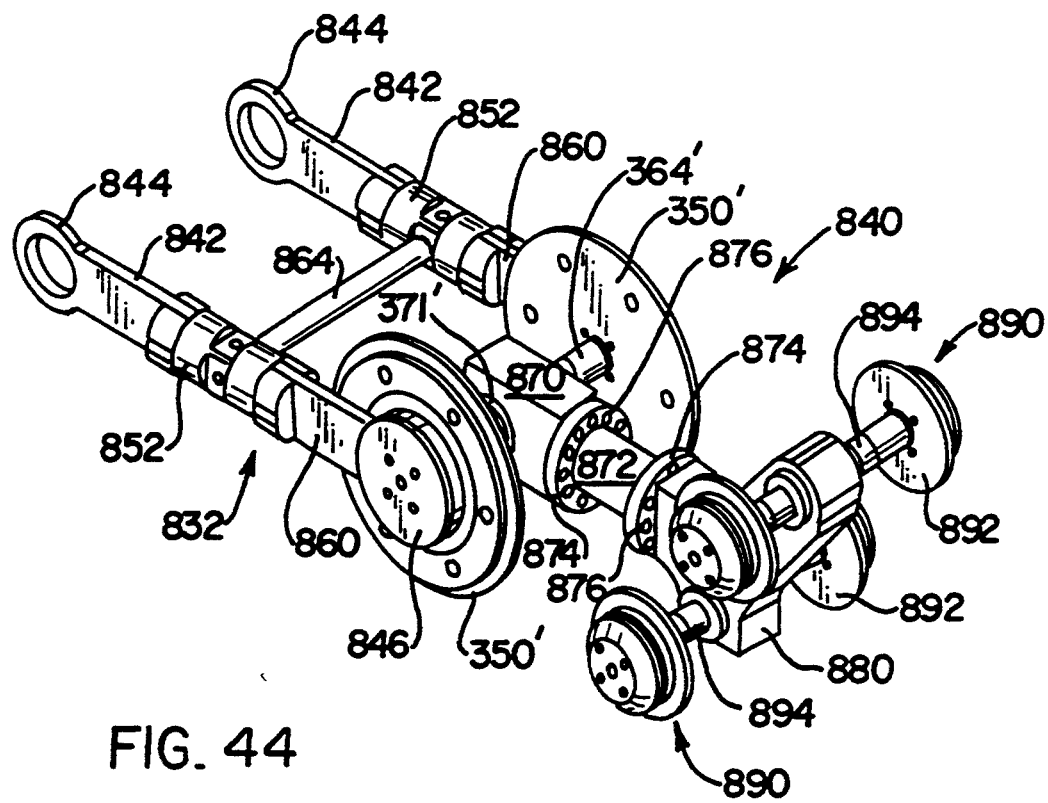
FIG. 44 is a perspective assembly view of the tensioning frame and sprocket assemblies of a preferred permanent magnet outrigger assembly of the present invention.
Figure 46:
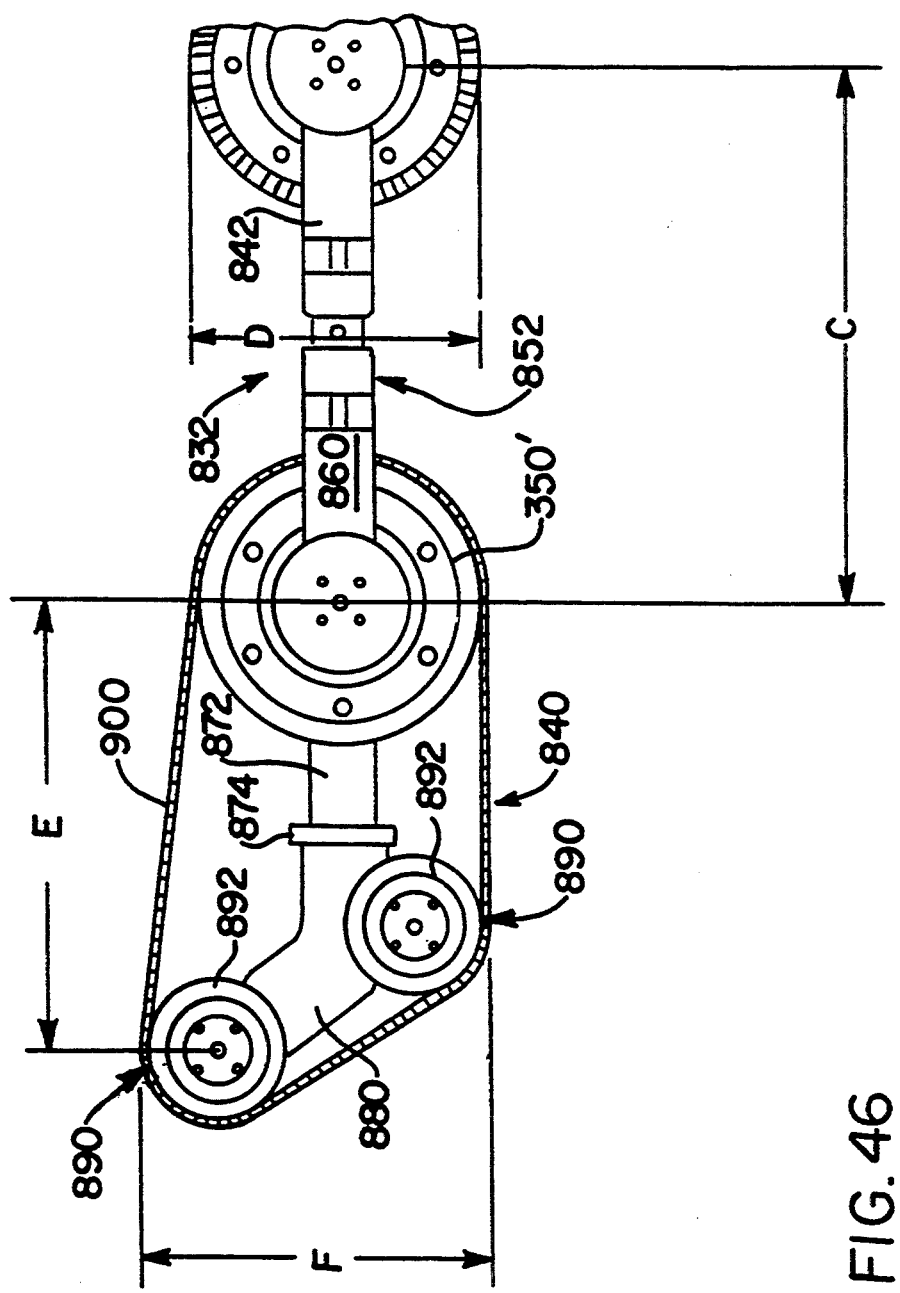
FIG. 46 is a partial side elevational view of a permanent magnet outrigger attached to a locomotor of the vehicle of FIG. 20.

More specifically and with reference to FIGS. 20, 44, and 46, each permanent magnet tread outrigger 830 comprises a tensioning assembly 832 that has an auxiliary frame assembly 840 attached thereto. As can be seen in those Figures, the outriggers 830 are pivotally attached to the drive shaft 49"/sprockets 350 located in the front of each locomotor track module 330. Preferably, a sprocket 350 is attached to each end of the drive shaft 49" by a threaded fastener (not shown). As was mentioned above, sprockets 350 serve to drivingly engage a corresponding track 80" that is received on the locomotor module 330. As can be seen in FIGS. 37 and 43, each tensioning assembly 840 includes two attachment arms 842 that each have a ring 844 formed thereon. Rings 844 are adapted to be pivotally attached to the corresponding sprockets 350 by an attachment flange 846 that is preferably attached to the sprocket 350 by the same fasteners that attach sprocket 350 to the drive shaft 49". More specifically and with reference to FIG. 37, each attachment flange 846 has an inwardly extending hub portion 848 that is adapted to pivotally receive a corresponding ring 844 thereon. Rings 844 are sized such they can freely pivot around a corresponding hub portion 848.

In a preferred embodiment, the end of each attachment arm 842 that is opposite from the ring 844 has an extension member 850 that has right handed threads formed thereon. Each extension member 850 is adapted to be threadedly received in a corresponding socket member 852 that has right handed threaded bore 854 therein. Each socket member 852 has a second bore 856 that has left handed threads cut therein that is adapted to receive a correspondingly threaded extension member 858 that is attached to an attachment arm 860. Each attachment arm 860 has a ring 862 that is adapted to be pivotally attached to corresponding drive sprockets 350' in the manner described above. The skilled artisan will appreciate that the distance between sprockets 350 and 350' can be increased or decreased by rotating the socket members 852 in the proper direction to cause the threaded extension members 850 and 858 to be threaded into or out of their corresponding threaded bores in the socket members 852. After the proper amount of distance is achieved between sprockets 350 and 350" a support brace 864, preferably comprising a solid stainless steel rod having a bolt receiving bore in each end thereof (not shown) is attached between the socket members 852 by threaded fasteners (not shown).

As can be seen in FIG. 44, the sprockets 350" are attached to the ends of a shaft 364' that is rotatably supported in a bearing 371' that is received in a support block 870. Preferably, support block 640 has an outwardly extending threaded rod (not shown) that is adapted to be threadedly received in a corresponding threaded bore (not shown) provided in a sleeve member 872. At the opposite end of the sleeve member 872, a second threaded bore (not shown) is provided that is adapted to receive a threaded member attached to an axle support block 880 that rotatably supports auxiliary axle assemblies 890 therein. It will be appreciated that the threaded bores in the sleeve 872 and the threaded members of blocks 870 and 880 are threaded in the same manner as the bores (854, 856) and threaded members (850, 858) described above such that the distance between the sprockets 350" and the axle assemblies 890 can be adjusted in the manner discussed above. After the sleeve 872 has been adjusted, it is locked in place by aligning one of the bores 876 provided in each of the flanges 874 attached to the ends of the sleeve 872 with a threaded bore (not shown) provided in the corresponding block (870, 880). Threaded fasteners (not shown) are then used to secure the flanges 645 in that position.

Figure 45:
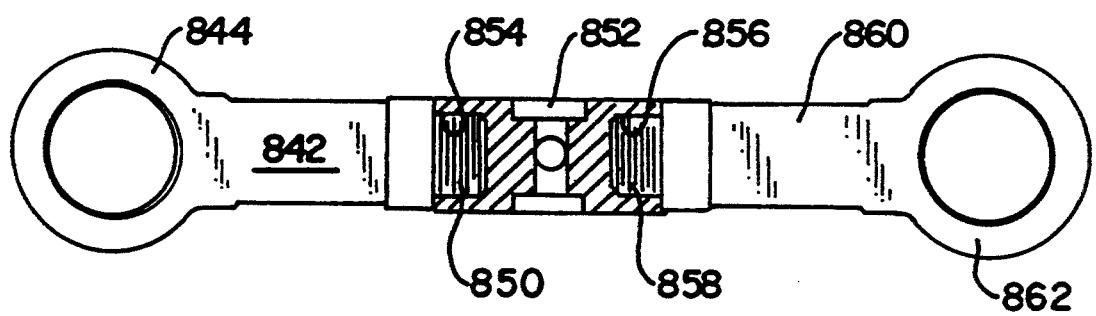
FIG. 45 is a partial cross-sectional assembly view of a preferred tensioning arm assembly of the tensioning frame of FIG. 44.

We have found that by configuring block 880 as shown in FIG. 45, the outrigger 830 enables the vehicle 210 to make the transition from a first surface to a second surface that intersects the first surface. In a preferred embodiment, dimensions C-F, as set forth in FIG. 46 are as follows: C=7.75 inches, D=4.25 inches, E=6.44 inches, and F=5.11 inches. However, the skilled artisan will appreciate that the overall arrangement of outrigger 830 may be provided in a variety of different configurations adapted to enable the vehicle 210 to make the transition from a first surface to a second surface arranged to intersect the first surface.

The support block 880 rotatably supports two axle assemblies 890 that each comprise two sprockets 892 that are connected to the ends of a shaft 894. Sprockets 892 are adapted to drivingly engage an endless track 900 that preferably comprises a plurality of thin (i.e., 0.125 inches thick) permanent magnets 662 that are preferably attached to a carbon steel support member (not shown) by a cyanoacrylate-based bonding adhesive. The support members are preferably pinned in a known manner to, two spaced-apart, chains such that they extend therebetween to create the endless track 900. The chains are operably received on sprockets 892 and 350'. The skilled artisan will appreciate that other permanent magnet configurations can also be used.

In a preferred embodiment, each outrigger 830 is driven by a drive belt 898 that is received on drive sprockets 896 that are attached the sprockets 350 and 350" by threaded fasteners. See FIG. 37. In the alternative, outriggers 830 can be non-driven.

From the above-description, the reader will appreciate that the present invention is well-suited for conducting a variety of operations in a variety of different environments. For example, the vehicle (10, 10') may be configured for entry into an enclosed vessel through a manway or standpipe therein. The vehicle can be safely operated in a vessel containing hazardous material by personnel located outside of the vessel. The magnetic tracks of the vehicle permit the vehicle to traverse the vertical walls and ceiling of the vessel as desired. Such operational flexibility permits the vehicle's scanning and sensing apparatuses to be driven upon every portion of the vessel structure so that the vessel's structural integrity may be analyzed. The vehicle is also equipped with navigational apparatus to assist the personnel located outside of the vessel in determining the vehicle's exact location within the vessel. The vehicle is also equipped with permanent magnet outriggers that enable the vehicle to move between intersecting surfaces. The vehicle also utilizes a unique method that enables it to safely operate in areas where combustible materials are present.

While the vehicle of the present invention is particularly well adapted for use in enclosed vessels such as storage tanks and the like, the present invention's utility is not limited to those applications. For example, the vehicle 10 of the present invention can be used to analyze the structural integrity of a pipeline or to perform other tasks therein. In any event, the present invention provides solutions to the aforementioned problems associated with prior known methods and apparatuses used to evaluate the structural integrity of an enclosed vessel having constrained access points. It will be understood, however, that various changes in the details, materials and arrangements of parts which have been herein described and illustrated to explain the nature of the invention may be made by those skilled in the art within the principle and scope of the invention as expressed in the appended claims.

What is claimed is:

1. A vehicle for use in a vessel having walls with interior surfaces capable of supporting a magnetic circuit, comprising:
   a vehicle frame member;
   a first endless driven member received on said vehicle frame member and adapted for travel on the interior surfaces of the vessel walls;
   means for driving said first endless driven member;
   a magnetic system attached to said vehicle frame member and comprising a magnet, fixed magnetic circuit means, and movable magnetic circuit means for establishing first and second magnetic circuits;
   means for selectively connecting said movable magnetic circuit means to said means for driving to move said movable magnetic circuit means between a first position wherein said first magnetic circuit is established between said endless driven member, said magnet, said fixed magnetic circuit means and said movable magnetic circuit means such that said endless driven member is caused to magnetically engage one of the interior surfaces of the vessel, and a second position wherein said second magnetic circuit is established between said magnet, said fixed magnetic circuit means, and said movable magnetic circuit means such that said endless driven member does not magnetically engage one of the interior surfaces of the vessel; and
   permanent magnet means pivotally attached to said vehicle frame member adapted to selectively pivotally engage the interior surfaces of the walls of the vessel to enable the vehicle to move from a first vessel surface to a second vessel surface that intersects the first vessel surface as said first endless driven member is driven.

2. The vehicle of claim 1 wherein said permanent magnet means comprises:
   an outrigger frame pivotally attached to said vehicle frame;
   a second endless member rotatably received on said outrigger frame; and
   a plurality of permanent magnets attached to said second endless member.

3. The vehicle of claim 2 wherein said second endless member is drivingly attached to said means for driving said first endless member.

4. The vehicle of claim 2 wherein said outrigger frame comprises means for adjusting the tension of said second endless member.

5. A mobile vehicle for use in an enclosed vessel having walls with interior surfaces capable of supporting a magnetic circuit comprising:
a vehicle frame member;
at least two drive members, each said drive member having a housing connected to said vehicle frame member such that said drive members are parallel to one another, each said drive member further having a first endless driven member received on said housing and adapted for travel on one of the interior surfaces of one of the vessel walls, and means for driving said first endless driven member, and a magnetic system attached to said housing comprising a magnet, fixed magnetic circuit means, and movable magnetic circuit means for establishing first and second magnetic circuits, and means for selectively connecting said movable magnetic circuit means to said means for driving to move said movable magnetic circuit means between a first position wherein said first magnetic circuit is established between one of said endless driven members, said magnet, said fixed magnetic circuit means and said movable magnetic circuit means such that one of said first endless driven members is caused to magnetically engage one of the interior surfaces of the vessel, and a second position wherein said second magnetic circuit is established between said magnet, said fixed magnetic circuit means and said movable magnetic circuit means such that said one of said first endless driven member does not magnetically engage one of the interior surfaces of the vessel; and
at least one permanent magnet means pivotally attached to each said drive member housing, said permanent magnet means adapted to selectively pivotally engage the interior surfaces of the walls of the vessel to enable the vehicle to move from a first interior surface to a second interior surface that intersects the first interior surface as said one of said first endless driven member is driven.

6. The vehicle of claim 5 wherein each said permanent magnet means comprises:
an outrigger frame pivotally attached to said corresponding drive member housing;
a second endless member rotatably received on said outrigger frame; and
a plurality of permanent magnets attached to said second endless member.

7. The vehicle of claim 6 wherein said second endless member is drivingly attached to said means for driving said first endless member.

8. The vehicle of claim 6 wherein said outrigger frame comprises means for adjusting the tension of said second endless member thereon.

9. A mobile vehicle for use in an enclosed vessel having walls with interior surfaces capable of supporting a magnetic circuit comprising:
a vehicle frame member;
at least one drive member attached to said frame member, each said drive member having a substantially hermetically sealed drive housing having a predetermined pressure established therein, each said drive member further having a first endless driven member received on said housing and adapted for travel on the interior surfaces of the vessel walls, means for driving said first endless driven member, and a magnetic system attached to each housing comprising a magnet, fixed magnetic circuit means, and movable magnetic circuit means for establishing first and second magnetic circuits, and means for selectively connecting said movable magnetic circuit means to said means for driving to move said movable magnetic circuit means between a first position wherein said first magnetic circuit is established between said first endless driven member, said magnet, said fixed magnetic circuit means and said movable magnetic circuit means such that said first endless driven member is caused to magnetically engage one of the interior surfaces of the vessel, and a second position wherein said second magnetic circuit is established between said magnet, said fixed magnetic circuit means and said movable magnetic circuit means such that said first endless driven member does not magnetically engage one of the interior surfaces of the vessel;
tether means;
power supply means located exterior to the vessel and attached to each said means for driving said corresponding endless driven members and each said means for selectively connecting said corresponding movable magnetic circuit means to said corresponding means for driving by said tether means;
means for monitoring said predetermined pressure; and
means for controlling said power supply means, said means for controlling said power supply means communicating with said monitoring means to cause said power supply means to discontinue supplying power to each said means for driving and said means for selectively connecting said movable magnetic circuit means when said predetermined pressure changes by a predetermined amount.

10. The mobile vehicle of claim 9 wherein each said drive housing has a predetermined temperature associated therewith, and wherein said mobile vehicle further comprises a temperature monitoring means for monitoring said predetermined temperature, said temperature monitoring means communicating with said means for controlling said power supply means to cause said power supply means to discontinue supplying power to each said means for driving and said means for selectively connecting said movable magnetic circuit means when said predetermined temperature increases by a predetermined amount.

11. The mobile vehicle of claim 9 further comprising:
winch means located outside of said vessel for selectively collecting and paying out said tether.

12. The mobile vehicle of claim 11 wherein said winch means comprises:
a winch stand;
a substantially hermetically sealed drum rotatably supported on said winch stand for selectively storing said tether thereon;
motor means for selectively rotating said drum, said motor means contained within a substantially hermetically sealed motor housing that is attached to said substantially hermetically sealed drum such that a substantially hermetical seal is established therebetween, said motor means being powered by said power supply means, said drum and said motor housing having a second predetermined pressure established therein; and
second pressure monitoring means within said motor housing for monitoring said second predetermined pressure in said drum and said motor housing, said second pressure monitoring means communicating with said means for controlling said power supply means to cause said power supply means to discontinue supplying power to said motor means when said second predetermined pressure changes by a predetermined amount.

13. The mobile vehicle of claim 12 wherein said drum and said motor housing have a second predetermined temperature associated therewith and wherein said mobile vehicle further comprises secondary temperature monitoring means in said motor housing for monitoring said second predetermined temperature, said secondary temperature monitoring means communicating with said means for controlling said power supply means to cause said power supply means to discontinue supplying power to said motor means when said second predetermined temperature increases by a predetermined amount.

14. The mobile vehicle of claim 9 further comprising:
a hollow, substantially hermetically sealed end plate assembly attached to said frame member.

15. The mobile vehicle of claim 14 further comprising:
at least one substantially hermetically sealed electronics enclosure, for housing said pressure and temperature monitoring means, attached to said end plate assembly;
first sealing means attached to each said electronics enclosure for establishing said substantially hermetic seal between said end plate assembly and each said enclosures; and
tube means attached to each said electronics enclosure and a corresponding drive housing for establishing a substantially hermetically sealed wireway between said electronics enclosure and said corresponding drive housing such that said temperature and pressure monitoring means monitors the temperature and pressure within each said drive housing;
second seal means attached to each said electronics enclosure for establishing said substantially hermetic seal between each said electronics enclosure and said tube means attached thereto; and
third seal means attached to said drive housing for establishing said substantially hermetic seal between said tube means attached thereto.

16. The mobile vehicle of claim 14 further comprising ultrasonic sensing apparatus for ultrasonically analyzing the integrity of the walls of the vessel upon which the vehicle is driven, said ultrasonic sensing apparatus being housed within a substantially hermetically sealed sensing enclosure, said sensing enclosure being hermetically sealed to said end plate assembly such that said pressure and temperature monitoring means also monitors the pressure and temperature within said sensing housing.

17. The mobile vehicle of claim 14 further comprising a video camera housed within a substantially hermetically sealed camera enclosure attached and hermetically sealed to said end plate assembly such that said pressure and temperature monitoring means monitors the temperature and pressure within said camera housing.

18. The mobile vehicle of claim 14 further comprising means for tracking said vehicle within the vessel such that said vehicle can be tracked by personnel located outside of said vessel, said location establishing means being housed within a substantially hermetically sealed telemetry enclosure sealingly attached to said end plate assembly such that said pressure and temperature monitoring means monitors the temperature and pressure within said telemetry enclosure.

* * * * *